United States Patent [19]
Hendrickson et al.

[11] 3,842,331
[45] Oct. 15, 1974

[54] DIGITAL STEPPING MOTOR CONTROL SYSTEM

[75] Inventors: Kenneth E. Hendrickson; Warren A. Lopour, both of Rochester; Larry F. Matison, Pine Island, all of Minn.

[73] Assignee: International Business Machines Corporation, Armonk, N.Y.

[22] Filed: Dec. 27, 1972

[21] Appl. No.: 319,065

[52] U.S. Cl. .................. 318/685, 318/603, 318/696, 318/601
[51] Int. Cl. ............................................ G05b 1/00
[58] Field of Search ........... 318/696, 685, 601, 603, 318/561, 138, 254

[56] References Cited
UNITED STATES PATENTS

| | | | |
|---|---|---|---|
| 3,353,161 | 11/1967 | Toscano | 318/603 |
| 3,374,410 | 3/1968 | Cronquist et al. | 318/685 |
| 3,482,155 | 12/1969 | Fredriksen | 318/561 |
| 3,541,418 | 11/1970 | Agin et al. | 318/685 X |
| 3,586,953 | 6/1971 | Markkanen | 318/685 |
| 3,628,119 | 12/1971 | Abraham | 318/685 |
| 3,644,812 | 2/1972 | Bitto | 318/685 |

*Primary Examiner*—G. R. Simmons
*Attorney, Agent, or Firm*—Keith T. Bleuer

[57] ABSTRACT

A control system for a stepping motor operating on the bang-bang principle in which opposing torque is exerted on the rotor of the motor as the rotor oscillates across its desired or home position. The degree of rotation of the rotor is indicated by a digital encoder, and associated circuitry or microprogramming provides a return torque on the rotor for a predetermined time, such as 120 microseconds, if the rotor oscillates across and beyond its desired position less than that amount required to produce an output pulse of the encoder. If the degree of oscillation is greater so that one but not two encoder pulses is produced, return torque is maintained until an encoder pulse is received after the rotor has reversed direction, and then no torque is applied on the rotor. If the oscillation is greater than that required to produce two encoder pulses but less than three encoder pulses, reverse torque is maintained on the rotor until the rotor returns to a rotative position corresponding to one encoder pulse. Then a torque is applied onto the rotor in the same direction as that in which the rotor initially rotated limited however to 120 microseconds duration. There is an overlap of torques between the two and one encoder pulse positions of the rotor as it returns to its home position. For oscillations of the rotor greater than those mentioned, similar applications of torque are made, so that the rotor is eventually brought to its home position.

19 Claims, 24 Drawing Figures

3,842,331

| FIG. 3a | FIG. 3b | FIG. 3c | FIG. 3d | FIG. 3e | FIG. 3f |
|---|---|---|---|---|---|

DIGITAL STEPPING MOTOR CONTROL SYSTEM

CROSS REFERENCES TO RELATED APPLICATION

The invention disclosed herein is related to that disclosed in U.S. Pat. application, Ser. No. 319,088, Filed Dec. 27, 1972, for "Analog Stepping Motor Control System."

BACKGROUND OF THE INVENTION

The invention relates to stepping motors and more particularly to a digital control system for a stepping motor which operates on the bang-bang principle in which opposing torques are alternately applied unto a stepping motor rotor tending to return the rotor to its desired or home position subsequently to passage of the rotor through this position.

The bang-bang principle has previously been used in controlling stepping motors such as with the system disclosed in U.S. Pat. No. 3,241,015. This is a closed loop positional control system comprised of an arrangement for driving a load to selected positions, signaling circuitry for generating a positional error signal indicative of the difference between the position of the load and the selected position and control circuitry responsive to the error signal for operating the driving arrangement in such a manner as to reduce the error signal and the positional error to zero. The system operates to move the load at maximum acceleration until the mid-point between the initial and selected positions is reached and at maximum deceleration from the mid-point to the selected position. The positional error mid-point is determined by utilizing a first means for generating a rate feedback signal and a second means for generating a signal indicative of the square root of the difference between any instantaneous intermediate position and a pre-selected one of a plurality of mutually exclusive discrete reference positions (an error signal). These two signals are subtractively combined to provide a signal for determining the load mid-point position. The different signal is applied to a low level saturation amplifier which thus provides output signals proportional to the difference between the positional error and the rate signals until the difference reaches the saturation level.

SUMMARY OF THE INVENTION

It is an object of the present invention to provide an improved digitally operated control system for a stepping motor in which the rotor of the motor is infinitely positionable between poles, with the rotor being accurately and quickly positionable in the desired or home position therefor.

In a preferred form, the circuitry and microprogramming applies torque to the stepping motor to drive the rotor thereof back to the desired or home position as long as the rotor is moving away from the desired position and until the rotor has moved back toward the desired position some percentage of the last overshoot from desired position. The system is controlled by means of an encoder connected with the rotor so as to be a closed system, and provides a return torque on the rotor for a predetermined time (such as 120 microseconds, for example) if the rotor oscillates past its desired or home position less than that required to produce one pulse from the encoder. If the oscillation is greater so that the encoder produces one but not two encoder pulses, the system provides a return torque on the rotor until the rotor returns to a position at which the encoder produces a pulse; and thereafter, between this degree of rotation and home position, no torque is applied to the rotor. If the oscillation of the rotor is greater so that two but not three encoder pulses are produced during an oscillation, the return torque is maintained on the rotor until the rotor returns to a position differing by only one encoder pulse from home position, and thereupon the system provides a torque on the rotor which is in the same direction as the initial oscillation of the rotor limited, however, to a duration of 120 microseconds. There is an overlap of torques between the two and one encoder pulse positions of the rotor as it returns to its home position. Similarly, for greater oscillations of the rotor beyond the desired or home position, torques in the same and opposite directions are applied onto the rotor by the system.

BRIEF DESCRIPTION OF THE DRAWINGS

FIG. 3 is a diagram showing the manner in which FIGS. 3a to 3f are positioned together to form a complete diagram of the circuitry of the invention;

DESCRIPTION OF THE PREFERRED EMBODIMENTS

Figure 1:
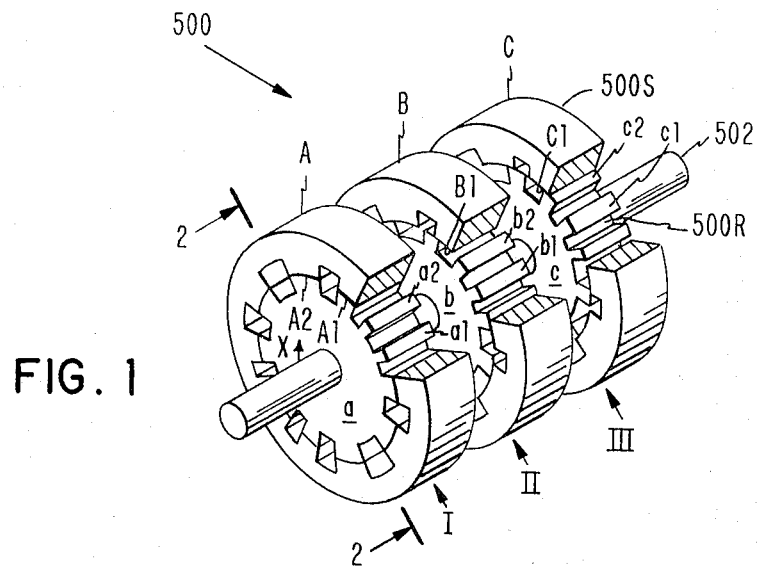
FIG. 1 is a perspective view of a stepping motor controllable by the circuitry and microprogram control unit of the invention.
Figure 2:
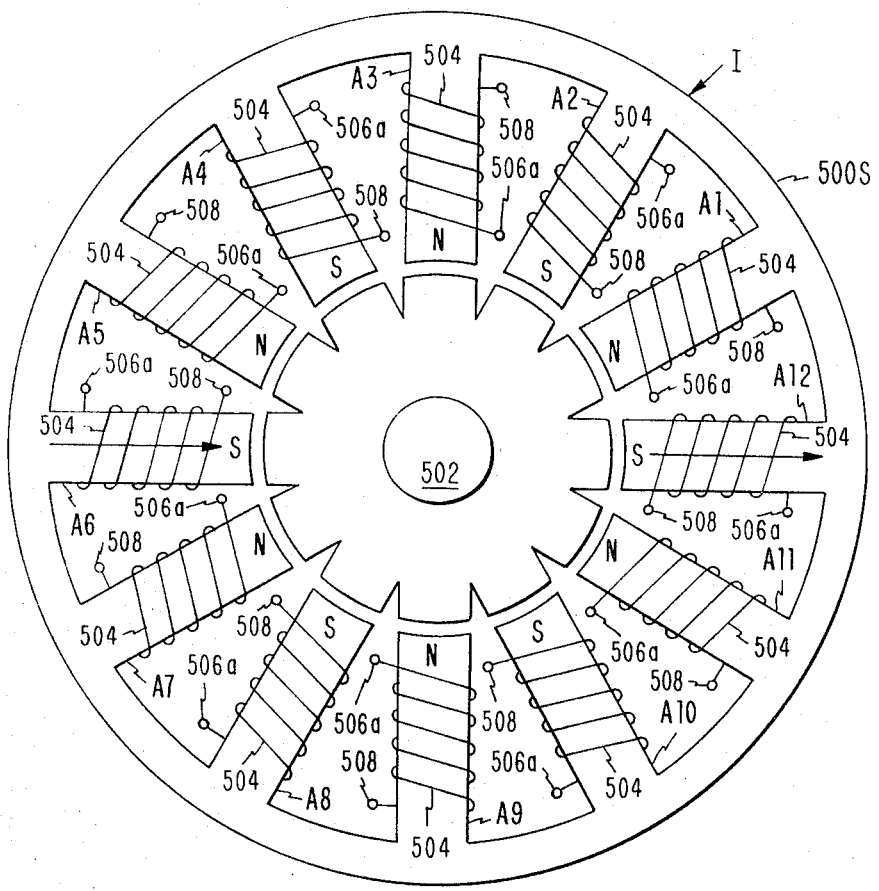
FIG. 2 is a sectional view of an enlarged scale taken on line 2—2 of FIG. 1.

Referring now to the drawings and in particular to FIGS. 1 and 2, a multiple stack variable reluctance stepping motor 500 is illustrated having a stator 500S and a rotor 500R. The stator is composed of parts A, B and C; and the rotor is composed of an equal number of parts a, b and c. The stator parts A, B and C each have 12 inwardly extending poles or teeth A1, A2, A3, B1, C1, etc.; and the rotor parts a, b and c each have the same number of outwardly extending poles or teeth a1, a2, b1, c1, etc., which align with the stator poles of the same phase, the rotor poles a1 to a12 aligning with the stator poles A1 to A12 of Phase I, for example. The stator parts A, B and C are magnetically and electrically independent; and the same is true of the rotor parts a, b and c except that the rotor parts are fixed on a common shaft 502. The rotor teeth a1 to a12 are in alignment with the teeth b1 to b12 and teeth c1 to c12 except that the rotor teeth of adjacent phases I, II, and III are offset by one third of a tooth pitch. Phase I is formed by parts A and a; phase II is formed by parts B and b; and phase III is formed by parts C and c. The tooth b1 is, for example, advanced one third of a tooth pitch with respect to the rotor tooth c1, and the rotor tooth a1 is advanced one third of a tooth pitch with respect to the rotor tooth b1. As the motor 500 is illustrated, with the rotor teeth a1 to a12 in alignment with the stator teeth A1 to A12, Phase I of the motor 500 is energized to cause this alignment. When Phase I is de-energized and Phase II is energized, the rotor parts a, b and c and shaft 102 turn clockwise in the direction of arrow X until the rotor teeth b1 to b12 are aligned with the stator teeth B1 to B12. If stator phases I, II and III are energized in the I, II, III, I, II sequence, the rotor parts a, b and c and shaft 502 step clockwise. In the 12 tooth design shown for motor 500, each step represents a ten degree rotation of the shaft 502 or 36 steps for each full revolution.

The stator poles A1 to A12 each have a winding 504 on them, and these windings are connected in parallel between terminals 506a and 508. It will be noted that half of the windings 504 have their inner ends connected to the terminal 508 while the remaining ones of the windings 504 have their inner ends connected to the terminal 506a. Thus, when a direct current voltage is connected between the terminals 508 and 506a, half of the stator poles A1 to A12 have their north ends at the center while the remaining ones of these stator poles have their south ends at the center. Phases II and III of motor 500 respectively have stator coils 510 and 512 (see FIG. 3f); and these have the same connections as the stator coils 504. The coils 510 are connected between terminals 506b and 514, and the coils 512 are connected between terminals 506c and 516. A source of direct current voltage 518 is connected between ground and terminals 506a, 506b and 506c through resistors 519a, 519b and 519c.

The motor 500 is connected by means of its shaft 502 with any desired mechanism 520 (see FIG. 3a) which should be given a certain rotation of less than 360°. Such a mechanism 520 may comprise an incrementer wheel 522 for propelling a punched document card 524 forwardly for certain distances. The motor 500 and wheel 522 may, for example, propel the card 524 forwardly for allowing the card 524 to be punched in adjacent columns between increments, utilizing any conventional punching machine.

An emitter or encoder 526 is driven by the motor shaft 502. The emitter provides clockwise pulses on line 528 and counterclockwise pulses on line 530 as the shaft 502 rotates and may, for example, provide such pulses for every tenth degree rotation of shaft 502. The emitter 526 may be of any suitable construction and may for example be an Itek, Digisec, R1-15C series encoder presently for sale by the Wayne-George Division, Christina Street, Newton, Massachusetts.

Referring to FIGS. 3a to 3f, the circuitry for controlling the motor 500 may be seen to comprise a 3600 count up/down master position counter 532, which is driven by the CW and CCW pulses on lines 528 and 530 connected to counter 532. The counter 532 may be a binary counter, and the various latches or positions in the counter are connected to compare circuitry 534. A desired position register 536, which may be a counter similar to the counter 532, has its various positions or latches connected with the compare circuitry 534 in the same manner as are the outputs of counter 532, and the register 536 may be loaded with information by means of a bus 538.

A special wave shaping network 540, the operation and results of which will be subsequently described, is connected to the output of the compare circuitry 534. A single shot 542 is connected to the output of the shaping network 540 and provides a "match" pulse on its output line 544. The line 544 is applied as inputs to AND circuits 546 and 548, and AND circuits 546 and 548 respectively also have the CW and CCW pulses applied to them by means of lines 528 and 530. The AND circuits 546 and 548 respectively have output lines 550 and 552 which respectively carry the signals "match CW" and "match CCW."

The lines 550 and 552 are respectively applied to the set and reset sides of a latch 554. The latch 554 has the output lines 556 and 558, with a signal being present on the line 556 when the latch 554 is in its set condition. Lines 556 and 558 respectively carry "CWMT" and CCWMT" signals.

The lines 556 and 558 are respectively applied onto AND circuits 560 and 562 which also have the lines 528 and 530 carrying the CW and CCW signals as inputs. The AND circuits 560 and 562 have their outputs connected to an OR circuit 564, and the OR circuit 564 has its output connected to the set side of a latch 566. The latch 566 provides a DREV (direction reversed) signal on an output line 568 when the latch 566 is set.

The line 556 carrying the CWMT signal is also connected to a pair of AND circuits 570 and 572, and the line 558 carrying the CCWMT signal is connected to AND circuits 574 and 576. The AND circuits 570 and 576 also have the line 528 carrying the CW signal as inputs, and the circuits 572 and 574 also have the line 530 carrying the CCW signal as inputs.

The outputs of the AND circuits 570 and 574 are connected with an OR circuit 578, and the outputs of the AND circuits 572 and 576 are connected with an OR circuit 580. An overshoot counter 582 has its "up" terminal connected to the output of the OR circuit 578 and has its "down" terminal connected to the output of the OR circuit 580. The counter 582 is, like the counter 532 and register 536, composed of a series of positions or latches; and the outputs of these are connected individually to an OR circuit 584. A line 586 constitutes the output of the OR circuit 584 and carries the signal EQ0 the details of which will be subsequently described. An inverter circuit 588 has its input connected to the line 586 and has its output connected to a line 590 carrying the inverse signal EQ0.

A trigger 592 has its triggering input connected to the output of the OR circuit 578, and the output of the trigger 592 is connected to the "up" input terminal of a divide by two counter 594. The counter 594, like the counters 582, 532 and 536, is composed of a series of positions or latches; and the individual outputs of these positions are connected to a compare circuit 596. The outputs of the individual positions of the counter 582 are likewise individually connected to the compare circuit 596, and the low order bit output of the counter 582 is connected to a line 598. The output of the compare circuit 596 is connected through an AND circuit 599 to a line 600 which carries a "SWITCH" signal. Line 600 is connected to the input of an inverter 602 to provide a $\overline{\text{SWITCH}}$ signal on a line 604 constituting the output of the inverter 602.

The line 600 carrying the "SWITCH" signal is applied onto AND circuits 606 and 608. The AND circuit 606 also has the lines 568 and 556 carrying the DREV and CWMT signals as inputs, and the AND circuit 608 has the line 568 and the line 558 carrying the CCWMT signal applied to it as inputs. The AND circuit 606 has its output applied to an OR circuit 610, and the OR circuit 610 also has the line 552 carrying the signal "match CCW" applied to it as an input. The line 612 is connected to the output of the OR circuit 610 and carries a signal "CWSET" which will be hereinafter described in greater detail. The outputs of the AND circuits 606 and 608 are applied onto an OR circuit 614, and the output of the OR circuit 614 is connected to the set terminal of a latch 616. A lead 618 is connected to the positive output of the latch 616, and the lead 618 constitutes inputs to AND circuits 620 and 622. The AND circuit 620 also has the leads 558, 604 and 528 as inputs, these leads respectively carrying the CCWMT, $\overline{\text{SWITCH}}$, and CW signals. The output of the AND circuit 620 is connected to an OR circuit 624, and the lead 550 carrying the "MATCH CW" signal constitutes a second input to the circuit 624. A line 626 is connected to the output of the OR circuit 624 and carries the signal "CW RESET" which will hereinafter be described in greater detail. The lines 612 and 626 are respectively connected to the set and reset sides of a "CW TORQUE LATCH" 628. The lines 612 and 626, as previously mentioned, respectively carry the signals "CW SET" and "CW RESET." A line 630 is connected to the output of the latch 628 and carries the signal "TTCW" which will hereinafter be described in greater detail.

An OR circuit 632 is connected to the output of the AND circuit 608 and in addition has the lead 550 carrying the signal "MATCH CW" as an input. A line 634 is connected to the output of the OR circuit 632 and carries the signal "CCW SET" which will be hereinafter described in greater detail. The line 634 is connected to the set side of a CCW torque latch 636, and a line 638 carrying the signal "TTCCW," which will be hereinafter described in greater detail, is connected to the output of the latch 636. An OR circuit 640 is connected to the output of AND circuit 622 and also has the line 552 carrying the signal "MATCH CCW" as an input. A line 642 is connected to the output of the OR circuit 640 and also with the reset side of the latch 636.

A pair of AND circuits 644 and 646 are connected to the line 568 carrying the "DREV" signal. The AND circuit 644 also has the line 598 carrying the "LOB" signal as an input. An inverter 648 has its input connected to the line 598 and has its output connected to the AND circuit 646 as a second input to the latter. The AND circuits 644 and 646 have their outputs respectively connected to the set and reset sides of an even count overshoot (ECO) latch 650, and a line 652 is connected to the minus output of the latch 650.

An OR circuit 654 has the line 590 carrying the signal "EQ0" as an input, and the OR circuit 654 has its output connected with a 120 microsecond single shot 656. The single shot has its output connected with AND circuits 658 and 660. The AND circuit 658 also has the lines 652, 590 and 630 as inputs, these respectively carrying the signals "ECO," "EQ0" and "TTCW." The AND circuit 660 also has lines 638, 652 and 590 as inputs, these lines respectively carrying the signals "TTCW," "ECO" and "EQ0."

An AND circuit 662 has the line 630 carrying the signal "TTCW" as an input and also has the line 586 carrying the signal "$\overline{\text{EQ0}}$" as an input. Another AND circuit 664 also has the line 586 as an input and, in addition, has as a second input the line 638 carrying the signal "TTCW."

An OR circuit 666 has as its inputs the outputs of the AND circuits 568 and 662, and a line 668 is connected to the output of the OR circuit 666 and carries the signal "TORQUE CW" to be hereinafter described in greater detail. An OR circuit 670 has the outputs of the two AND circuits 660 and 664 as its inputs, and a line 672 is connected to the output of the OR circuit 670 and carries the signal "TORQUE CCW" to be hereinafter described in greater detail.

Certain of the components previously described are reset under the control of single shots 674 and 676. Single shots 674 and 676 are connected to the output of the special wave shaping circuitry 540 and respectively provide the signals "RESET 1" and "RESET 2" on lines 678 and 680. The reset 1 signal on line 678 is applied to the latch 566, the latch 616 and the OR circuit 654. The reset 2 signal on line 680 is applied to the trigger 592 and to the counters 582 and 594. The single shots 674 and 676 have different timing characteristics for providing the two reset signals of different duration as will be hereinafter described in greater detail.

The line 668 carrying the "TORQUE CW" signal is connected to AND circuits 682, 684 and 686; and the line 672 carrying the "TORQUE CCW" signal is connected to AND circuits 688, 690 and 692. A 300 count up-down counter 694 is driven from the lines 528 and 530, and the counter 694 drives decodes 696, 698, 700, 702, 704 and 706. The decodes 696, 698, 700, 702, 704 and 706 respectively have their outputs connected to AND circuits 682, 684, 686, 688, 690 and 692. The decodes respectively have the ranges illustrated in FIG. 3e and decode the outputs of the counter 694 as will be hereinafter described in greater detail. The counter 694 is reset from reset logic 706.

The AND circuits 682 and 690 are connected to an OR circuit 708 having an output line 709; the AND circuits 684 and 692 are connected with a second OR circuit 710 having an output line 711; and the AND circuits 686 and 688 are connected with a third OR circuit 712 having an output line 713. Line 709 is connected with a chopper circuit 714a which may also be considered a "driver". The chopper circuit 714a comprises a source of direct current voltage 716, a compare circuit 718, an AND circuit 720, a transistor 722, resistors 724 and 726, a diode 727 and a direct current voltage source 728. The resistor 724 is connected between the voltage source 716 and the minus input of the compare circuit 718. The plus input of the circuit 718 is connected to the terminal 506a. The resistor 726 has one end connected with the resistor 724 and has its other end connected with the collector of the transistor 722 and with the terminal 508. The output of the compare circuit 718 is connected to one of the two inputs of the AND circuit 720, and the other input of AND circuit 720 is connected to the output of the OR circuit 708. The output of the AND circuit 720 is connected to the base of transistor 722. The diode 727 and battery 728 are connected in parallel with transistor 722.

A similar chopper circuit or driver 714b is connected to the coils 510 and to line 711 constituting the output of the OR circuit 710, and a similar chopper circuit 714c or driver is connected to the coils 512 and to line 713 constituting the output of the OR circuit 712. Chopper 714a may be said to constitute a driver No. 1; and similarly chopper 714b constitutes driver No. 2; and chopper 714c constitutes driver No. 3.

Slew mode control circuitry comprising a slew latch 729, AND circuits 730 and 732 and an inverter 734 is provided for causing the motor 500 to operate in a slew mode. The latch 729 has set and reset input terminals. The reset terminal is connected to the "match pulse" line 544, and the set terminal is connected to a line 736 adapted to have a "move pulse" applied to it. The negative output of the slew latch 728 is applied to a lead 738 which also constitutes one of the two inputs to AND circuit 599.

The AND circuit 730 has the lead 736 as one of its two inputs and has a lead 740 as its second input. The lead 740 is adapted to carry the "slew" direction signal which may be high or a logical one for clockwise rotation of rotor 500R and low or logical zero for counterclockwise rotation of rotor 500R. The line 740 is the input of the inverter circuit 734, and the output of the inverter circuit 734 constitutes one of the two inputs of the AND circuit 732. The lead 736 constitutes the second input of the AND circuit 732. Leads 742 and 744 are respectively connected to the outputs of the AND circuits 730 and 732 and respectively carry the signals "move CW" and "move CCW." The "move CCW" lead 742 is connected with the OR circuits 610 and 640 to be inputs thereof, and the "move CCW" lead 744 is connected with the OR circuits 632 and 624 to be inputs to these OR circuits.

In operation, the register 536 is provided with a count in it through the bus 538 that corresponds with the desired position of the rotor 500R. It is assumed that the rotor 500R has an initial position at zero degrees, and the register 536 may be provided with one to 3600 counts. The emitter 526 is assumed to provide a clockwise pulse in line 528 or a counterclockwise pulse in line 530, depending on whether the rotation is clockwise or counterclockwise, for each tenth degree of rotation of the rotor 500R. The rotor 500R is assumed to travel initially in the clockwise direction in slew mode as will be hereinafter described in greater detail, and the content of the master position counter 532 increases with the arc of rotation of rotor 500R, the CW pulses on line 528 being applied to counter 532 and causing it to count up. During this time, the windings 504, 510 and 512 are energized in a predetermined sequence so as to cause rotation of rotor 500R from its zero degree position toward its position corresponding to 50 counts, for example, in the counter 532. This count corresponds to a rotation of five degrees of rotor 500R assuming that the emitter 526 provides a pulse output for each tenth degree of rotation of rotor 500R. The energization of the windings 504, 510 and 512 is from the voltage source 518 and is accomplished by the action of the 300 count up-down counter 694. The clockwise pulses on line 528 are applied to this counter causing it to count up, and at the same time the TORQUE CW signal exists on line 668. As will be hereinafter described in greater detail, the decodes 696, 698 and 700 are effective under the control of the counter 694 so as to satisfy the AND circuits 682, 684 and 686 in the proper sequence so that the OR circuits 708, 710 and 712 conduct in the same sequence to energize the windings 504, 510 and 512 in the correct sequence to drive the rotor 500R clockwise.

Figure 4:
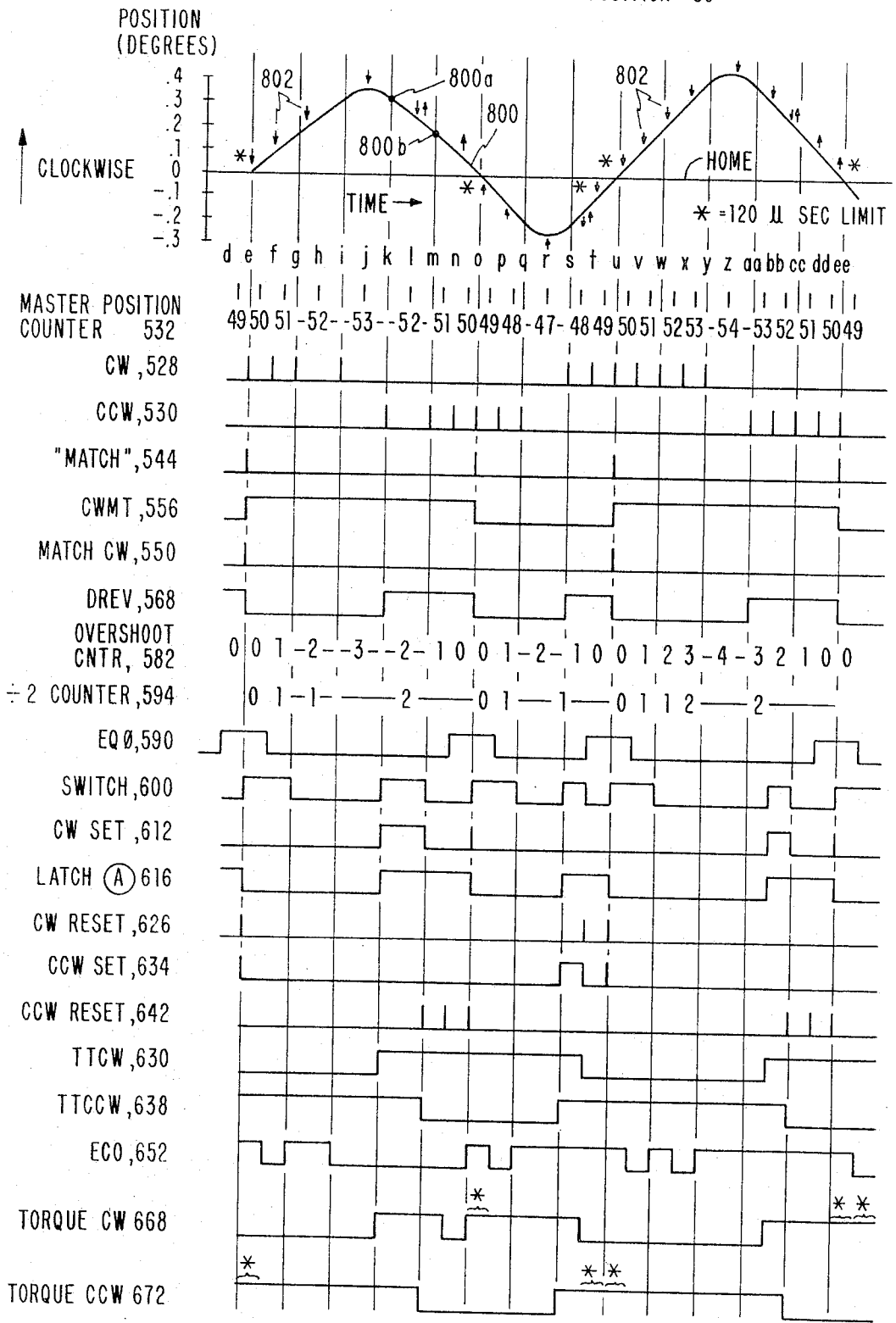
FIG. 4 is a diagram showing various signals present in the circuitry of FIGS. 3a to 3f in relation to oscillatory positions of the rotor of the stepping motor about its desired or home position.

Referring to FIG. 4, the curve 800 shows the position of the rotor 500R with respect to time, subsequent to the first crossing of the desired or home position of the rotor in its clockwise rotation. The desired or home rotor position is indicated by the zero ordinate, and it will be observed that the illustrated ordinates are from 0 to +0.4 and from 0 to −0.3. Assuming that the emitter 526, as before mentioned, provides an output clockwise or counterclockwise pulse on lines 528 and 530 for each tenth degree of rotation, a CW pulse or a CCW pulse is provided each time that the curve 800 crosses one of the tenth degree ordinates. This is illustrated by the CW curve 528 and the CCW curve 530 in FIG. 4, the CW pulses occurring for clockwise rotation of the rotor 500R and the CCW pulses occurring for counterclockwise rotation of the rotor 500R. The arrows 802 indicate the torque that the stator 500S provides at the various times on the rotor 500R by operation of the illustrated circuitry. Once the rotor 500R has crossed its home position at zero ordinate at time e, then the torque is in the counter clockwise direction, tending to return the rotor 500R back to its home position; and the torques indicated by the arrows 802 in each case oppose the motion of the rotor 500R in overshooting its home position as is apparent from FIG. 4. For the particular case given, the desired position register 536 has been loaded with the count of 50, and the desired home position is between the counts of 49 and 50 which would respectively be provided by 49 and 50 CW pulses on line 528. Under these conditions, every time that the counter 532 has its content going from 49 to 50 or from 50 to 49, the curve 800 crosses the zero ordinate indicating the desired or home position. The "match" signal 544 as shown in FIG. 4 may be seen to be up and in the form of a spike every time that the rotor crosses its home position and the curve 800 crosses the zero ordinate. At this time, the contents of the desired position register 536 and the master position counter 532 are the same, so that the compare circuitry 534 is satisfied and produces an output signal. This output signal is of substantial length timewise, and the special wave shaping circuitry 540 produces a much shortened pulse that occurs at the rise of the output of the compare circuitry 534. The "match" signal on line 544 is a spike as before mentioned, and this is produced by the single shot 542.

The CWMT or "clockwise match" signal 556 is derived from a match pulse on line 544 and a clockwise pulse on 528. These two signals are applied to the AND circuit 546, and the circuit 546 thus provides an output signal and sets the latch 554 ao as to provide the CWMT signal. The latch 554 also provides a counterclockwise match signal on the line 558 and this is just the inverse of the CWMT signal on line 556. The latch 554 is reset by the action of a match pulse together with the counterclockwise pulse (on line 530) both applied to the AND circuit 548 which provides the reset signal to latch 554.

The output of the AND circuit 546 on the line 550 is a "match clockwise" or "match CW" pulse which simply constitutes a match pulse gated through by a clockwise pulse. A match pulse on line 544 occurs whenever the rotor 500R passes through its home position, and the match clockwise pulse on line 550 occurs only when the rotor 500R passes through the home position in the clockwise direction. Likewise, the AND clockwise 548 produces a match counterclockwise or CCW pulse on line 552 only when the rotor 500R passes through its home position going in the counterclockwise position.

The signal "direction reversed" or "DREV" on line 568 indicates that the rotor direction of rotation was reversed and, referring to FIG. 4, may be seen to go low when the rotor 500R crosses the desired home position when traveling in the clockwise direction. This signal goes high subsequently on the occurrence of the first counterclockwise pulse on line 530, indicating that the direction of the rotor has reversed and that the rotor 500R has passed its peak point of clockwise travel. The latch 566 produces the DREV signal on its output line 568, and the latch 566 is set to cause the DREV signal to go to its upper value on the clockwise match and counterclockwise match signals on lines 556 and 558. These signals are applied onto AND circuits 560 and 562, and the AND circuit 560 having the CWMT and CCW signals applied to it provides a set signal through OR circuit 564 to set the latch 566 and provide the DREV signal on line 568 on the first counterclockwise pulse occurring when the latch 566 is in unset condition. Likewise, the AND circuit 562 will provide a raised DREV signal on the first clockwise pulse occurring when the latch 566 is in unset condition. The latch 566 is reset under control of the single shot 674, substantially at the time the rotor 500R passes through its home position.

The two counters 582 and 594, like the counter 532, are actuated by the clockwise and counter-clockwise pulses on lines 528 and 530; however, the counters 582 and 594 may be substantially smaller than the counter 532, since they need only to measure the maximum overshoot that the rotor 500R may have. The counter 582 is an up-down counter and counts along with the master position counter 532 except for the fact that the content of the overshoot counter 582 is zero when the master counter contains the count of 50 and when the rotor 500R is rotating in the clockwise direction, or when the master position counter 532 contains the count of 49 and the rotor 500R is rotating in the counterclockwise direction. Thus, the content of the overshoot counter 582 is zero on either side of the desired position which in this case is between the counts 49 and 50 in the master position counter 532. The count in the overshoot counter 582 goes up when the rotor 500R is traveling away from the desired position and goes down when the rotor is traveling toward the desired position. The divide by two counter 594 has a content of zero at the same time as the content of zero exists in the counter 582, and the counter 594 counts up along with the counter 582. The first count in the counter 594 comes at the same time as the first count in the counter 582 but subsequently the up counts in the counter 594 come every second count in the counter 582. Referring to FIG. 4, the corresponding contents of the contents 582 and 594 are indicated; and, as will be observed, as the overshoot counter 582 counts up 1, 2, 3, 4, the corresponding counts in the counter 594 are 1, 1, 2.

The AND circuits 570 and 574 account for the up-counting action within the overshoot counter 582, and the AND circuits 572 and 576 account for the down-counting action of the counter 582. The signals from these AND circuits are directed through the OR circuits 578 and 580 to the up and down input terminals of the counter 582 as is apparent. The AND circuit 570 will cause an up counting action by counter 582 due to the CW pulses on line 528 when the clockwise match signal exists in line 556 due to the setting of the latch 554, and the AND circuit 574 also causes an up counting to occur under the action of the counterclockwise signals in line 530 assuming that the latch 554 is not set and therefore that the CCWMT signal is up. The down-counting action of the counter 582 is caused to occur when the clockwise match signal is up on line 556, and rotation of the rotor in the counterclockwise direction causes the CCW signal on line 530, thus satisfying AND circuit 572. A similar down-counting action occurs when the CCWMT signal is up, due to the latch 554 being reset, under the action of the clockwise signals on line 528 to satisfy AND circuit 576.

The trigger 592 is of such construction that the leading edge of a pulse applied to its reverses the state of Q and $\overline{Q}$, its outputs. Thus, the first output from OR circuit 578 triggers the trigger 592 providing an output pulse applied to the counter 594; however, the subsequent pulse output of OR circuit 578 simply reverses the state of the trigger 592 without providing an input to the counter 594, causing the counter 594 to have the counting action above described. The counters 582 and 594 are reset by the reset 2 signal on line 680 which is derived from the single shot 676 that is in turn energized from the compare circuitry 534 through the wave shaping circuitry 540.

The "equal to zero" (EQ0) signal on line 590 is shown in FIG. 4 and is up when the contents of the overshoot counter 582 is zero. As will be observed, the OR circuit 594 has all of the outputs from the various positions of the counter 582 applied to it; and, thus when the counter 582 is empty, there is no output from the OR circuit 584. Thus, the signal EQ0 constituting the output of the inverter 588 is up under these conditions, and the signal $\overline{EQ0}$ is down to zero. More precisely, the EQ0 signal is up and the signal $\overline{EQ0}$ is down as long as the rotor 500R is positioned within one tenth degree of either side of the desired home position of the rotor.

The "switch" signal on line 600 exists when the contents of the overshoot counter 582 equals the contents of the divide by two counter 594. This condition may occur after the overshoot counter 582 has reached its maximum count and has started coming down in content so that the contents of the counters 582 and 594 match, bearing in mind that the counter 594 does not count upwardly as fast as the counter 582. In particular, the compare circuitry 596 produces the switch signal under these conditions, causing the switch signal to raise when motor 500R has come back to about one-half the distance from maximum overshoot to home position. The switch signal on line 600 thus raises at times k and bb, for example, as shown in FIG. 4.

The AND circuit 606 combines the clockwise match, switch and direction reversed signals and produces the "clockwise set" or "CW set" signal on line 612 when these three signals are all up. The DREV signal is produced, as previously described, just subsequent to a reversal in direction of the rotor 500R; the switch signal is up as just described shortly after the direction of rotation of the rotor 500R reverses; and the clockwise match signal is up subsequent to a passage of the rotor over its home position, so that the clockwise set signal on line 612 raises at this time, such as at time k. The CW set signal passes from the AND circuit 606 through the OR circuit 610 to line 612. The CW set signal on line 612 is similarly raised at time bb when the switch signal raises; however, it will be noted that the DREV signal has raised previously, indicating the time at which the rotor 500R has just passed a point of maximum oscillation. The switch and DREV signals do not raise in this case in exact correspondence, since the rotor 500R has overshot its desired position to a greater extent at this time than at the previous time. The switch signal indicates, due to the action of the two counters 582 and 594, the time at which the rotor 500R has come back approximately one-half the distance from a maximum overshoot to the desired home position, providing a switch point of torque as will be subsequently explained; and the switch signal on line 600 is controlling as compared to the DREV signal in producing the CW set signal.

It will be noted that the match counterclockwise signal on line 552 is also applied onto the OR circuit 610 to produce the CW set signal. The match CCW signal is a pulse, similar to the match CW pulses on line 550, that occurs when the rotor 500R passes across its desired home position and in the counterclockwise direction. For both cases in which the clockwise set or CW set signal appears, it functions so as to produce a clockwise torque on the rotor 500R due to the particular energizations given the stator windings 504, 510 and 512. To produce this result, the CW set signal on line 612 is applied to and sets the CW torque latch 628, thus producing the signal "total torque clockwise" (TTCW) on line 630.

The CW torque latch 628 is reset under the action of the latch 616 and AND circuit 620 producing a reset signal on line 626 through OR circuit 624. The latch 628 should be reset at a time when the rotor 500R has just crossed, gone beyond and is on its way back to the home position. It will be noted that the latch 616 is set through the OR circuit 614 whenever the CW set signal appears on line 612 (due to the action of AND circuit 606) so as to provide one of the necessary input signals to AND circuit 620. The counterclockwise match signal must also be present on line 558 indicating that the rotor 500R is passing over home position in the counterclockwise direction; the clockwise signal on line 528 also applied to the AND circuit 620 indicates that the rotor is moving in the clockwise direction; and the switch signal also on AND circuit 620 indicates that there is no correspondence of the contents of the counters 582 and 594. At this time, the latch 628 is reset, reducing the TTCW signal to zero.

The AND circuit 608, the OR circuit 632, the CCW torque latch 636, the AND circuit 622 and the OR circuit 640 correspond to and function the same as the components 606, 610, 628, 620 and 624, the operation of which has just been described, except that the latch 636 is effective for producing the total torque counterclockwise (TTCCW) signal on line 638 which is indicated in FIG. 4.

The difference between the torque CW signal on line 668 and the total torque clockwise signal on line 630 is the fact that the TTCW signal does not have incorporated therein the influence of the rotor 500R in being in a narrow band between plus and minus one tenth degree from home position. In this band, between plus one tenth degree and minus one tenth degree, it is desirable that no torque at all be applied upon the rotor 500R of that torque be applied for only a duration of 120 microseconds; and the circuitry including the single shot 656 and AND circuits 662, 658, 660 and 664 accomplishes this result. The same differences exist between the total torque clockwise signal on line 638 and the torque clockwise signal on line 672. Whether torque for only 120 microseconds or no torque at all is applied at this time onto the rotor 500R is determined particularly by the amount that the rotor 500R had just previously overshot its desired home position. The even count overshoot (ECO) signal on line 652, in particular, is determinative in this respect and indicates the time the torque CW signal on line 668 should be up and thus the time of application of clockwise torque to the rotor 500R. The ECO signal is ignored at any time that the rotor 500R is outside of this plus or minus one tenth degree narrow band at home position. Once the rotor 500R is within this narrow band, however, the torque applied to the rotor 500R and the torque CW signal (or the torque CCW signal if counterclockwise torque is necessary) are up only as long as the ECO signal is up. The ECO signal is only utilized when the rotor 500R is in its zero band (between plug one tenth degree and minus one tenth degree), although the ECO signal may actually be up at other times.

The ECO signal on line 652 is up when the maximum overshoot of the rotor 500R from home position is an even count (0.2°, 0.4°, etc.). In particular, the latch 650 when it is in reset condition, provides the ECO signal on line 652, and resetting of latch 650 is under the control of AND circuit 646 and inverter 648. The inverter 648 is under control of the low order bit signal on line 598 which exists when the rotor 500R has overshot its home position by an uneven number, such as 0.1°, 0.3°, etc. The inverter 648 thus provides an output signal that exists on even tenth degrees of rotor overshoot, and AND circuit 646 is thus satisfied at these times and also when the DREV signal exists on line 568 just after the rotor 500R has reversed its direction of oscillation. The latch 650 is thus reset for even tenth degrees of overshoot by the rotor and also when the DREV signal exists.

The EQ0 signal applied to the OR circuit 654 causes the 120 microseconds single shot 656 to be active to produce an output signal. The AND circuit 658 produces the torque CW signal through OR circuit 666 corresponding to the 120 microsecond output of single shot 656, assuming that the TTCW signal is up, that the rotor 500R has overshot by an even count raising the EC0 signal and that the rotor is in the zero band with the signal EQ0 being up. Under these conditions, the four inputs to the AND circuits 658 are present, and this AND circuit 658 is satisfied. If the rotor 500R has oscillated less than 0.2° from home position, the ECO signal on line 652 does not exist; and thus AND circuit 658 cannot be satisfied and the torque CW signal thus is low and is not held up for 120 microseconds by the single shot 656 when the rotor 500R is within the zero band under these conditions. The AND circuit 662 is effective to provide a raised torque CW signal when the rotor 500R is outside of the zero band and the TTCW signal is high. The signal $\overline{EQ0}$ under these conditions is high, so that the AND circuit 662 is satisified.

The AND circuits 660 and 664 and the OR circuit 670 cooperate with the single shot 656 for producing the torque CCW signal on line 672 to apply counterclockwise torque on the rotor 500R in the same manner as has been explained for producing the torque CW signal utilizing the AND circuits 662 and 658 and the OR circuit 666.

The counter 694 together with the decode circuits 696, 698, 700, 702, 704 and 706 determine which of the various stator windings are energized for providing the applications of torque necessary for bringing the rotor 500R to its final home position. The torque CW signal on line 668 is up when the circuitry calls for torque in the clockwise direction, and this signal is applied onto the AND circuits 682, 684 and 686. The counter 694 has the clockwise pulses on line 528 applied as an input, causing the counter 694 to count up. At the count in counter 694 increases from zero toward the count of 65, with clockwise rotation of the rotor 500R and with one count occurring for each tenth degree of rotation of the rotor, decode 696 provides an output. AND circuit 682 is thus enabled so as to provide an output signal from OR circuit 708 that is impressed onto the terminal 508 of stator A through chopper 714a. The current through the windings 504 is maintained between 5 amperes and 7 amperes by the chopper 714a as will be subsequently described. When the count in counter 694 reaches the count of 66 (on a rotation of the rotor for 6.6 degrees from its zero position) decode 696 becomes inactive and decode 698 becomes active. The output of decode 698 maintains the AND circuit 684 enabled for the next 10 degrees of rotor rotation (corresponding to 100 counts in the counter 694), and during this time OR circuit 710 has an output so as to maintain the stator windings 510 energized and maintain a clockwise torque on rotor 500R. Subsequently, decode 700 becomes effective after the count in counter 694 reaches the count of 166, and at this time OR circuit 712 has an output to maintain the windings 512 of stator 500S energized.

In the event that the rotor 500R is rotating in the counterclockwise direction, the counterclockwise pulses on line 530 exist in lieu of any CW pulses on line 528; the counter 694 counts downwardly; and the decodes 696, 698 and 700 are effective in the same manner as just described.

If the circuitry calls for a torque to be applied in the counterclockwise direction, the torque CCW signal is present on line 672 instead of the torque CW signal on line 668; and, in this case, the AND circuits 688, 690 and 692 are effective. Assuming that the rotor 500R is in its zero position, with a count of zero existing in the counter 694, the decode 702 will first be effective, producing an output that enables AND circuit 688 and provides an output from OR circuit 712 onto the windings 512 of stator 500S. The decode 704 is effective for counts of 336 to 135, and the decode 706 is effective for counts 136 to 235 for respectively enabling AND circuits 690 and 692 and for respectively energizing the stator windings 504 and 510 of stator parts A and C. The decodes 702, 704 and 706 function basically substantially the same as the decodes 696, 698 and 700, the operation of which has been described in some detail.

The chopper 714a operates to provide a current through the coils 504 that varies between predetermined limits, such as between 5 amperes and 7 amperes, so as thus to in effect regulate current flow through these coils. The driver No. 1 signal on line 709 is assumed to be "up," and the comparator 718 provides an output and a second input signal on AND circuit 720 when the plus input to comparator 718 is higher than the minus input to the comparator. The output of the AND circuit 720 is effective on the base of the transistor 722, so that the transistor 722 at this time conducts. Current then flows through the coils 504 and resistor 519a. The effect of this current flow, however, through resistor 519a is to lower the + input to the comparator 718 so that the AND circuit 720 is disabled and conduction ceases through the transistor 722. At this time, current passing through coils 504 changes to diode 727 from transistor 722 and begins to decrease in amplitude. This continues until the drop across resistor 519a is such that the + input of comparator 718 is greater than the negative input, and at this time the transistor turns on again and current through coils 504 begins to increase.

It should be noted that, when the current is increasing in coils 504, the + input of the comparator 718 is falling. The voltage at which the comparator 718 switches is set by the reference EMF source 716 modified by a delta voltage produced by resistors 724 and 726. When the transistor 722 is on, the voltage of the negative input to the comparator 718 is reduced below the reference voltage (from battery 716) by the voltage divider formed by resistors 724 and 726. As soon as the transistor 722 is turned off, the voltage input to the comparator 718 from resistor 519a is increased above the reference voltage derived from resistors 724 and 726. The delta voltage across the comparator input side due to resistors 724 and 726 establishes the delta current varation which is allowed in coils 504 and also determined the period of the chopper 714a.

The choppers 714b and 714c are of similar construction and operation as chopper 714a.

To briefly recapitulate with respect to the operation of the circuitry as described above, in connection with FIG. 4, it will be observed that, after the rotor 500R passes its home position at time e traveling in the clockwise direction (from 0 or home position to +0.4 position), a counterclockwise torque (indicated by arrows 802) is maintained on the rotor tending to move it back toward its home position. This counterclockwise torque is provided for the torque CCW signal on line 672 which is raised at this time. At time j, the rotor 500R reaches its maximum oscillation, just beyond +0.3 degrees, and begins to return to home position. The torque CCW signal on line 672 remains raised and before it falls, the torque CW signal on line 668 raises, there being an overlap between the torque CW and torque CCW signals between times k and m, about halfway between the point of maximum oscillation and home position. The overlap is provided, since the current build-up in the stator windings is not instantaneous due to the inductance of the stator windings. Thus, in addition to the counterclockwise torque, at this time (between times k and m, between points 800a an 800b) a clockwise torque is applied onto the rotor 500R tending to retard it in its movement in the counterclockwise direction toward home position. The torque CW signal is raised on line 668 at this time data in particular to the switch signal on line 600 which is the result of the compare circuitry 596 having the counts of the overshoot counter 582 and the divide by two counter 594 applied to it. As previously described, the AND circuit 606 produces the CW set signal on line 612 which eventually results in the torque CW signal on line 668, and the AND circuit 606 has the switch signal and the DREV signal applied to it as inputs. The use of the DREV signal in this connection assures that the torque CW signal on line 268 raises subsequently to the point of maximum oscillation of the rotor 500R which occurs at time j shown in FIG. 4. The action of the circuitry in providing the reverse torques, contrary to the direction of oscillation of the rotor 500R for the remainder of the oscillations of the rotor as shown in FIG. 4, occurs in substantially the same manner. It will be noted that both counterclockwise and clockwise torques are applied onto the rotor 500R by the stator windings at time cc, and this time again occurs at the point at which the rotor 500R has traveled about half-way between its point of maximum oscillation and the home position. It will be noted that at time bb at which the torque CW signal on line 668 raises, the switch signal on line 600 raises; and this is the controlling signal at this time, rather than the DREV signal on line 568, that causes the raising of the torque CW signal, since the rotor 500R has oscillated during its second oscillation to a point (+0.4) which is a little farther than before as measured from the home position.

Figure 5:
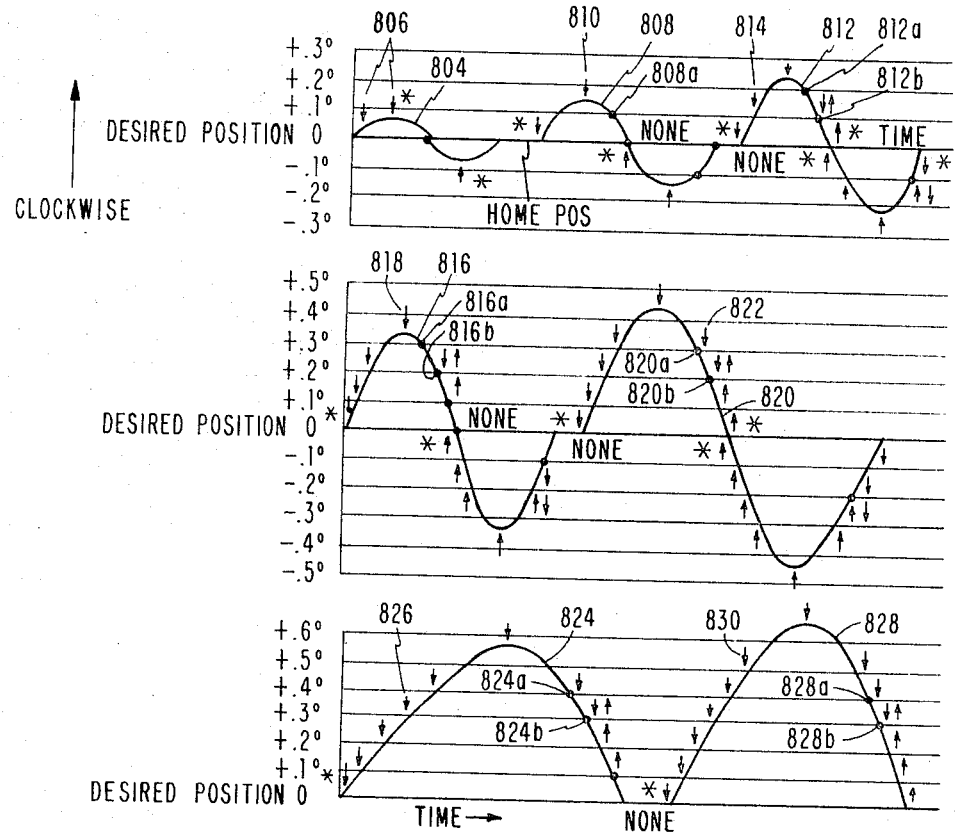
FIG. 5 is a diagram showing the torques applied to the stepping motor rotor for various degrees of oscillation of the rotor about its home position.

FIG. 5 may be referred to for an understanding of the manner in which the applications of torque to the rotor 500R differ for different amplitudes of oscillation of the motor about its desired or home position. The desired rotor position in each of the cases is shown as zero on the ordinate scale, with the rotor 500R being shown as oscillating to less than plus or minus one tenth degree, plus or minus two tenths degree, etc. The abscissa in each case represents time, similarly to the absissa for the curve 800 in FIG. 4.

Curve 804 shows the conditions existing after the rotor 500R has passed its desired position, traveling in the clockwise direction, with the rotor 500R oscillaring less than one tenth degree from the desired position. As the rotor 500R passes its home position, counterclockwise torque is applied to the rotor, this being represented by the arrows 806. This torque is due to the raising of the torque CCW signal on line 672. This counterclockwise torque is maintained, and the torque CCW signal is up only for 120 microseconds after the rotor 500R passes the home position; and this is due to the single shot 656 which is actuated by the EQ0 signal existing when the rotor is within the narrow home range of plus or minus one tenth degree. If the rotor 500R oscillates beyond the home position in the counterclockwise direction as indicated by the curve 804, the same condition applies: the clockwise torque is applied for 120 microseconds after the rotor first crosses its home position so as to tend to return the rotor 500R to its home position. When the rotor stays within the home range of plus or minus one tenth degree as just described, the friction of the motor 500 and of the element driven thereby, such as the card 524, is utilized for stopping the rotor 500R in a final position at rest.

Curve 808 illustrates the condition in which the rotor 500R oscillates for more than one tenth degree after initially passing its desired home position. The torque shown by the arrows 810 is initially in the counterclockwise direction, tending to return the rotor to the home position; and no torque is applied as the rotor moves toward home position from point 808a at +0.1 degree. The single shot 656 is again effective for holding the torque applied and terminating the signals on lines 668 and 672, 120 microseconds after the rotor 500R initially passes through its home position.

The curve 812 illustrates the application of torque on the rotor 500R indicated by arrows 814 when the rotor oscillates beyond 0.2°. Assuming the rotor 500R is crossing its home position in the clockwise direction, the torque applied to the rotor is in the counterclockwise direction; and approximately midway between the maximum oscillation and the home position, between points 812a and 812b, both clockwise and counterclockwise torque is applied to the rotor. These points are similar to the points 800a and 800b in FIG. 4 and are caused by the overlapping of the torque CW and torque CCW signals particularly under the condition in which the clockwise torque is applied before the rotor actually reaches its home position in going in the counterclockwise direction. As the rotor 500R approaches its home position again traveling in the clockwise direction, the single shot 656 is effective to limit the application of the torque in the counterclockwise direction to 120 microseconds.

Curve 816 illustrates the application of torque on the rotor by the arrows 818 under the condition in which the rotor oscillates more than 0.3° from its home position. Both clockwise and counterclockwise torque is applied at between the points 816a, 816b, which, as will be noted, are at +0.3° and +0.2°. The positions of the point 816a and 816b may be contrasted with the positions of the points 812a and 812b at +0.2° and at +0.1° and the earlier application of the clockwise torque in the case of curve 812 is due to the earlier incidence of the DREV and switch signals on lines 568 and 600 applied to AND circuit 606. In the zero band, there is no application of torque onto the rotor due to the effect of the signal EQ0 on the circuits 658 and 660.

Curve 820 illustrates the application of torque, designated by arrows 822, in the case in which the rotor 500R oscillates more than 0.4° after passing the home position. This is much the same as the previous case, and both clockwise and counterclockwise torques are applied between points 820a and 820b.

Curve 824 illustrates the condition in which the rotor 500R initially moves more than .5 degree after initially crossing its desired position, with the torque applied being indicated by the arrows 826. The curve 824 is much like the curve 820 except that, in this case, the points 824a and 824b between which both clockwise and counterclockwise torques are applied onto the rotor exists at +0.4° and +0.3°. The change at which counterclockwise torque is applied onto the rotor 500R takes place because of the action of the counters 582 and 594 in hastening the switch signal on lead 600.

Curve 828 illustrates the condition in which the rotor 500R moves more than +0.6° in oscillation after initially passing its home position, and the torque applied is indicated by the arrows 830. In this case, the points 828a and 820b between which both clockwise and counterclockwise torques are applied onto the rotor 500R exist at the same position as the points 824a and 824b in connection with the preceding case. The circuits 582, 594 and 596 cooperate as before in producing the switch signal on line 600 at the +0.3° position of the rotor.

In the event that the rotor 500R oscillates farther from its home position after initially passing its home position than shown by the curve 828, the curve showing the rotor position with respect to time will nevertheless be substantially the same as curve 828 in that the points between which both clockwise and counterclockwise torques are applied to the rotor on its return oscillation will be at approximately midway between home position and the point of maximum oscillation.

The algorithm for carrying the rotor 500R to its desired or home position is apparent particularly from FIG. 5 and may be concisely stated as follows. It is assumed that the rotor 500R moves from its initial position to its final position in the clockwise direction, but the same principles apply if the movement is in the counterclockwise direction:

1. If the rotor 500R oscillates in the clockwise direction for less than one clockwise pulse or 0.1° (note curve 804), counterclockwise torque is applied onto the rotor; and this is limited to 120 microseconds (by single shot 656). The complete oscillation, after the rotor once crosses home position until it again reaches home position, may or may not take less than the 120 microseconds. Obviously, this period of 120 microseconds can be varied if desired.

2. If the rotor 500R oscillates farther than that at which a first clockwise pulse is provided by emitter 526 but less than 0.2° (see curve 808), counterclockwise torque is applied onto the rotor; and this is limited to the 120 microsecond period in the zero band (between −0.1° and +0.1°). Once the rotor crosses the +0.1° position in the clockwise direction, the 120 microsecond time limit is ignored and counterclockwise torque is always applied. When the rotor again crosses the +0.1° position in the counterclockwise direction, no torque is applied onto the rotor until it again crosses its home position.

3. Referring to curve 812, if the rotor 500R oscillates more than +0.2°, counterclockwise torque is maintained on the rotor until the rotor returns about halfway between its point of maximum clockwise oscillation and its home position; and both counterclockwise and clockwise torques are applied onto the rotor between points 812a and 812b. The 120 microsecond period is effective in the zero band on the clockwise and counterclockwise torques.

4. If the rotor 500R has a maximum initial oscillation from home position of X = (Y × 0.1°) but less than + (X + 0.1°) where Y is an odd integer greater than or equal to 3, restoring counterclockwise torque is applied until the "switch point" is reached. The switch point is that point which occurs at a tenth degree position of the rotor after the rotor has changed direction and as emitter 526 is producing a counterclockwise pulse and which is further determined by the equation S=(X+0.3°)/2. Curves 816 and 824 are illustrative of such oscillations and have switch points 816a and 824a. At the switch point, both clockwise and counterclockwise torques are initiated and are held maintained until the next counterclockwise pulse occurs at position (S−0.1°) (points 816b and 824b). At the latter point, only clockwise torque is applied until the zero band is reached, the zero band being the band from −0.2° to +0.1°. When the zero band is reached, all of the drivers are de-energzed, and no torque is applied to the rotor.

5. If the rotor 500R oscillates to X=(Y × 0.1°) but less than + (X+0.1°) where Y is an even integer greater than or equal to 4, restoring counterclockwise torque is appled until the "switch point" is reached. The switch point is similar to the switch point just above mentioned and occurs after the rotor 500R has changed direction and when the emitter 526 is producing a counterclockwise pulse. In particular, the "switch point" is determined by the equation S=(X+0.2°)/2. Curves 820 and 828 are illustrative of this condition. At the switch point (points 820a and 828a on curves 820 and 828) both counterclockwise and clockwise torques are initiated, and these are maintained until the next counterclockwise pulse (S−0.1°) is received. These are points 820b and 828b on the curves 820 and 828. At the latter points, only clockwise torque is applied as will be noted from these curves until the zero hand is reached. At this time, the 120 microsecond time limit is invoked, and clockwise torque is applied for a maximum of 120 microseconds. If the home position is not crossed by the rotor in 120 microseconds, all drivers are de-energized, and no torque is applied to the rotor.

It should be noted that in both cases 4 and 5 just above mentioned, the 120 microsecond time limit applies as the rotor first crosses its home position, traveling in the clockwise direction. This time limit also applies as the rotor subsequently nears its home position when restoring torque is applied; however, as will be apparent from a subsequent description of a microcontrol program unit together with its program for providing substantially the same results, the 120 microsecond time limit is not effective as the rotor nears its home position on subsequent crossings using the microcontrol program unit. The 120 microsecond limit on torque application is not very important for maximum oscillations of +0.4° and greater, since these seldom occur.

The reasons that no torque is applied as the rotor nears its home position after initially crossing an odd tenth degree position as in paragraph 4 above while torque is applied as the rotor nears its home postion after the rotor has initially oscillated to an even tenth degree as in paragraph 5 above is so that the clockwise and counterclockwise torques on a movement of the rotor toward its home position after the point of maximum oscillation may nearly balance. This is desirable since the point of maximum oscillation of the rotor after initially crossing its home position is a zero energy position; and it is desired that, as the rotor subsequently passes through its home position, the rotor have zero energy at this point also, in order that the rotor shall come to rest at its home position.

Referring to curve 820, it will be observed that counterclockwise torque is effective at the point of maximum oscillation, at +.3 degrees and also at +0.2° at which there is an overlapping of torques. Thus, counterclockwise torque is effective for about (0.4°–0.2°) or 0.2°. Clockwise torque is effective on the rotor from +0.2° to 0° which is also for about 0.2°, so that the counterclockwise torque is effective for about the same time as clockwise torque as the rotor moves from its point of maximum oscillation to its home position. Referring to curve 816, it will be observed that counterclockwise torque is effective at the point of maximum oscillation and that this torque remains effective until +0.2° at which there is an overlapping of torques. Clockwise torque is effective from +0.2° to +0.1°, and thus the clockwise and counterclockwise torques on the rotor substantially balance as the rotor returns to its home position. Similar balancing of torques takes place for maximum oscillations of greater than +0.4° and covered by cases 4 and 5 above.

The slew control circuitry comprising the slew latch 729 and AND circuits 730 and 732 is under the control of a "move" pulse applied to line 736. Such a pulse, for example, can originate in punching equipment (not shown) for punching document cards 524, supplying this pulse when a punching action has been completed. It is assumed that the rotor 500R is at a zero degree position at this time, with there being a certain count in desired position register 536 representing the desired new position of the rotor, so that there is no "match" pulse on line 542 at this time. The direction of movement of the rotor 500R is determined by a slew direction signal applied to lead 740 and inverter 734, with an up or logical 1 signal on lead 740 indicating the clockwise direction of rotation and a down or logical zero signal on lead 740 indicating a counterclockwise direction of rotation. The signal on lead 740 may be under the control of the human operator.

When the slew latch 729 is set, there is no signal on line 738, and AND circuit 599 is thus disabled. There thus can be no "switch" signal on lead 600, and the fine home mode function of the circuitry above described cannot thus be operative during slew mode. It is assumed that clockwise direction of rotation is desired, and there is thus at this time a signal on lead 740 in addition to the move pulse on line 736, so that the AND circuit 730 is effective to provide the "move CW" signal on line 742. The move CW signal on line 742 is applied to OR circuits 610 and 640 so that the CW set signal on line 612, the TTCW signal on line 630 and the torque CW signal on line 668 are provided. The rotor 500R is thus driven in the clockwise direction, and this action continues until the count in the counters 532 and 536 match to produce a "match" pulse on line 544 to reset the slew latch 729. This occurs when the rotor 500R first passes through its desired or home position; and, at this point, the AND circuit 599 is enabled, and the circuitry functions to bring the rotor 500R to its home position in a fine home mode as previously described.

The positioning of the rotor 500R in its desired position may also be accomplished by a microcontrol program unit which will now be described, referring particularly to FIG. 6. The microcontrol program unit may be seen to comprise a main store 900, a control store 902, a local store 904, an external store 906, and an arithmetic and logic unit (ALU) 908. A main store address register 910 is provided in connection with the main store, a control store address register 912 is provided in connection with the control store 902; a local store address register 914 is provided in connection with the local store 904; and, an external store control register 916 is provided in connection with the external store 906. An X register 918 is provided at one input of the ALU 908, and a Y register 920 is provided at the other input of the ALU 908. A control store output register 922 is provided in connection with the control store 902.

The control store 922 is provided with outputs 1A, 1B and 1C, respectively connected with buses 924, 926 and 928 to provide inputs for the main store address register 910, the X register 918 and the control store address register 912. The main store 900 has an output 4A connected by a bus 930 to provide an input to the X register 918. The local store 904 has an output 3C connected by a bus 932 to provide an input for the Y register 920. Another bus 934 connects the store 906 with the Y register 920. The ALU 908 has an output 2A connected by a bus 936 to provide an input to the control store address register 912. The stores 906, 904 and 900 respectively have inputs 2B, 2C and 2D; and these inputs are connected by a bus 938 with another output of the ALU 908. Lines 940 and 942 respectively constitute lines to and from external devices controlled by the microcontroller, such as a document card punch. The punch would supply a "move" pulse, such as has been described in connection with line 736; and the CCW and CW pulses from emitter 526 on lines 528 and 530 also constitute inputs to the microcontrol program unit. The outputs from the microcontrol program unit are the driver No. 1, driver No. 2, and driver No. 3 lines 709, 711 and 713.

The instruction cycle for the microcontrol program unit may be made up of 8 clock pulses for a total time duration of 400 nanoseconds. The microcontrol program unit may include 64 registers, 32 being allocated to local store 904 and 32 being allocated to external store 906. It will be noted that communication with the output world is done via external store 906. The local store 904 is generally used to address the main store 900 and hold temporary information.

The following abbreviations may be used for the various registers and stores in the microcontrol program unit:

CSAR = Control Store Address Register
ES = External Store (Registers)
LS = Local Store (Registers)
MAR = Main Address Register
X REG = X Register
Y REG = Y Register
CS = Control Store
MS = Main Store The following instructions may be used with the microcontrol program unit, and these respective instructions provide the following information flow:
Instruction Summary - Information Flow
Branch Unconditional (BRU):

Instruction contains address of next instruction. Low order 8 bits of new address transferred to ALU X REG via 1B, then X REG from ALU to CSAR via 2A. High order 4 bits of new address to CSAR via 1C.

Branch And Load X Register (BALX):
Instruction contains an address. Low order 8 bits of this address transferred to X REG via 1B, then Y REG transferred from ALU to CSAR via 2A. High order 4 bits of new address to CSAR via 1C.

Load X Register (LDX):
Instruction loads contents of a specified Local Store Register into MAR via 3C. Contents of this location sent to X REG via 4A. CSAR incremented by 1.

Store (ST):
Instruction loads contents of a specified L.S. Register into MAR via 3C. ALU output is then stored in this location. CSAR incremented by 1. Contents of X REG and Y REG are unchanged. Output of ALU specified by OP CODE which is part of this instruction.

Modify Register (MODR):
Contents of a specified LS (ES) register loaded into Y REG via 3B (3A). Contents of Y REG combined with X REG as specified by Op Code. Output of ALU returned to the same specified LS (ES) via 2C (2B). CSAR incremented by 1. Besides Standard Op Codes, incremented by 1 or 2 or an end-around Shift Right available via ALU Modifier. X REG unchanged, Y REG is left with old contents of LS (ES) register.

Store Register (STRG):
Contents of ALU combined as specified by Op Code and ALU Modifier. Output of ALU stored in specified L.S. (E.S.) Register via 2C (2B) CSAR incremented by 1.

Set Bits 0-3 (SB03): Instruction contains a 4-bit mask which is loaded into the low order 4 bits of X REG (Exception — MASK of 0000 does not modify X REG) via 1B. Contents of a specified L.S. (E.S.) register are loaded into Y REG via 3B (3A). Low order 4 bits of X REG combined per Op Code with low order 4 bits of Y REG in ALU. High Order 4 bits of Y REG are unchanged. Output of ALU returned to the same specified L.S. (E.S.) register via 2C (2B). CSAR incremented by 1.

Set bits 4-7 (SB47):
Same as SB03 except that the 4 high order bits are modified and low order 4 bits unchanged.

Skip on Bits 0-3 (SK03):
Contents of a specified LS (ES) register are stored in Y REG via 3B (3A). The instruction contains a MASK which is loaded into the low order 4 bits of X REG (Exception — MASK of 0000 does not modify X REG) via 1B. Low order 4 bits of X REG combined per Op Code with low order bits of Y REG. If the resulting 4 low order bits of the ALU contain any 1's, the CSAR is incremented by 2. If the 4 low order bits of the ALU contain all zeros, the CSAR is incremented by 1. The contents of the specified LS (ES) register remain unchanged. Exception — When "Exclusive-Or" is specified, CSAR is incremented by 2 if resulting low order bits of ALU contain all zero's.

Skip on Bits 4-7 (SK47):
Same as Sk03 except masking and comparisons performed on 4 high order bits.

The various routines, using the microcontrol program unit, which effectively provide the same control of motor 500 as the above-described circuitry, are set forth hereinafter in Tables B to K; and the following information may be used for interpreting these tables:

THE LANGUAGE
Source language input to the microprogram assembler is described in mnemonic form below.

Comments
Comments are identified by an asterick in column one. The actual comment may be located in columns 2-80 inclusive (e.g., Steps 1 through 51 are all comments).

FIELD DESCRIPTIONS

Labels
Any entry, other than a comment, may contain a label. Labels may be one to six characters long, and must always being with an alphabetic character in column one (e.g. Step 70 is labeled 'TBS'). The characters in columns two through six may be alphanumeric.

Operation Code (Op Code)
The op code must begin in column eight and may extend through column eleven.

Operand 1
Operand 1 must begin in column thirteen and may extend through column eighteen.

Operand 2
Operand 2 must begin in column twenty and end in column 21 for all instructions except the BALX instruction. Operand 2 of a BALX instruction starts in column 20 and ends in column 23.

Operand 3
Operand 3 must begin in column 23, and end in column 24.

Comments
Comments may begin in column 26 and continue through column 80.

Operand Mnemonics

Operand 1

| | |
|---|---|
| MSM$h$ | Main Store Module $h$, where $h$ is a 0 or 1. Used in the LDX and ST instructions. |
| +0 | ALU modifier indicating that no modification is to be performed. |
| +1 | ALU modifier indicating that the ALU is to be incremented by one. |
| +2 | ALU modifier indicating that the ALU is to be incremented by 2. |
| SR1 | ALU modifier indicating that the ALU is to be shifted right one position. |
| +0, +1, +2 and SR1 are used in the MODR and STRG instructions. | |
| MASK=$m$ | A four bit mask, where $m$ is a hex digit 0-F. Used in the SB03, SB47, SK03, and SK47 instructions. |
| Label | Any valid step label. Used in BRU instruction. |

Operand 2

| | |
|---|---|
| CSM$h$ | Control Store Module $h$, where $h$ is a hex digit in the range 0 to F. Used in BALX instruction. |
| rr | Register specification given by two hex digits in the range of 00-3F to identify the sixty-four, one byte control unit registers. Used in LDX, ST, MODR, STRG, SB03, SB47, SK03 and SK47 instructions. |

Operand 3

| | |
|---|---|
| NO | No Operation in ALU. Output equals 00. |
| X | ALU output equals the X Register. |
| Y | ALU output equals the Y Register. |
| OR | ALU output equals the OR of the X and Y registers. |
| A | ALU output equals the And of the X and Y registers. |
| NY | ALU output equals the And of the X register and the Not of the Y register. |
| NX | ALU output equals the And of the Not of the X Register and the Y Register. |
| EO | ALU output equals the Exclusive OR of the X register and the Y register. |

NO, X, Y, OR, A, NY, NX and EO are known as ALU Control Parameters and are used in the ST, MODR, STRG, SB03, SB47, SK03 and SK47 instructions.

Instructions
Branch Unconditional (BRU)
Label Field - Any valid label
Op Code — BRU
Operand 1 — A defined label
Operands 2 and 3 — Blank
Example:
HERE BRU THERE (instruction labeled HERE produces an unconditional branch to instruction labeled THERE).
Branch And Load X Register (BALX)
Label Field — Any valid label
Op Code — BALX
Operand 1 — A defined label
Operand 2 — CSMh
Operand 3 — Blank in last position
Example:
THERE BALX HERE CSM1 (instruction labeled THERE creates unconditional branch to instruction HERE in C.S. module 1. 'HERE' remains in X REG).
Load X Register (LDX)
Label Field — Any valid label
Op Code — LDX
Operand 1 — MSMh (specified Main Store Module being addressed)
Operand 2 — rr (specifies L.S. register containing address)
Operand 3 — ALU Control
Example:
LABEL 1 LDX MSM0 3E NO (instruction labeled LABEL loads XREG with contents of MSM0, location specified by contents of L.S. register 3E)
Store (ST)
Label Field — Any valid label
Op Code — ST
Operand 1 — MSMh (specified Main Store Module being addressed)
Operand 2 — rr (specified L.S. register containing address)
Operand 3— ALU Control
Example:
LABEL2 ST MSM1 3B NO (instruction labeled LABEL2 stores output of ALU "00" in MSM1 at location specified by L.S. register 3B)
Modify Register (MODR)
Label Field — Any valid label
Op Code — MODR
Operand 1 — ALU Modifier
Operand 2 — rr (specifies L.S. or E.S. register being modified)
Operand 3 — ALU Control
Example:
LABEL3 MODR +0 04 A (instruction labeled LABEL3 And's contents of register 04 with contents of XREG and returns result to register 04)
Store Register (STRG)
Label Field — Any valid label
Op Code — STRG
Operand 1 — ALU Modifier
Operand 2 — rr (specified L.S. or E.S. register being stored)
Operand 3 — ALU Control
Example:
LABEL4 STRG +0 0A X (instruction labeled LABEL4 stores contents of XREG in register 0A)
Set Bits 0–3 (SB03)
Label Field — Any valid label
Op Code — SB03
Operand 1 — MASK=m
Operand 2 — rr (specifies L.S. or E.S. register whose bits are to be set)
Operand 3 — ALU Control
Example:
LABEL5 SB03 MASK=B 10 EO (instruction labeled LABEL5 Exclusive Or's bits 0–3 of register 10 with a mask=B. Bits 4–7 remain unmodified)
Set Bits 4–7 (SB47)
Label Field — Any valid label
Op Code — SB47
Operand 1 — MASK=m
Operand 2 — rr (specifies L.S. or E.S. register whose bits are to be set)
Operand 3 — ALU Control
Example:
LABEL6 SB47 MASK=7 23 A (instruction labeled LABEL6 And's bits 4–7 of register 23 with a mask=7. Bits 0–3 remain unmodified.)
Skip On Bits 0–3 (SK03)
Label Field — Any valid label
Op Code — SK03
Operand 1 — MASK=m
Operand 2 — rr (specifies L.S. or E.S. register being tested)
Operand 3 — ALU Control
Example:
LABEL7 SK03 MASK=C 34 A (instruction labeled LABEL7 And's bits 0–3 of register 34 with a mask=C, if result of this operation contains any one's, the next instruction is skipped, otherwise the next instruction is executed).
Skip On Bits 4–7 (SK47)
Label Field — Any valid label
Op Code — SK47
Operand 1 — MASK=m
Operand 2 — rr (specifies L.S. or E.S. register being tested)
Operand 3 — ALU Control
Example:
LABEL8 SK47 MASK=3 04 A (instruction labeled LABEL8 And's bits 4–7 of register 04 with a mask=3, if this results in any 1's, the next instruction is skipped. Otherwise the next instruction is executed).

Figure 6:
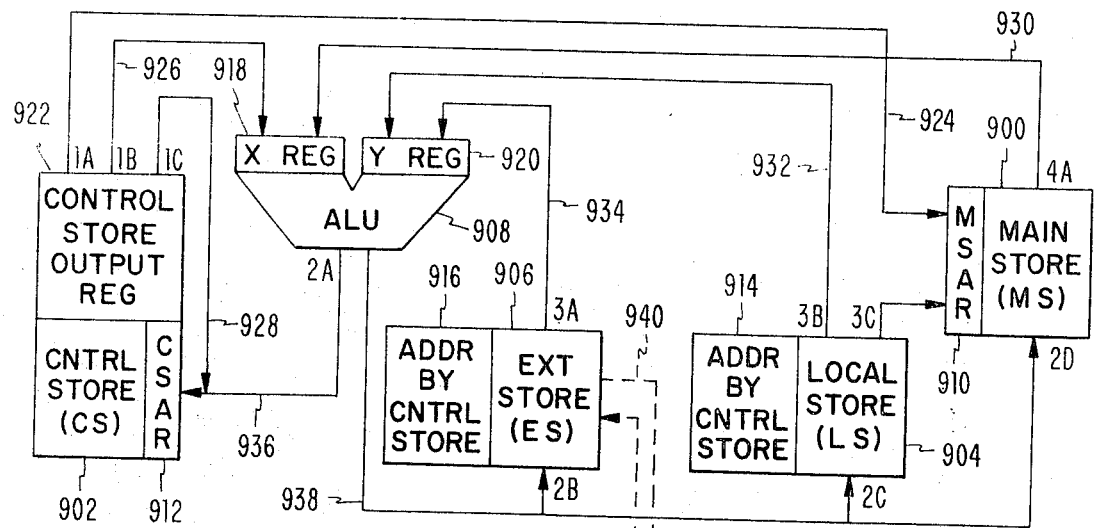
FIG. 6 is a diagram showing a microprogram control unit which when properly programmed produces the same action on the stepping motor rotor as the circuitry of FIGS. 3a to 3f.

End (END)
Label Field — Any valid label
Op Code — END
Operands 1, 2 and 3 — Blank The following Tables B to K set forth the various routines that may be used with the microcontrol program unit illustrated in FIG. 6 for providing substantially the same control of the motor 500 as is provided by the circuitry above-described, and the following Table A sets forth the register assignments that may be used in connection with these routines:

```
1  ************************************************************************
2  *                                                                      *
3  *       CONTINUOUSLY POSITIONABLE STEPPING MOTOR CONTROL PROGRAM        *
4  *                                                                      *
5  ************************************************************************
6  *                                                                      *
7  *       REGISTER ASSIGNMENTS                                            *
8  *                                                                      *
9  *       00   LOW ORDER 8 BITS OF MASTER POSITION COUNTER                *
10 *       01   HIGH ORDER 4 BITS OF MASTER POSITION COUNTER               *
11 *       03   BIT PATTERN FOR DESIRED TORQUE 0=NONE,1=CW,2=CCW           *
12 *       04   STATUS BITS                                                *
13 *            BIT 0   TWO BIT (PEAK OVERSHOOT OF TWO UNITS)              *
14 *            BIT 1   ICO (CURRENT CUT OFF) INDICATOR                    *
15 *            BIT 2   CL (CHANGE LIMIT) BIT                              *
16 *            BIT 3   FINE HOME MODE BIT (1=FINE HOME)                   *
17 *            BIT 4   OO (ONCE ONLY) BIT,CHANGE DIRECTION ONLY ONCE      *
18 *            BIT 5   FTT (FIRST TIME THRU) BIT (SET BY THE FIRST PULSE  *
19 *                    AFTER THE INITIAL CHANGE OF DIRECTION)             *
20 *            BIT 6   COAST BIT (TURNS OFF ALL DRIVERS)                  *
21 *            BIT 7   DIRECTION BIT, INDICATES DIRECTION THAT DESIRED    *
22 *                    POSITION WAS CROSSED                               *
23 *       05   FINE HOME MODE POSITION COUNTER (LIMITED CAPACITY)         *
24 *       07   ICO (CURRENT CUT OFF) COUNTER                              *
25 *       08   STATUS BITS                                                *
26 *            BIT 4   SLEW MODE 'FLOAT' INDICATOR                        *
27 *            BIT 6   DRIVER CONTROL INDICATOR(1=CW,0=CCW)               *
28 *       09   SLEW COUNTER - COUNTS # OF POSITIONS TO BE MOVED           *
29 *       11   BOUNDARY COUNTER                                           *
30 *       12   BOUNDARY COUNTER PLUS ONE                                  *
31 *       13   ADDRESS REGISTER FOR MAIN STORE                            *
32 *            MSM0 = FF                                                  *
33 *       27   INPUT REGISTER                                             *
34 *            BIT 0   START BIT INDICATOR                                *
35 *       30   INPUT REGISTER                                             *
36 *            BIT 2   OVERSPEED INDICATOR FROM EXTERNAL DEVICE           *
37 *            BIT 3   MOVE BIT - INDICATES EXTERNAL ACTUATOR READY FOR   *
38 *                              ANOTHER MOVE                             *
39 *            BIT 5   CCW INPUT BIT                                      *
40 *            BIT 7   CW INPUT BIT                                       *
41 *       3A   OUTPUT REGISTER                                            *
42 *            BIT 0   SIGNAL TO EXTERNAL ACTUATOR THAT MOVE IS COMPLETE  *
43 *            BIT 1   DRIVER #2                                          *
44 *            BIT 2   DRIVER #1                                          *
45 *            BIT 3   DRIVER #3                                          *
46 *                                                                      *
```

TABLE A

| STEPS | COL 1 | OP CODE | OP 1 | OP 2 | OP 3 | COMMENTS |
|---|---|---|---|---|---|---|
| 47 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 48 | * | | | | | * |
| 49 | * | INITIALIZATION ROUTINE | | | | * |
| 50 | * | | | | | * |
| 51 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 52 | | MODR | +0 | 00 | NO | CLEAR REGISTER 00 |
| 53 | | MODR | +0 | 01 | NO | CLEAR REGISTER 01 |
| 54 | | MODR | +0 | 03 | NO | RESET REG 3 |
| 55 | | MODR | +1 | 03 | Y | INCREMENT REG 3 |
| 56 | | MODR | +0 | 04 | NO | CLEAR REG 4 |
| 57 | | MODR | +0 | 05 | NO | CLEAR REG 5 |
| 58 | | SB03 | MASK=1 | 3A | X | TURN ON DRIVER #3 |
| 59 | | MODR | +0 | 08 | NO | CLEAR REG 8 |
| 60 | | MODR | +0 | 09 | NO | CLEAR REG 9 |
| 61 | | MODR | +0 | 11 | NO | CLEAR REGISTER 11 |

| STEPS | COL 1 | OP CODE | OP 1 | OP 2 | OP 3 | COMMENTS |
|---|---|---|---|---|---|---|
| 62 | | MODR +0 | | 12 | NO | RESET REG 12 |
| 63 | | MODR +1 | | 12 | Y | INCREMENT REGISTER 12 |
| 64 | | SB47 MASK=F | | 13 | X | SET REG 13 TO FF  LO ORDER BITS |
| 65 | | SB03 MASK=F | | 13 | X | SAME - HI ORDER BITS |
| 66 | | MODR +0 | | 13 | Y | PLACE CONTENTS OF REG 13 IN Y REG |
| 67 | | ST MSM0 | | 13 | Y | STORE CONTENTS OF Y REG IN MAIN STORE FF |
| 68 | | MODR +0 | | 27 | NO | CLEAR REGISTER 27 |
| 69 | | MODR +0 | | 30 | NO | CLEAR REGISTER 30 |
| 70 | TSB | SK03 MASK=8 | | 27 | A | TEST FOR START BIT ON |
| 71 | | BRU TSB | | | | NO/BRANCH TO TEST START BIT |
| 72 | | MODR +0 | | 27 | NO | YES/CLEAR REG 27 |
| 73 | | SB03 MASK=2 | | 3A | X | TURN ON DRIVER FOR CW TORQUE |
| 74 | | BRU TBR | | | | BRANCH TO TEST BIT ROUTINE |

TABLE B

```
75 ******************************************************************
76 *                                                                 *
77 *    TEST INPUT BIT ROUTINE -- CHECKS FOR PRESENCE OF A CW OR CCW *
78 *        INPUT BIT AND TAKES APPROPRIATE ACTION.  ALSO CHECKS FOR *
79 *        OVERSPEED CONDITION TO PREVENT ENCODER SATURATION.       *
80 *                                                                 *
81 ******************************************************************
```

| STEPS | COL 1 | OP CODE | OP 1 | OP 2 | OP 3 | COMMENTS |
|---|---|---|---|---|---|---|
| 82 | TBR | SK03 MASK=2 | | 30 | A | TEST FOR OVER SPEED CONDITION |
| 83 | | BRU CR7 | | | | NOT OVERSPEED/BRANCH TO CLEAR REG. 7 |
| 84 | | SB03 MASK=D | | 30 | A | OVERSPEED/RESET OVERSPEED BIT |
| 85 | | SB03 MASK=8 | | 3A | A | RESET ALL DRIVER BITS |
| 86 | CR7 | MODR +0 | | 07 | NO | CLEAR REGISTER 7 |
| 87 | LOOP | SK47 MASK=5 | | 30 | A | TEST FOR BITS 5,6,OR 7 ON IN REG 30 |
| 88 | | BRU NVT | | | | BRANCH TO NEW VALUE TEST |
| 89 | | SK47 MASK=1 | | 30 | NY | ANY ON?/ IS CW BIT ON? |
| 90 | | BRU INCR | | | | YES - BRANCH TO INCREMENT ROUTINE |
| 91 | | BRU DECR | | | | NO - BRANCH TO DECREMENT ROUTINE |
| 92 | NVT | SK03 MASK=1 | | 30 | A | TEST FOR MOVE BIT ON |
| 93 | | BRU LOOP | | | | NO/BRANCH TO LOOP |
| 94 | | SB47 MASK=2 | | 08 | OR | SET DRIVER CONTROL SELECT BIT FOR CW |
| 95 | | SB47 MASK=8 | | 08 | OR | SET SLU FLOAT BIT |
| 96 | | MODR +0 | | 04 | NO | CLEAR REG 4 - STATUS BITS |
| 97 | | SB03 MASK=E | | 30 | A | RESET MOVE BIT |
| 98 | | BRU XXX | | | | BRANCH TO XXX |

TABLE C

```
 99 *******************************************************************
100 *                                                                  *
101 * CW ROTATION, INCREMENT MASTER POSITION COUNTER AND BOUNDARY COUNTER *
102 *                                                                  *
103 *******************************************************************
```

| STEPS | COL 1 | OP CODE | OP 1 | OP 2 | OP 3 | COMMENTS |
|---|---|---|---|---|---|---|
| 104 | INCR | MODR +1 | | 09 | Y | INCREMENT SLU COUNTER |
| 105 | | SK47 MASK=F | | 00 | EO | DO THE X BITS EQUAL F? |
| 106 | | BRU IR0 | | | | NO/ BRANCH TO INCREMENT REG 00 |
| 107 | | SK03 MASK=F | | 00 | EO | YES/TEST Y BITS FOR F |
| 108 | | BRU IR0 | | | | NO/ BRANCH TO INCR REG 00 ROUTINE |
| 109 | | MODR +1 | | 01 | Y | YES/ INCREMENT REG 01 |
| 110 | | MODR +0 | | 00 | NO | RESET REG 00 |
| 111 | | BRU CLR | | | | BRANCH TO CLEAR ROUTINE |
| 112 | IR0 | MODR +1 | | 00 | Y | INCR REG 00 |
| 113 | | SK47 MASK=E | | 01 | EO | DO Z BITS EQUAL MAX VALUE? |
| 114 | | BRU CLR | | | | NO/ BRANCH TO CLEAR ROUTINE |
| 115 | | SK03 MASK=1 | | 00 | EO | YES/DO Y BITS EQUAL MAX VALUE? |
| 116 | | BRU CLR | | | | NO/BRANCH TO CLEAR ROUTINE |
| 117 | | SK47 MASK=F | | 00 | A | YES/DO X BITS EQUAL MAX VALUE? |

| STEPS | COL 1 | OP CODE | OP 1 | OP 2 | OP 3 | COMMENTS |
|---|---|---|---|---|---|---|
| 118 | | BRU | ZERO | | | YES/BRANCH TO ZERO ROUTINE |
| 119 | | BRU | CLR | | | NO/BRANCH TO CLEAR ROUTINE |
| 120 | ZERO | MODR | +0 | 00 | NO | CLEAR POSITION COUNTER - LO BITS |
| 121 | | MODR | +0 | 01 | NO | SAME - HI BITS |
| 122 | CLR | MODR | +0 | 0F | Y | NO OPERATION |
| 123 | | SB47 | MASK=2 | 08 | OR | SET DRIVER CONTROL SELECT BIT |
| 124 | | SB47 | MASK=E | 30 | A | RESET INPUT BITS |
| 125 | | LDX | MSM0 | 12 | NO | LOAD X AND Y BITS OF CW BOUNDARY |
| 126 | | SK47 | MASK=0 | 00 | EO | DO X BITS MATCH? |
| 127 | | BRU | TBC | | | NO/BRANCH TO TEST BOUNDARY COUNTER |
| 128 | | SK03 | MASK=0 | 00 | EO | YES/ DO Y BITS MATCH? |
| 129 | | BRU | TBC | | | NO/BRANCH TO TEST BOUNDARY COUNTER |
| 130 | | LDX | MSM0 | 11 | NO | YES/ LOAD Z AND DRIVER BITS |
| 131 | | SK47 | MASK=0 | 01 | EO | DO Z BITS MATCH? |
| 132 | | BRU | TBC | | | NO/BRANCH TO TEST BOUNDARY COUNTER |
| 133 | | MODR | +2 | 11 | Y | YES/INCREMENT BOUNDARY COUNTER |
| 134 | | MODR | +2 | 12 | Y | INCREMENT BC+1 |
| 135 | | BRU | FHCW | | | BRANCH TO FINE HOME CW |
| 136 | TBC | SK47 | MASK=F | 11 | A | TEST BC FOR 144   LO ORDER BITS |
| 137 | | BRU | BB | | | YES  BRANCH TO BB - TEST HI ORDER BITS |
| 138 | | BRU | FHCW | | | NO/BRANCH TO FINE HOME CW |
| 139 | BB | SK03 | MASK=9 | 11 | EO | TEST BC FOR 144  HI ORDER BITS |
| 140 | | BRU | FHCW | | | NO/BRANCH TO FINE HOME CW |
| 141 | | MODR | +0 | 11 | NO | YES/RESET BC |
| 142 | | MODR | +0 | 12 | NO | RESET  BC+1 |
| 143 | | MODR | +1 | 12 | Y | SAME |
| 144 | FHCW | SK03 | MASK=1 | 04 | A | FINE HOME MODE? |
| 145 | | BRU | SLU | | | NO/BRANCH TO SLEW CHECK |

TABLE D

```
146 ********************************************************************
147 *                                                                  *
148 *       FINE HOME MODE - CW ROTATION ROUTINE                       *
149 *                                                                  *
150 ********************************************************************
```

| STEPS | COL 1 | OP CODE | OP 1 | OP 2 | OP 3 | COMMENTS |
|---|---|---|---|---|---|---|
| 151 | | SK03 | MASK=F | 09 | A | YES/CHECK FOR MATCH WITH DESIRED POSITION |
| 152 | | BRU | TCXB | | | HI ORDER BITS 0, TEST/CHECK LO ORDER (X) BITS |
| 153 | | BRU | FLCK | | | NO/BRANCH TO FLOAT CHECK |
| 154 | TCXB | SK47 | MASK=F | 09 | A | DO LO ORDER BITS EQUAL ZERO? |
| 155 | | BRU | RFHPC | | | YES/BRANCH TO RESET FINE HOME POS. COUNTER |
| 156 | | BRU | FLCK | | | NO/BRANCH TO FLOAT CHECK |
| 157 | RFHPC | MODR | +0 | 05 | NO | YES/RESET FHPC |
| 158 | | SB47 | MASK=D | 04 | OR | SET DIRECTION,FTT AND OO STATUS BITS |
| 159 | | SB47 | MASK=2 | 03 | X | SET TORQUE TO CCW |
| 160 | | SB03 | MASK=4 | 04 | OR | SET THE ICO BIT |
| 161 | | BRU | CWDC | | | BRANCH TO CW DRIVER CONTROL |
| 162 | FLCK | SK47 | MASK=8 | 04 | A | IS THE ONCE ONLY BIT ON? |
| 163 | | BRU | ACT | | | NO/BRANCH TO ACT |
| 164 | | SK47 | MASK=1 | 04 | NY | TEST DIRECTION BIT FOR CCW |
| 165 | | BRU | PS | | | NO/BRANCH TO POSITIVE SLOPE ROUTINE |
| 166 | ENT | SK47 | MASK=4 | 04 | A | YES/IS THIS THE FIRST TIME THRU? |
| 167 | | BRU | NFT | | | NO/BRANCH TO NOT FIRST TIME |
| 168 | | SK47 | MASK=E | 05 | A | YES/DO LO ORDER BITS OF FHPC=1 OR 0 |
| 169 | | BRU | HOBT | | | YES/BRANCH |
| 170 | | BRU | TFT | | | NO/BRANCH TO TFT |
| 171 | HOBT | SK03 | MASK=F | 05 | A | DO HI ORDER BITS OF FHPC=0? |
| 172 | | BRU | SNT | | | YES/BRANCH TO SELECT NO TORQUE |
| 173 | TFT | SK47 | MASK=2 | 05 | EO | DO LO ORDER BITS OF FHPC=2? |
| 174 | | BRU | CSL | | | NO/BRANCH TO CALC SWITCH LIM |
| 175 | | SK03 | MASK=F | 05 | A | YES/DO HI ORDER BITS =0? |
| 176 | | BRU | SET2 | | | YES/BRANCH TO SET 2 |
| 177 | | BRU | CSL | | | BRANCH TO CALC SW LIM |

| STEPS | COL 1 | OP CODE | OP 1 | OP 2 | OP 3 | COMMENTS |
|---|---|---|---|---|---|---|
| 178 | SET2 | SB03 | MASK=8 | 04 | OR | SET TWO BIT |
| 179 |  | MODR | +0 | 05 | NO | SET SW LIM = 0 |
| 180 |  | MODR | +1 | 05 | Y | SET SW LIM =1 |
| 181 |  | MODR | +0 | 05 | Y | LOAD SW LIM INTO Y REG |
| 182 |  | ST | MSM0 | 14 | Y | LOAD SW LIM INTO MAIN STORE |
| 183 |  | BRU | ART |  |  | BRANCH TO ART |
| 184 | SNT | MODR | +0 | 03 | NO | SELECT NO TORQUE |
| 185 | CSL | MODR | SR1 | 05 | NO | NO/DIVIDE FHPC BY 2 |
| 186 |  | SB03 | MASK=7 | 05 | A | CLEAR HI ORDER BIT |
| 187 |  | MODR | +0 | 05 | Y | LOAD SW LIMIT INTO X REG |
| 188 |  | ST | MSM0 | 14 | Y | LOAD SW LIMIT INTO MAIN STORE |
| 189 |  | SK47 | MASK=1 | 05 | EO | DO LO ORDER BITS OF SW LIMIT =1? |
| 190 |  | BRU | ISB1 |  |  | NO/BRANCH |
| 191 |  | SK03 | MASK=F | 05 | A | YES/DO HI ORDER BITS OF SW LIMIT =0? |
| 192 |  | BRU | ART |  |  | YES/BRANCH |
| 193 | ISB | SB47 | MASK=9 | 04 | A | NO/RESET COAST AND FTT BITS |
| 194 |  | MODR | +0 | 05 | NO | CLEAR FHPC |
| 195 |  | MODR | +1 | 05 | Y | INCREMENT FHPC |
| 196 |  | BRU | CWDC |  |  | BRANCH TO CW DRIVER CONTROL |
| 197 | ART | SB47 | MASK=3 | 03 | X | SELECT BOTH TORQUES |
| 198 |  | SB03 | MASK=2 | 04 | OR | SET CL BIT |
| 199 |  | BRU | ISB |  |  | BRANCH |
| 200 | ISB1 | SB47 | MASK=1 | 03 | X | SELECT CW TORQUE |
| 201 |  | BRU | ISB |  |  |  |
| 202 | NFT | MODR | +1 | 05 | Y | INCREMENT FHPC |
| 203 |  | SK47 | MASK=2 | 04 | A | IS THE COAST BIT ON? |
| 204 |  | BRU | RT |  |  | NO/BRANCH TO REVERSE TORQUE |
| 205 |  | SB47 | MASK=2 | 03 | X | YES/SELECT CCW TORQUE |

TABLE E-1

| STEPS | COL 1 | OP CODE | OP 1 | OP 2 | OP 3 | COMMENTS |
|---|---|---|---|---|---|---|
| 206 |  | LDX | MSM0 | 14 | NO | LOAD SWITCH LIMIT X REG |
| 207 |  | SK47 | MASK=0 | 05 | EO | DO LO ORDER BITS MATCH? |
| 208 |  | BRU | CWDC |  |  | NO/BRANCH TO SET CW DRIVER CONTROL |
| 209 |  | SK03 | MASK=0 | 05 | EO | YES/DO HI ORDER BITS MATCH? |
| 210 |  | BRU | CWDC |  |  | NO/BRANCH TO CW DRIVER CONTROL |
| 211 |  | MODR | +0 | 03 | NO | YES/SELECT NO TORQUE |
| 212 |  | BRU | CWDC |  |  | BRANCH TO CW DRIVER CONTROL |
| 213 | RT | SK03 | MASK=2 | 04 | A | IS THE CL BIT ON? |
| 214 |  | BRU | DD |  |  | NO/BRANCH TO DD |
| 215 |  | SB47 | MASK=2 | 03 | X | YES/SELECT CCW TORQUE |
| 216 |  | SB03 | MASK=D | 04 | A | RESET CL BIT |
| 217 |  | SB47 | MASK=2 | 04 | OR | SET COAST BIT |
| 218 |  | MODR | +0 | 05 | NO | CLEAR FHPC |
| 219 |  | SK03 | MASK=8 | 04 | A | IS THE TWO BIT ON ? |
| 220 |  | BRU | CWDC |  |  | NO/BRANCH TO CW DRIVER CONTROL |
| 221 |  | SB03 | MASK=4 | 04 | OR | YES/SET ICO BIT |
| 222 |  | SB03 | MASK=7 | 04 | A | RESET THE TWO BIT |
| 223 |  | BRU | CWDC |  |  | BRANCH TO CWDC |
| 224 | DD | LDX | MSM0 | 14 | NO | LOAD SWITCH LIMIT FROM MAIN STORE FOR COMPARE |
| 225 |  | SK47 | MASK=0 | 05 | EO | DO LO ORDER BITS MATCH? |
| 226 |  | BRU | CWDC |  |  | NO/BRANCH TO CWDC |
| 227 |  | SK03 | MASK=0 | 05 | EO | YES/DO HI ORDER BITS MATCH? |
| 228 |  | BRU | CWDC |  |  | NO/BRANCH TO CWDC |
| 229 |  | SB47 | MASK=3 | 03 | X | YES/SELECT BOTH TORQUES |
| 230 |  | SB03 | MASK=2 | 04 | OR | SET CL BIT |
| 231 |  | BRU | CWDC |  |  | BRANCH TO CW DRIVER CONTROL |
| 232 | PS | MODR | +1 | 05 | Y | INCREMENT FHPC |
| 233 |  | SB47 | MASK=2 | 03 | X | SELECT CCW TORQUE |
| 234 |  | SK47 | MASK=4 | 04 | NY | IS THE FTT BIT OFF? |
| 235 |  | BRU | CWDC |  |  | NO/BRANCH TO CWDC |
| 236 |  | SB47 | MASK=7 | 04 | A | YES/RESET THE OO BIT |
| 237 |  | BRU | CWDC |  |  | BRANCH TO CWDC |

| STEPS | COL 1 | OP CODE | OP 1 | OP 2 | OP 3 | COMMENTS |
|---|---|---|---|---|---|---|
| 238 | SLU | SK03 | MASK=C | 09 | EO | CHECK FOR MATCH WITH DESIRED POS.- Y BITS |
| 239 | | BRU | TURN | | | NO/BRU TO TURN TORQUE AROUND |
| 240 | | SK47 | MASK=8 | 09 | EO | CHECK FOR MATCH WITH DESIRED POS. - X BITS |
| 241 | | BRU | TURN | | | NO/BRU TO TURN TORQUE |
| 242 | | MODR | +0 | 09 | NO | YES/RESET SLU POSITION COUNTER |
| 243 | | SB47 | MASK=D | 04 | X | SET STATUS BITS |
| 244 | | SB47 | MASK=7 | 08 | A | RESET SLU FLOAT BIT |
| 245 | | SB03 | MASK=1 | 04 | X | SET FHM BIT |
| 246 | | MODR | +0 | 05 | NO | RESET FHPC |
| 247 | | SB47 | MASK=2 | 03 | X | SELECT CCW TORQUE |
| 248 | | BRU | ZZZ | | | NO/BRANCH TO ZZZ |
| 249 | XXX | SK47 | MASK=2 | 08 | A | WHAT DIRECTION WAS THE INCOMING BIT? |
| 250 | | BRU | ACT2 | | | CCW/BRANCH TO ACT2 |
| 251 | | BRU | ACT | | | CW/BRANCH TO ACT |
| 252 | ZZZ | SB03 | MASK=8 | 08 | OR | SET PUNCH BIT |
| 253 | | BRU | CWDC | | | BRANCH TO CWDC |
| 254 | TURN | SK03 | MASK=B | 09 | EO | HAS REV.TORQUE POINT BEEN REACHED? |
| 255 | | BRU | AFLT | | | NO/BRANCH TO ANTI-FLOAT |
| 256 | | SB47 | MASK=2 | 03 | X | YES/SELECT CCW TORQUE |
| 257 | | SB47 | MASK=7 | 08 | A | RESET SLU FLOAT BIT |
| 258 | | SB03 | MASK=D | 30 | A | RESET OVERSPEED BIT |
| 259 | AFLT | SK47 | MASK=8 | 08 | A | IS THE SLU FLOAT BIT ON? |
| 260 | | BRU | CWDC | | | NO/BRANCH TO CWDC |
| 261 | ACT | SK47 | MASK=1 | 04 | A | DOES DIRECTION BIT SHOW CW? |
| 262 | | BRU | NOW | | | NO/BRANCH TO NOW |
| 263 | | SB47 | MASK=2 | 03 | X | YES/SELECT CCW TORQUE |
| 264 | | BRU | CWDC1 | | | BRANCH TO CWDC |
| 265 | NOW | SB47 | MASK=1 | 03 | X | SELECT CW TORQUE |
| 266 | | BRU | CWDC1 | | | BRANCH TO CWDC |

TABLE E-2

```
267 *********************************************************************
268 *                                                                   *
269 *     DRIVER SELECT CONTROL - RESPONDS TO TORQUE COMMANDS AND POSITION *
270 *                                                                   *
271 *********************************************************************
```

| 272 | CWDC | SK47 | MASK=2 | 08 | A | CHECK DRIVER CONTROL BIT FOR PROPER ROUTINE |
|---|---|---|---|---|---|---|
| 273 | | BRU | CCWDC | | | BIT OFF/ BRANCH TO CCW DRIVER CONTROL |
| 274 | CWDC1 | SK47 | MASK=1 | 03 | A | WHICH TORQUE IS DESIRED ? |
| 275 | | BRU | CND | | | CCW OR NONE |
| 276 | | LDX | MSM0 | 11 | NO | CW / LOAD CW DRIVER BITS |
| 277 | | SB03 | MASK=0 | 3A | X | SAME |
| 278 | | SK47 | MASK=2 | 03 | A | CCW ALSO? |
| 279 | | BRU | TTT | | | NO/BRANCH TO TTT |
| 280 | | LDX | MSM1 | 11 | NO | YES/LOAD CCW DRIVER BITS |
| 281 | | SB03 | MASK=0 | 3A | OR | ADD CCW AND CW DRIVER BITS |
| 282 | | BRU | TTT | | | BRANCH TO TTT |
| 283 | CND | SK47 | MASK=2 | 03 | A | CCW OR NONE? |
| 284 | | BRU | OFF | | | NONE |
| 285 | | LDX | MSM1 | 11 | NO | CCW / LOAD CCW DRIVER BITS |
| 286 | | SB03 | MASK=0 | 3A | X | SAME |
| 287 | TTT | SK03 | MASK=4 | 04 | A | IS THE ICO BIT ON? |
| 288 | | BRU | TBR | | | NO/BRANCH TO TEST BIT ROUTINE |
| 289 | QQQ | MODR | +0 | 07 | NO | YES/CLEAR REGISTER 7 |
| 290 | QICO | MODR | +1 | 07 | Y | INCR ICO COUNTER |
| 291 | | SK47 | MASK=5 | 30 | A | TEST FOR INPUT BITS |
| 292 | | BRU | CDY | | | NO/BRANCH TO CDY |
| 293 | | SB03 | MASK=B | 04 | A | CLEAR ICO BIT |
| 294 | | BRU | TBR | | | YES/BRANCH TO TEST BIT ROUTINE |
| 295 | CDY | SK47 | MASK=1 | 07 | EO | DO LO ORDER BITS OF ICO COUNTER =1? |
| 296 | | BRU | QICO | | | NO/BRANCH TO QICO |
| 297 | | SK03 | MASK=3 | 07 | EO | YES/DO HI ORDER BITS =3? |

```
STEPS  COL 1  OP CODE  OP 1  OP 2  OP 3  COMMENTS

298            BRU  QICO            NO/BRANCH TO QICO
299            MODR +0         03 NO YES/SELECT NO TORQUE
300            SB03 MASK=B  04 A    CLEAR ICO BIT
301            BRU  CWDC            BRANCH TO CW DRIVER CONTROL
302    OFF     SB03 MASK=8  3A A    RESET ALL DRIVER BITS
303            BRU  TBR             BRANCH TO TEST BIT ROUTINE
```

TABLE F

```
304 ********************************************************************
305 *                                                                    *
306 *     CCW ROTATION - DECREMENT MASTER POSITION COUNTER AND BNDRY. CNTR. *
307 *                                                                    *
308 ********************************************************************
309 DECR   LDX  MSM0        13 NO DECREMENT SLU COUNTER
310        MODR +0          09 EO SAME
311        MODR +1          09 Y  SAME
312        MODR +0          09 EO SAME
313        SK47 MASK=F      00 A  TEST X BITS FOR 0
314        BRU  CYB               YES/BRANCH TO CHECK Y BITS
315        BRU  DR0               NO/BRANCH TO DECREMENT REG 00
316 CYB    SK03 MASK=F      00 A  CHECK Y BITS FOR 0
317        BRU  CZB               YES/BRANCH TO CHECK Z BITS
318 DR0    SB47 MASK=F      00 EO NO / DECREMENT REG 00 - COMPLIMENT X BITS
319        SB03 MASK=F      00 EO COMPLIMENT Y BITS
320        MODR +1          00 Y  INCREMENT REGISTER 00
321        SB47 MASK=F      00 EO COMPLIMENT X BITS
322        SB03 MASK=F      00 EO COMPLIMENT Y BITS
323        BRU  RST               BRANCH TO RESET INPUT BITS
324 CZB    SK47 MASK=F      01 A  CHECK Z BITS FOR 0
325        BRU  PRE               YES/BRANCH TO PRESET ROUTINE
326        SB47 MASK=F      01 EO NO / COMPLIMENT Z BITS
327        MODR +1          01 Y  INCREMENT REGISTER 01
328        SB47 MASK=F      01 EO COMPLIMENT Z BITS
329        SB47 MASK=F      00 OR SET X BITS TO F
330        SB03 MASK=F      00 OR SET Y BITS TO F
331        BRU  RST               BRANCH TO RESET INPUT BITS
332 PRE    SB47 MASK=F      00 OR PRESET COUNT - SET X BITS TO F
333        SB47 MASK=E      01 OR SET Z BITS TO E
334 RST    SB47 MASK=B      30 A  RESET CCW AND HOME BITS
335        SB47 MASK=D      08 A  CLEAR DRIVER CONTROL BIT
336        LDX  MSM1        12 NO LOAD X AND Y BITS OF CCW BOUNDARY
337        SK47 MASK=0      00 EO DO X BITS MATCH?
338        BRU  CBC               NO/BRANCH TO CHECK BOUNDARY COUNTER
339        SK03 MASK=0      00 EO YES/DO Y BITS MATCH?
340        BRU  CBC               NO/BRANCH TO CHECK BOUNDARY COUNTER
341        LDX  MSM1        11 NO YES/LOAD Z AND DRIVER BITS
342        SK47 MASK=0      01 EO DO Z BITS MATCH?
343        BRU  CBC               NO/BRANCH TO CHECK BOUNDARY COUNTER
344        LDX  MSM0        13 NO YES/DECREMENT BOUNDARY COUNTER ROUTINE
345        MODR +0          11 EO COMPLIMENT BC
346        MODR +2          11 Y  INCREMENT BC
347        MODR +0          11 EO COMPLIMENT BC
348        MODR +0          12 EO COMPLIMENT BC+1
349        MODR +2          12 Y  INCREMENT
350        MODR +0          12 EO COMPLIMENT BC+1
351        BRU  FHCCW            BRANCH TO FINE HOME CCW
352 CBC    SK47 MASK=F      11 A  TEST BC FOR 00 LOW ORDER BITS
353        BRU  CHB              BRANCH TO CHECK HI ORDER BITS ROUTINE
354        BRU  FHCCW            BRANCH TO FINE HOME CCW
355 CHB    SK03 MASK=F      11 A  TEST BC FOR 00 HI ORDER BITS
356        BRU  RRR              BRANCH TO RESET REGISTER ROUTINE
```

```
S
T    C
E    O
P    L        OP      O    O  O
S    1       CODE     P    P  P       COMMENTS
                      1    2  3

357          BRU   FHCCW            BRANCH TO FINE HOME CCW
358 RRR      SB47  MASK=F 11 NX     SET BC TO MAX   LO ORDER BITS
359          SB03  MASK=9 11 X      SAME      HI ORDER BITS
360          SB47  MASK=1 12 X      SET BC+1 TO MAX  LO ORDER BITS
361          SB03  MASK=9 12 X      SAME      HI ORDER BITS
```

TABLE G

```
362 ***********************************************************************
363 *                                                                      *
364 *     FINE HOME MODE -- CCW ROTATION                                   *
365 *                                                                      *
366 ***********************************************************************
367 FHCCW    SK03  MASK=1 04 A      FINE HOME MODE?
368          BRU   AFLT2            NO/BRANCH TO SLU MODE ANTI FLOAT CONTROL
369          SK03  MASK=F 09 EO     YES/CHECK FOR DESIRED POS,Y BITS = F ?
370          BRU   FLCK2            DON'T MATCH/BRANCH TO FLOAT CHECK
371          SK47  MASK=F 09 EO     MATCH/DO X BITS = F ?
372          BRU   FLCK2            DON'T MATCH/BRANCH TO FLOAT CHECK
373          MODR  +0     05 NO     YES/RESET FHPC
374          SB47  MASK=C 04 OR     SET FTT AND OO STATUS BITS
375          SB47  MASK=E 04 A      CLEAR DIRECTION BIT
376          SB47  MASK=2 03 X      SELECT CCW TORQUE
377          SB03  MASK=4 04 OR     SET THE    ICO BIT
378          SK03  MASK=8 08 A      IS THE PUNCH BIT ON
379          BRU   CWDC             NO/BRANCH  TO CW DRIVER  CONTROL
380          SB47  MASK=B 3A A      YES/RESET   PUNCH BIT - EXTERNAL
381          SB03  MASK=7 08 A      RESET THE INTERNAL PUNCH BIT
382          SB47  MASK=4 3A OR     SET EXTERNAL PUNCH BIT
383          BRU   CWDC             BRANCH TO  CW DRIVER CONTROL
384 FLCK2    SK47  MASK=8 04 A      IS THE ONCE ONLY BIT ON?
385          BRU   ACT2             NO/BRANCH TO ACT(CONTINUOUS CW TORQUE)
386          SK47  MASK=1 04 A      IS DIRECTION BIT ON(CW)?
387          BRU   PS               NO/BRANCH TO POSITIVE SLOPE ROUTINE
388          BRU   ENT              YES/BRANCH TO ENTRY PT. IN FINE HOME ROUTINE
389 AFLT2    SB47  MASK=8 08 OR     SET THE SLU FLOAT BIT
390 ACT2     SK47  MASK=1 04 A      DOES DIRECTION BIT SHOW CW?
391          BRU   NOW2             NO/BRANCH TO NOW
392          SB47  MASK=1 03 X      YES/SELECT CW TORQUE
393          BRU   CCWDC            BRANCH TO CCW DRIVER CONTROL
394 NOW2     SB47  MASK=2 03 X      SELECT CCW TORQUE
395          BRU   CCWDC
```

TABLE H

```
396 ***********************************************************************
397 *                                                                      *
398 *     DRIVER SELECT CONTROL -- CCW ROTATION                            *
399 *                                                                      *
400 ***********************************************************************
401 CCWDC    SK47  MASK=2 03 A      WHICH DIRECTION IS DESIRED
402          BRU   LCW              BRANCH TO LOAD CW - CW OR NONE
403          LDX   MSM0   11 NO     CCW/LOAD CCW DRIVER BITS
404          SB03  MASK=0 3A X      SAME
405          SK47  MASK=1 03 A      CW ALSO?
406          BRU   TTT2             NO/BRANCH TO TTT2
407          LDX   MSM1   11 NO     YES/LOAD CW DRIVER BITS
408          SB03  MASK=0 3A OR     ADD CW AND CCW DRIVER BITS
409          BRU   TTT2             BRANCH TO TTT2
410 LCW      SK47  MASK=1 03 A      CW OR NONE?
411          BRU   OFF              BRANCH TO OFF ROUTINE - NONE
412          LDX   MSM1   11 NO     LOAD CW BITS
```

```
S
T      C
E      O              O     O   O
P      L     OP       P     P   P
S      1     CODE     1     2   3    COMMENTS

413          SB03   MASK=0  3A  X    LOAD CW BITS
414   TTT2   SK03   MASK=4  04  A    IS THE ICO BIT ON?
415          BRU    TBR                NO/BRANCH TEST BIT ROUTINE
416          BRU    QQQ                YES/BRANCH TO QQQ
```

TABLE I

```
417  ****************************************************************
418  *                                                               *
419  *    THE FOLLOWING TWO ROUTINES ARE USED TO LOAD DRIVER SWITCHING *
420  *    INFORMATION INTO MAIN STORE FOR USE BY DRIVER CONTROL ROUTINES *
421  *                                                               *
422  ****************************************************************
423  *
424  ************************ LOAD MAIN STORE MODULE 0 ****************
425  *                                                               *
426          MODR   +0      28  NO   CLEAR REGISTER 28
427          MODR   +0      27  NO   CLEAR REGISTER 27
428          MODR   +0      10  NO   CLEAR REGISTER 10
429  START   SK03   MASK=4  27  A    TEST FOR READER DATA VALID
430          BRU    START             BRANCH TO START ON READER DATA NOT VALID
431          MODR   +0      28  Y    LOAD CONTENTS OF REG 28 INTO YREG
432          ST     MSM0    10  Y    STORE CONTENTS OF YREG IN MAIN STORE
433          MODR   +1      10  Y    INCREMENT REGISTER 10 BY 1
434          SB03   MASK=4  27  NX   RESET BIT 1 OF REGISTER 27
435          BRU    START             BRANCH BACK TO READ MORE DATA INTO STORE
```

TABLE J

```
436  *                                                               *
437  ************************ LOAD MAIN STORE MODULE 1 ****************
438  *                                                               *
439          MODR   +0      28  NO   CLEAR REGISTER 28
440          MODR   +0      27  NO   CLEAR REGISTER 27
441          MODR   +0      10  NO   CLEAR REGISTER 10
442  STAR    SK03   MASK=4  27  A    TEST FOR READER DATA VALID
443          BRU    STAR              BRANCH TO START ON READER DATA NOT VALID
444          MODR   +0      28  Y    LOAD CONTENTS OF REG 28 INTO YREG
445          ST     MSM1    10  Y    STORE CONTENTS OF YREG IN MAIN STORE
446          MODR   +1      10  Y    INCREMENT REGISTER 10 BY 1
447          SB03   MASK=4  27  NX   RESET BIT 1 OF REGISTER 27
448          BRU    STAR              BRANCH BACK TO READ MORE DATA INTO STORE
449          END
```

TABLE K

Referring now to Table A which shows the register assignments used in connection with the microprogramming it will be observed that register 00 is the low order 8 bits of the master position counter, and register 01 is the high order 4 bits of the master position counter. The master position counter counts up to the count of 3599 and is then reset to 0. The master position counter is responsive to the emitter 526 and makes one count for each tenth degree of rotation of the rotor 500R. For a clockwise pulse, the master position counter counts up; and, for a counterclockwise pulse, the master position counter counts down.

Register 03 as shown in Table A is used for controlling the drivers 714a, 714b and 714c, and the bit pattern in register 03 has one of the three values 0, 1 or 2. The value of 0 in register 03 indicates that all of the drivers should be off so that there is no torque on rotor 500R; the count 1 in register 03 indicates that those of the drivers producing clockwise torque on rotor 500R should be turned on; and the count of 2 in register 03 indicates that those of the drivers producing counterclockwise torque should be turned on. The length of the 03 register is 8 bits; however, only the last 2 bits are used.

Register 05 is the fine home mode position counter, and this counter has a function comparable to that of the counter of registers 00 and 01 except that only 8 bits of register 05 are used. The use of the separate register 05 for fine home mode allows faster operation, since the high order 4 bits of the master position counter need thus not be considered during fine home mode of operation. Register 05 begins its counting action when rotor 500R crosses its desired, zero position; and as rotor 500R moves away from the desired position, the fine home mode position counter, register 05, counts up. The counter, register 05, counts down as the rotor 500R returns toward the desired, zero position thereof. This action in counting up and counting down as the rotor 500R moves away from and toward the desired position occurs for either clockwise rotation or counterclockwise rotation of the rotor. The contents of the counter, register 5, is used for calculating the "switch point" previously referred to in connection with the embodiment shown in FIGS. 3a to 3f. Register 05 counts up to the count of 255, plus or minus, more than sufficient to carry out its intended function.

Figures 3, 3F:
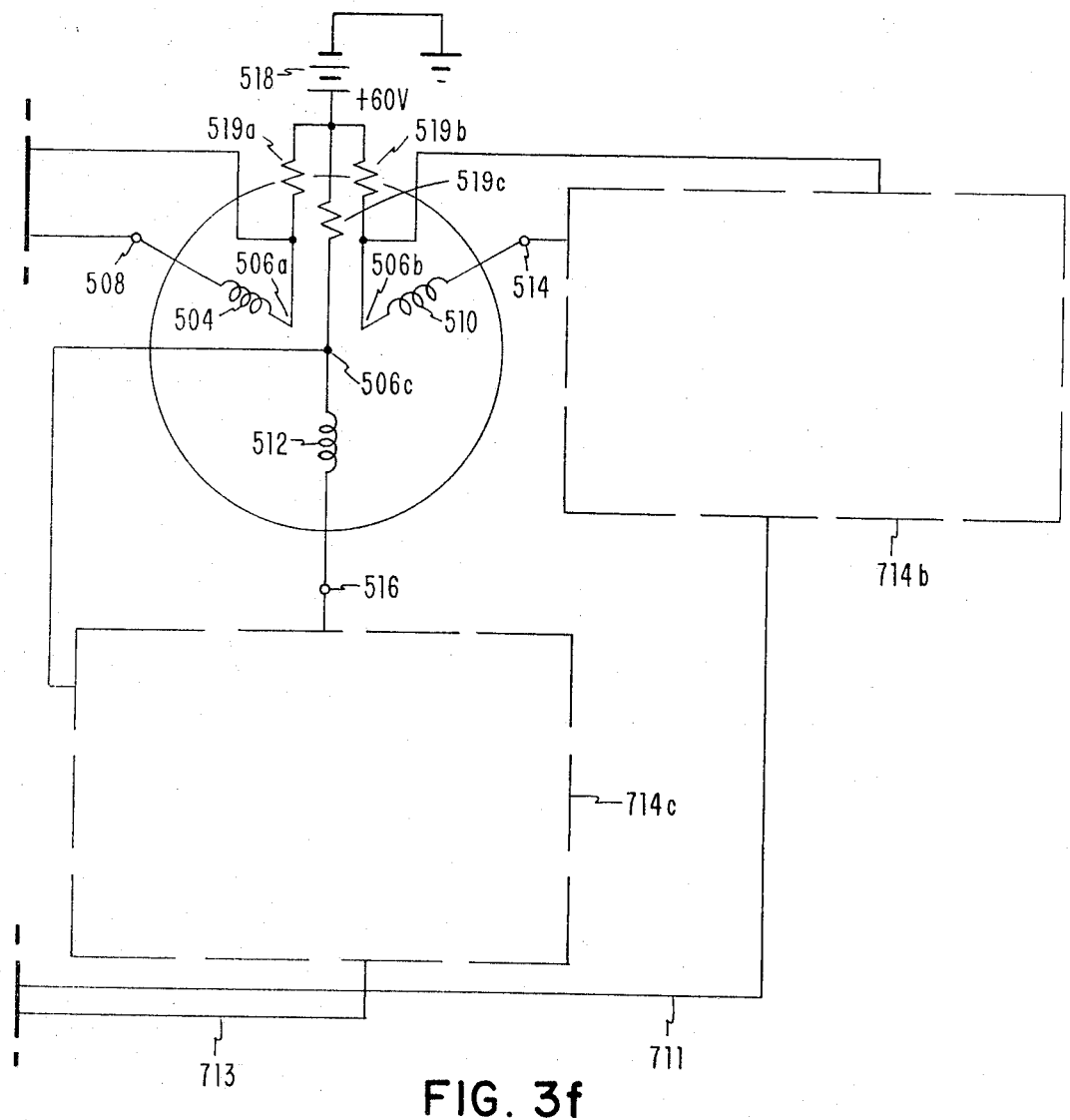
Figure 3A:
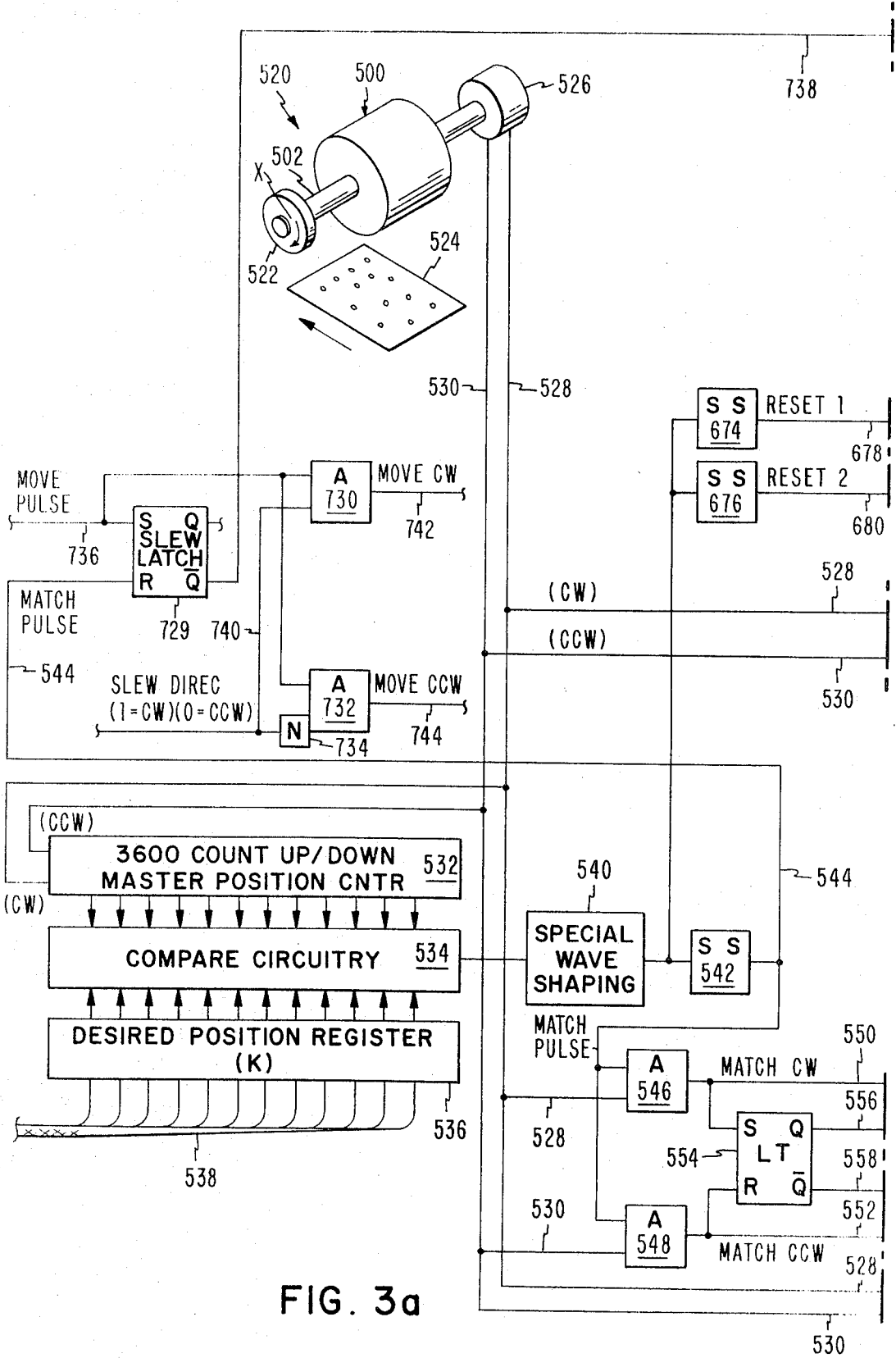
Figure 3B:
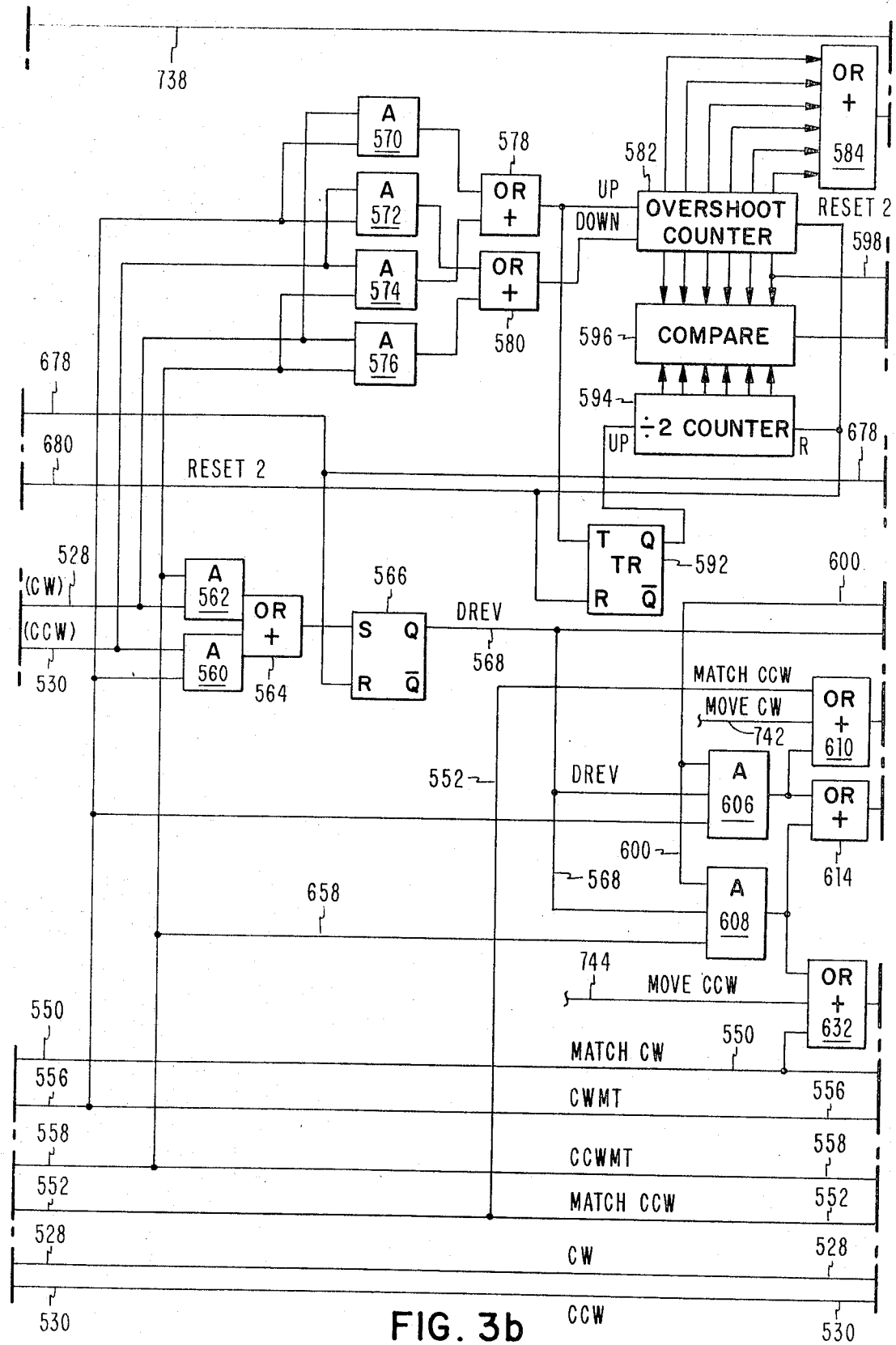
Figure 3C:
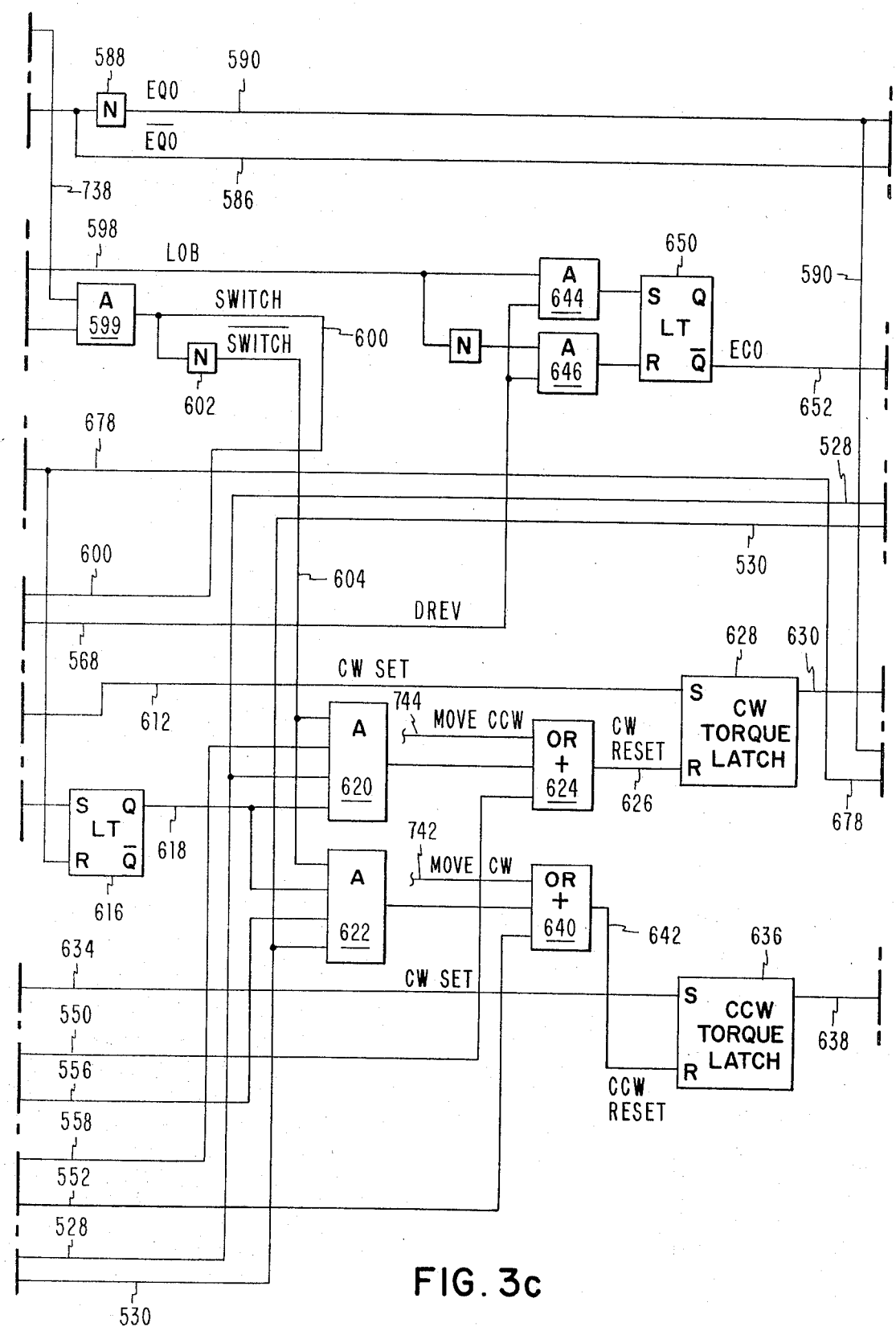
Figure 3D:
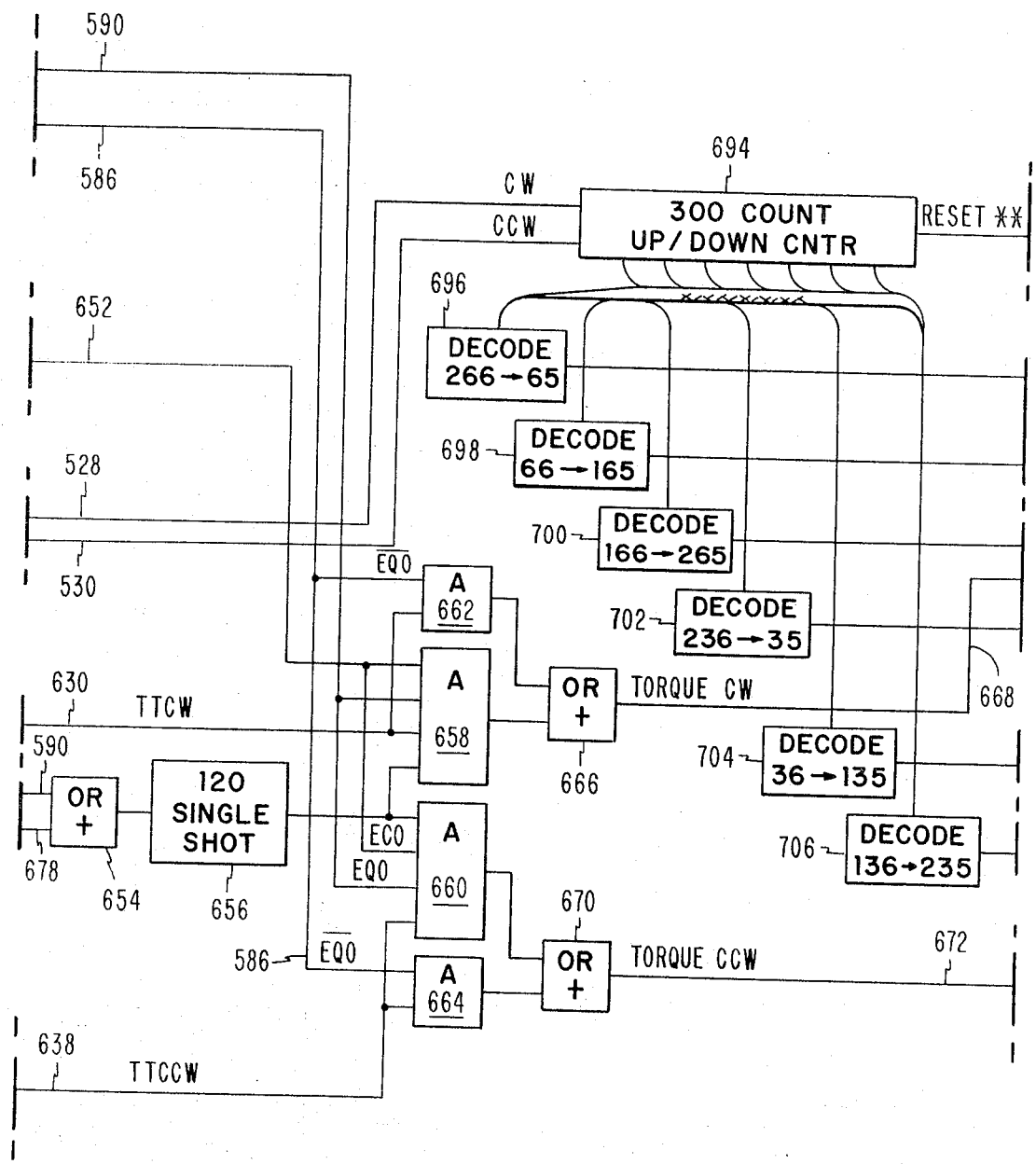
Figure 3E:
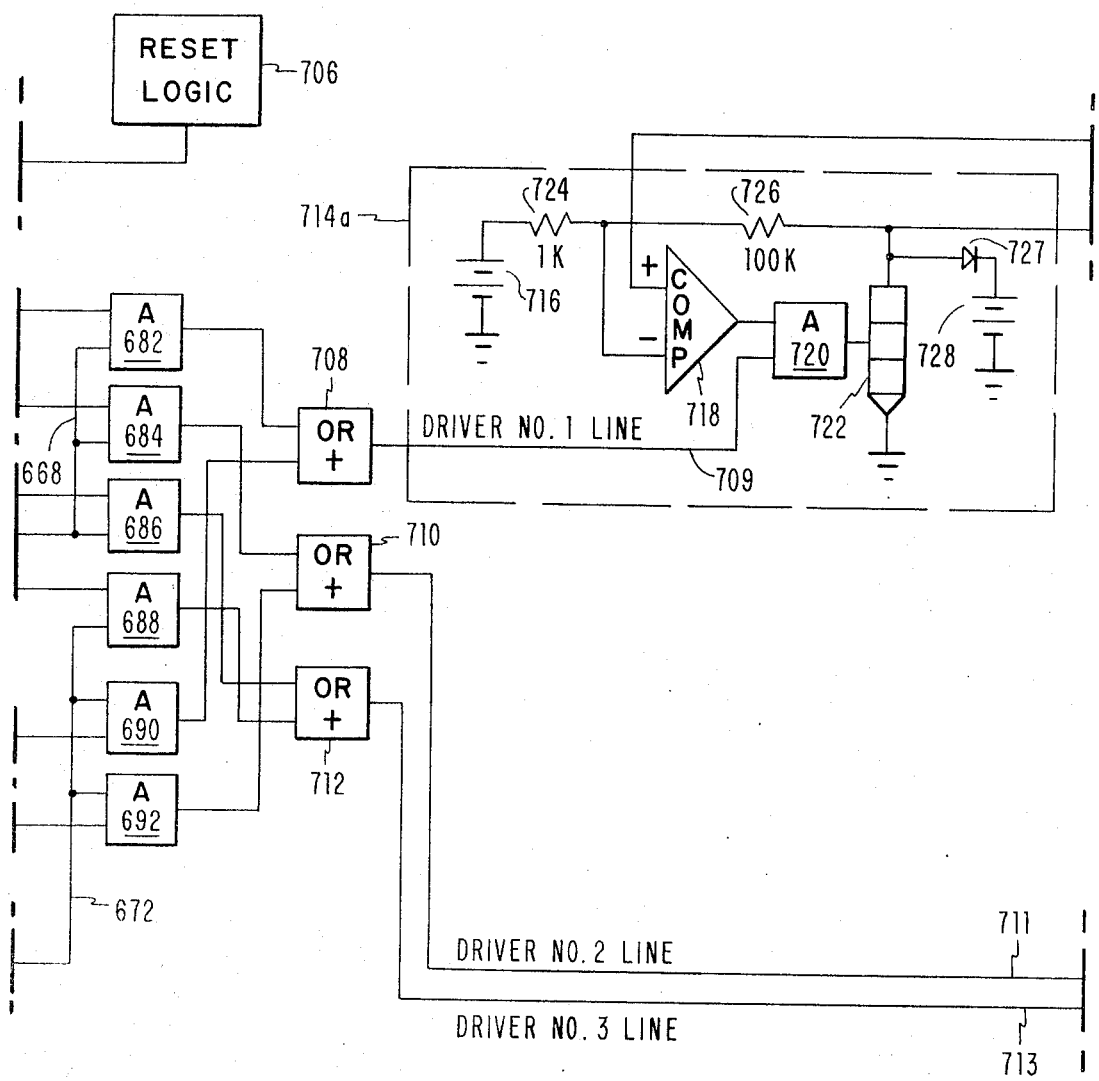

The ICO or current cutoff counter embedded in register 07 is for the purpose of providing the timeout of 120 microseconds, described in connection with the embodiment of FIGS. 3a and 3f. The ICO counter, register 07, thus limits the time of application of electric current to coils 504, 510 and 512; and more particularly, the ICO counter counts a number of instruction loops in order to provide this timeout, as will be made more clear by the following detailed description.

Register 09, as shown by Table A, constitutes a slew counter which counts along with the master position counter made up of registers 00 and 01. The slew counter counts the travel of the rotor 500R between its initial position, at the beginning of a slewing operation, until the rotor first crosses its desired or home position. Essentially the slew counter determines the home or desired position, inasmuch as the slew counter contains a certain number of counts.

Registers 11 and 12 provide complementary functions, register 11 being designated as the boundary counter and register 12 as the boundary counter + 1. The boundary counter, register 11, counts by 2's, 0, 2, 4, 6, etc.; and register 12 counts in the same manner but with alternate counts, 1, 3, 5, 7, 9, etc. The boundary counters, registers 11 and 12, are used in connection with register 03 (bit pattern for desired torque) for turning on the particular drivers 714a, 714b and 714c that must be turned on to provide the proper torque on the rotor 500R. In particular, the contents of the boundary counters (registers 11 and 12) is used for addressing main storage 900, main storage containing bits for indicating the proper driver energization configuration for providing the desired torque on rotor 500R. In addition, a comparison of the contents of the boundary counter with the contents of the master position counter, is made to indicate whether or not the contents of the boundary counters should be updated. This information is also preloaded into main storage 900. The boundary counters (registers 11 and 12) thus are used to keep track of exactly what driver should be energized to produce maximum torque in either the clockwise or counterclockwise direction. The boundary counters address main storage 900, and the location thus addressed yields the driver bit pattern necessary to produce maximum torque on the rotor 500R and also yields the value of the master position counter (registers 00 and 01) at which the boundary counters are to be changed in content.

The approximate torque versus rotor position curves for a particular motor 500 are set forth in FIG. 18, and table L given below very briefly sets forth the critical values for this motor.

| Counter | Main Store Module $\phi$ (CW) | | Main Store Module 1 (CCW) | |
| --- | --- | --- | --- | --- |
| | Driver for CW Torque | Increment BC by 2 at this Value | Driver for CCW Torque | Increment BC by 2 at this Value |
| 0 & 1 | 1 | 36 | 2 | 3565 |
| 2 & 3 | 1 | 66 | 3 | 35 |
| 4 & 5 | 2 | 136 | 3 | 65 |
| 6 & 7 | 2 | 166 | 1 | 135 |
| 8 & 9 | 3 | 236 | 1 | 165 |
| etc. | 3 | 266 | 2* | 235 |

TABLE L

There are two sets of preloaded data in main storage 900, one for clockwise and one for counterclockwise rotation. This data is contained in main storage 900, particularly in two modules, module 0 and module 1. The contents of module 9 are for clockwise rotation of the rotor 500R, and the contents of module 1 are for counterclockwise rotation of the rotor.

Some of the instructions reference main store 900, such as an instruction "load X from main store," and part of each of these instructions is the main store module number (module 0 or module 1). Certain areas are defined in each of these modules; for example, the area between 3565 and 35 in module 1 (see Table L). In this range, the content of the boundary counter is equal to 0, and the content of the boundary counter +1 is equal to 1. The numeral "3565" in the table corresponds to a rotor rotation of 356.5°, and the numerals "35" in the table correspond to the rotor rotation of 3.5°. The other numerals in the third and fifth columns of the chart have the same significance.

Figure 18:
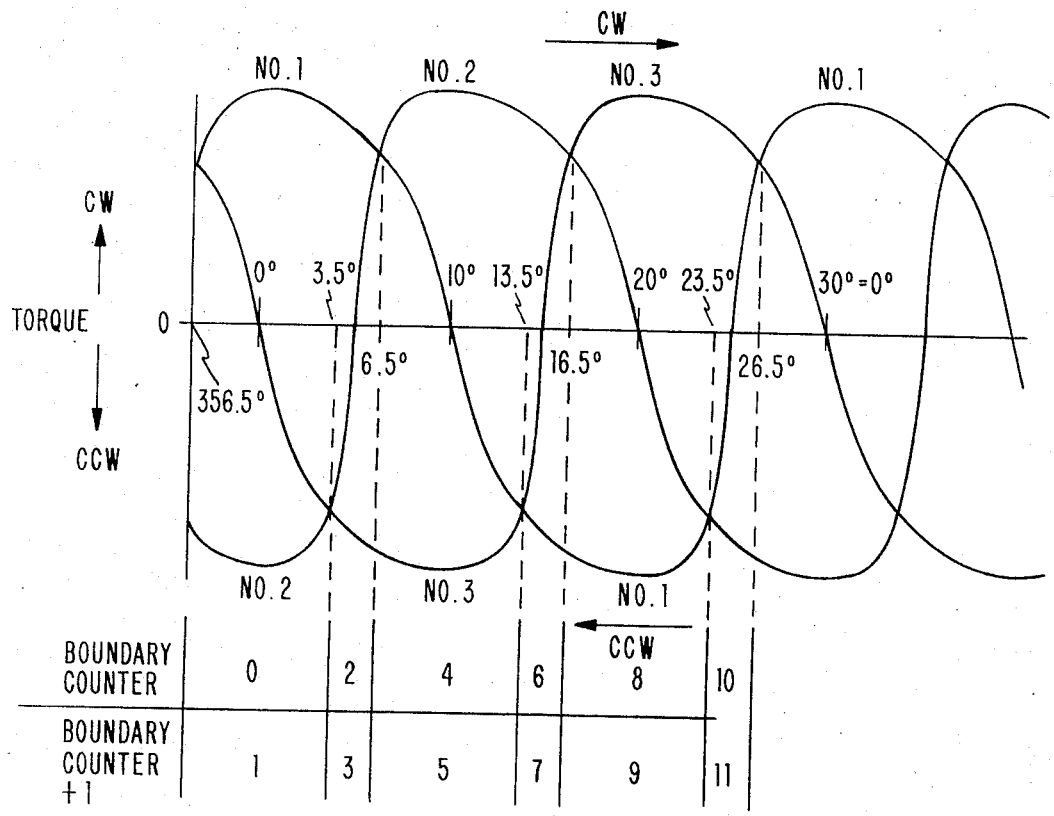
FIG. 18 is a graph showing the particular drivers that should be energized for securing maximum torque in the stepping motor illustrated in FIGS. 1 and 2.

Referring to the FIG. 18 graph, the curves labeled No. 1, 2, 3, 1, etc., refer to the particular drivers 714a, 714b and 714c that are on for applying either clockwise or counterclockwise torque on the rotor 500R. For portions of the curves above the abscissa, clockwise torque is applied onto the rotor. As rotor travel occurs along the abscissa, a movement to the right in the graph of FIG. 18 indicates clockwise rotor direction while a movement to the left in the graph indicates counterclockwise rotor direction. Thus the abscissa refers to rotor position, and the ordinates refer to torque on the rotor 500R.

Referring to the graph of FIG. 18, in the first range between 356.5° and 3.5°, the graph indicates the driver No. 1 shall be energized for clockwise torque on the rotor and driver No. 2 shall be energized for counterclockwise torque on the rotor. The FIG. 18 chart at the bottom of the figure further indicates that at this time the boundary counter has a content of 0 while the boundary counter +1 has a content of 1.

In the second range between 3.5° and 6.5°, driver No. 1 is energized for clockwise torque on the rotor, and driver No. 3 is energized for counterclockwise torque on the rotor. In this range, the boundary counter has a content of 2, and the boundary counter +1 has a content of 3. The third range is between 6.5° and 13.5°. In this range, the No. 2 driver is energized for clockwise torque on the rotor, and the No. 3 driver is energized for a counterclockwise torque on the rotor. The boundary counter has a content of 4 in this range, and the boundary counter +1 has a content of 5 in this range.

The next range is between 13.5° and 16.5°; and, in this range the No. 2 driver is energized for a clockwise torque on the rotor, and the No. 1 driver is energized for a counterclockwise torque on the rotor. In this range, the boundary counter has a content of 6, and the boundary counter +1 has a content of 7. Drivers Nos. 1, 2, and 3 are successively energized as the rotor 500R moves from its 16.5° position to a 356.5° position, and the contents of the boundary counter and the boundary counter +1 increase likewise. In this connection, the boundary counter may have a full content of 142, and the boundary counter +1 may have a full content of 143. These contents correspond to the final range of the rotor just before it reaches its 0 position, namely, in the range bounded by the 356.5° rotor position.

Modules 0 and 1 of main store 900 respectively contain clockwise and counterclockwise information, and each of these modules is addressed separately by special instructions. For each set of data withdrawn from either of these modules, two words of instruction are used. If, for example, main store module 0 is addressed, using the boundary counter contents as an address, this address points to the position in module 0 of store 900 containing the information necessary at the time and indicating which driver should be turned off for the desired torque in addition to other additional, boundary counter updating information later to be discussed in greater detail. In order to obtain all of the necessary information at each addressing operation, 16 bits are required. The system, however, is only 8 bits wide; and, therefore, for each of the 16 bit words, main store 900 is addressed twice. One of the two 8 bit words has the driver information plus 4 bits of the additional required information for boundary counter updating, and the other 8 bits in the other 8 bit word is information of the later category also. The 16 bits requirement necessitated the use of the two complementary registers 11 and 12, the boundary counter and the boundary counter +1. During the double addressing of main store 900 for securing the 16 bits of information, module 0, for example, is addressed first by the contents of the boundary counter and then is addressed by the contents of the boundary counter +1 so as to obtain as a result of the double addressing, a 16 bit word of clockwise information.

A second usage of the boundary counter and boundary counter +1 is that previously mentioned, essentially to count in order to keep track of the position in which the rotor 500R is located and to change in count as the rotor position changes. The position of the rotor is indicated particularly by the numbers 36 and 3565 in the first line of Table L just above given, the numbers 66 and 35 in the second line of the table, etc.

The incrementing and decrementing of the boundary counter and boundary counter +1 will be hereinafter described in connection with the microprogram, and this incrementing and decrementing takes place with the reception of clockwise and counterclockwise pulses from the encoder 526. For instance, if there is a clockwise pulse from the emitter 526, assuming that the contents of the boundary counter and boundary counter +1 are respectively 0 and 1, the numeral 36 is stored in module 0, and this is also the content of the master position counter at the time, the rotor 500R being at its 3.6° position. A clockwise pulse functions at this time, as the rotor reaches its 3.6° position, to update both the boundary counter and boundary counter +1 so that they contain the contents of 2 and 3 respectively. This content of the boundary counter and boundary counter +1 correspond to the second range above mentioned which starts at a rotor position of 3.6°. At his time, the "2" and "3" contents of the boundary counters are used to address main store 900. The 0 and 1 boundary counter content previously provided the proper driver information (No. 1 driver for clockwise direction of rotation, for example) in the first range; and, likewise the proper driver, No. 2 for clockwise torque, and No. 3 for counterclockwise torque, is indicated utilizing the "2" and "3" boundary counter contents in the second line of Table L. The encoder 526 provides a pulse for each tenth degree of rotation of rotor 500R, and the boundary counter and boundary counter +1 are only updated by the clockwise or counterclockwise pulses occurring at the particular contents of the modules in the third and fifth columns of Table L. The contents of the master position counter are compared with the values in the third and fifth columns of Table L contained in the modules so that the corresponding updating of the boundary counters takes place. On this updating, additional driver information becomes available, so that the proper driver as set forth in the FIG. 18 graph is energized to produce the appropriate torque on the rotor 500R.

Register 13, address register for main store, constitutes a register for containing a dummy address. The purpose of the address register 13 will become apparent from the following description of programming and has to do with the particular configuration of the microcontrol unit which is used and which is shown in FIG. 6. The contents of the address register 13 is hexadecimal ff (all 1's) so that is main store 900 is addressed with the contents of register 13, the last position in the main store 900 is addressed. The notation MSM0=FF in Table A implies that location FF in the 0 module of main store has the all 1's content.

Register 27 (input register) is used in connection with the start button of the microcontroller. When the contents of bit 0 in this register changes from 0 to 1, the program thereby begins operation.

Register 30, also designated as an input register, contains certain bits for specific purposes. Bits 5 and 7 are from the encoder 526, bit 5 indicating counterclockwise bits and bit 7 indicating clockwise bits. Bit 3 of register 30 is a move bit, and this bit is provided under the control of an external actuator and indicates that a peripheral device has completed its action. Bit 2 of register 30 is a bit provided from an external device indicating that rotor 500R is beginning to overspeed.

Register 3A is the output register. Bits 1, 2 and 3 of this register go directly to the various drivers 1, 2 and 3 (714a, 714b and 714c). Bit 0 in this register constitutes a signal that a move by a part of an external device (such as a document card punch) is complete. Additional punching action then is in order.

Register 04 contains status bits. Bit 0 of this register is termed the "2 bit9 which indicates that there has been an overshoot by the rotor 500R from its desired position of two-tenths of a degree with two counts from the encoder 526. As will be apparent from the following description, different routines are then in order. Bit 1 of register 04 constitutes a current cutoff indicator, indicating that the current to the drivers 7141–714c should be cut off under certain circumstances. The change limit bit, bit 2 of register 04, is a flag bit connected with the fine home routine, and its use will be apparent. Bit 3, fine home mode bit, when present indicates that slewing has been completed on a crossing of the desired position of rotor 500R, so that a change is then made to fine home mode. Bit 4 of register 04 is a so called "once only" bit indicating that the rotor 500R has crossed its desired position and that the direction of the rotor has then been reversed for the first time. Bit 5 is the so called "first time through" bit and is set by the first pulse from the emitter 526 after an initial change in direction of the rotor. Bit 6 is a "coast" bit which indicates that all of the drivers 714a, 714b and 714c should be de-energized. Bit 7 is a so called "direction" bit and indicates that, at the last time that the rotor 500R crossed its desired position, the rotor was rotating in either its clockwise or counterclockwise direction.

Register 08 contains additional status bits. Bit 4 is a slew mode float indicator, and the contents of this bit position indicates that rotor torque should be reversed. Bit 6 of register 08 causes a doubling up of opposing drivers which are energized at the same time in this doubling up as will be subsequently described.

Figure 7:
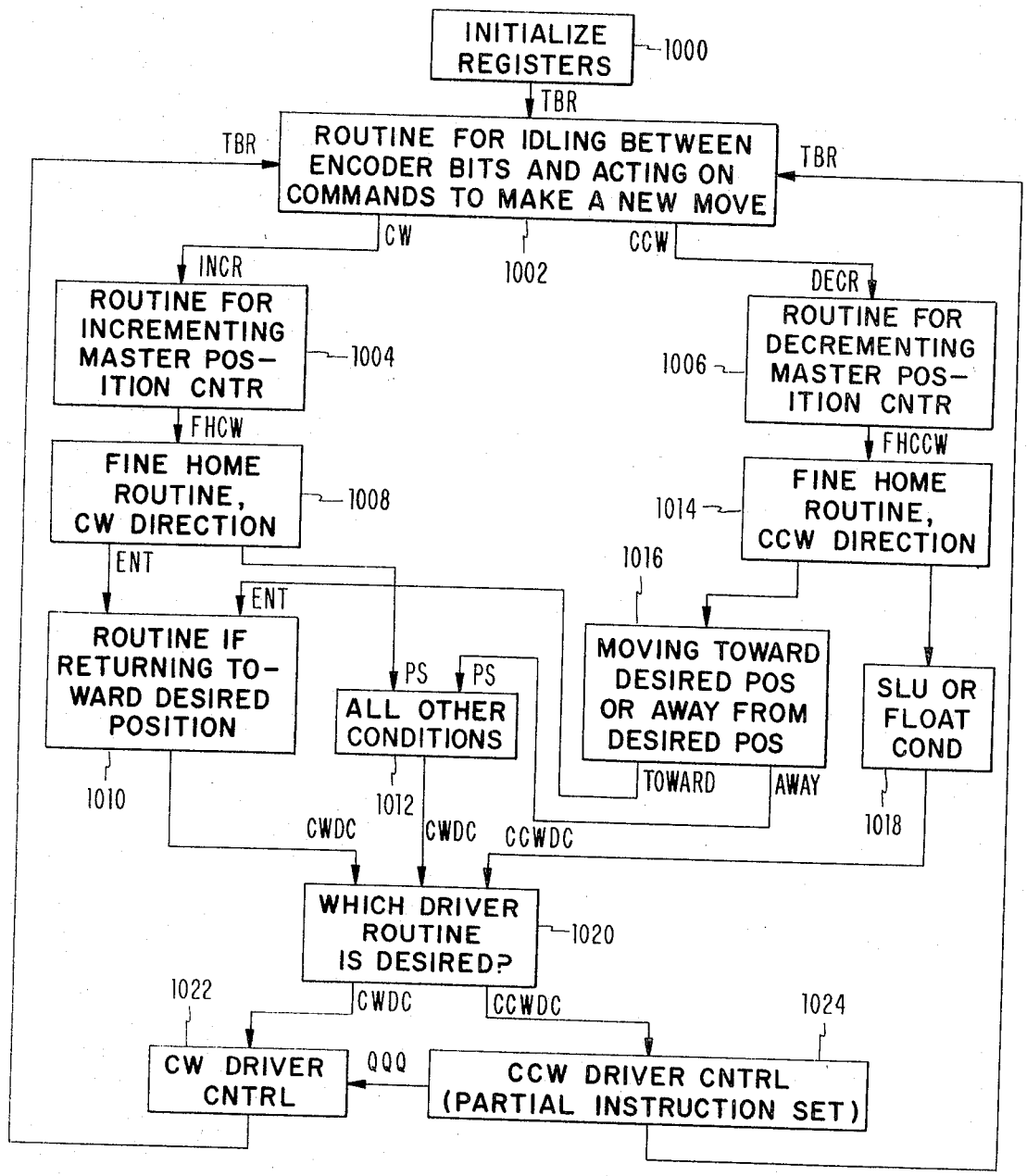
FIG. 7 is a flow diagram illustrating generally the programming for the microprogram control unit of FIG. 6 for producing the same rotor positioning results as the FIG. 3 circuitry.

The stepping motor control program of the invention is shown generally in FIG. 7. The first routine is the program, as illustrated in FIG. 7, is that of initializing the various registers used in the program, and this is indicated by block 1000 in this figure entitled "Initialize Registers." This routine indicated generally by block 1000 is illustrated in greater detail in FIG. 8 and includes procedures for setting the various registers to zero or to other desired values.

Figure 8:
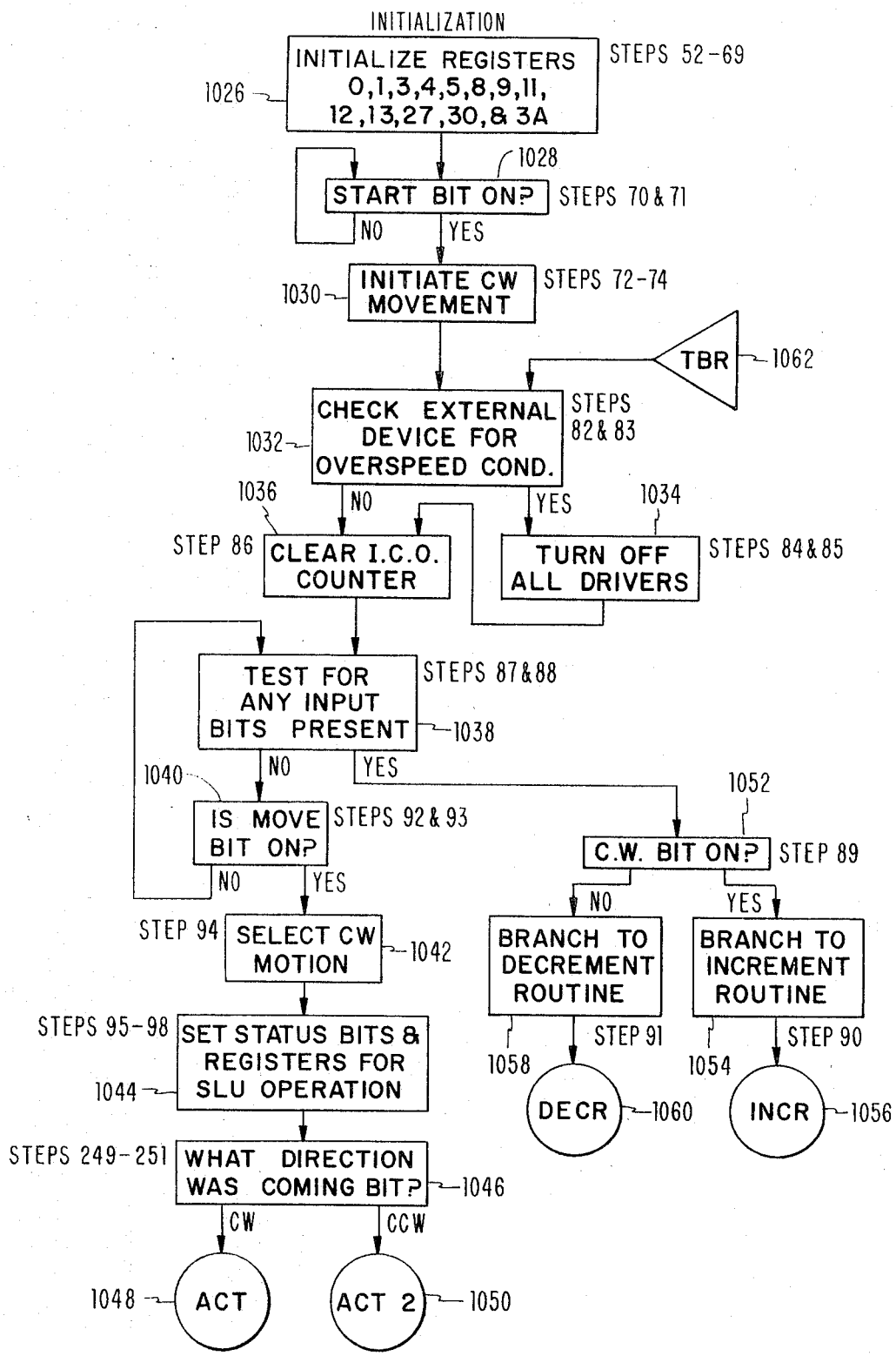
FIG. 8 is a flow diagram illustrating an initialization routine.

The following routine is indicated by block 1002 entitled "Routine for Idling Between Encoder Bits and Acting on Commands to Make a New Move." This routine is also illustrated in FIG. 8 in greater detail. Encoder bits from the emitter 526 are operative to control the microprogram, and these encoder bits may be either clockwise or counterclockwise, depending on the direction of the rotor 500R. Such an encoder bit at least updates the condition of the master position counter (registers 00 and 01 previously referred to) which requires less than 10 microseconds for a certain embodiment of the invention. Assuming that the rotor 500R is moving at a fairly low speed, the program will idle after the 10 microseconds period has expired; also, if fine home mode has finished acting to position the rotor 500R in the desired position, there ar no encoder bits being generated under these circumstances, and the program again will be idling as indicated by block 1002. The move bit from the external device (bit 3 of input register 30 listed in Table A) also acts in the area 1002 and indicates that the external device has completed an operation.

Subsequent to the idling routine 1002, either an incrementing routine as set forth in block 1004 or a decrementing routine as set forth in block 1006 may follow. If clockwise pulses are being received from the emitter, the incrementing routine 1004 is active. If counterclockwise pulses are being received from the emitter, the decrementing routine 1006 is operative. The incrementing routine is set forth in greater detail in FIG. 9, and the decrementing routine is set forth in greater detail in FIG. 14. More specifically, the routine 1004 increments the master position counter (registers 00 and 01 in Table A); and the boundary counter (registers 11 and 12 in Table A) is examined, and this counter is also updated if necessary.

Figure 10:
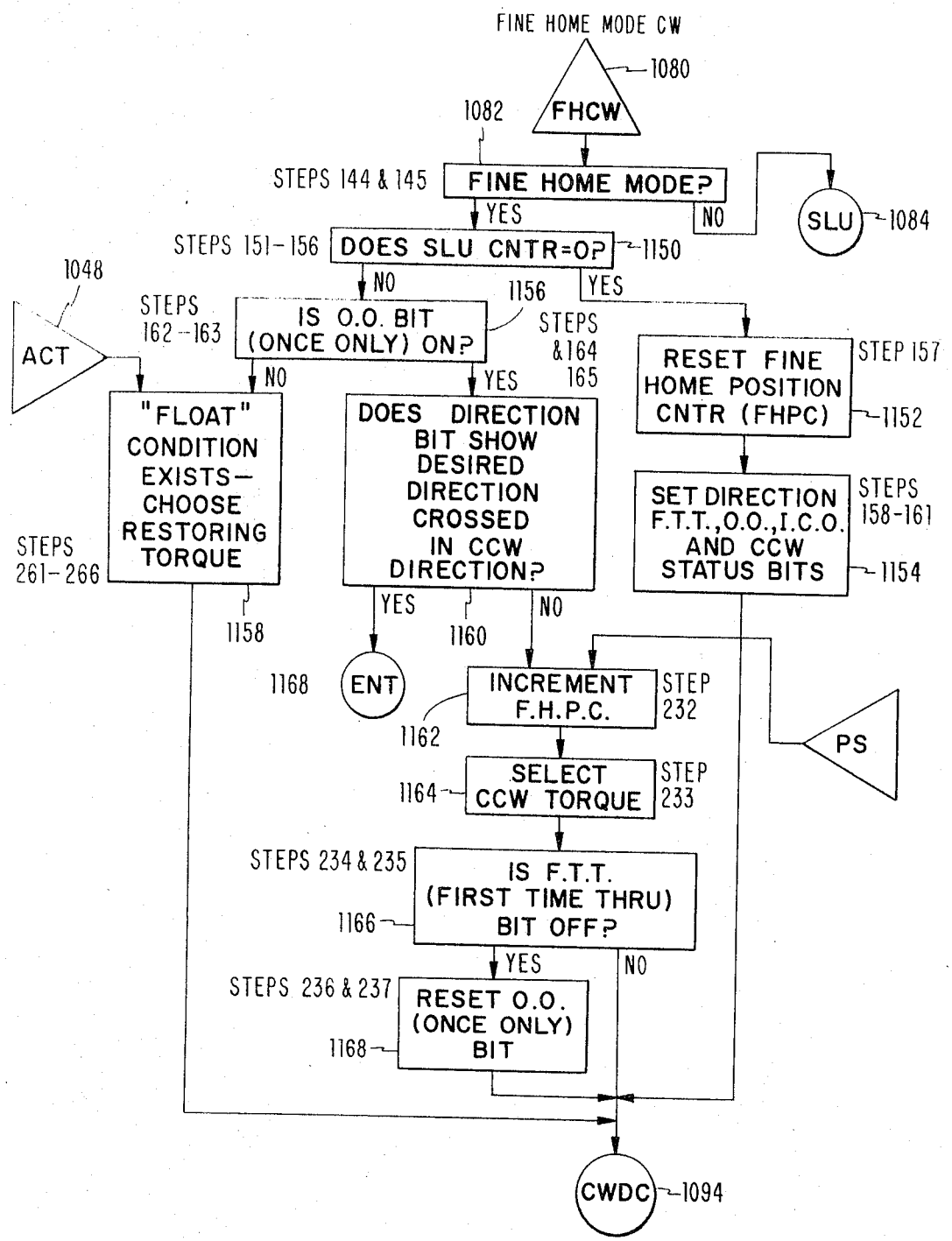
FIG. 10 is a flow diagram illustrating a fine home mode routine.

The fine home routine in the clockwise direction is indicated by block 1008 and is shown in greater detail in FIG. 10. Routine 1008 determines whether or not the system is in fine home mode; and, if so, where in the particularly point in fine home mode the system is operating. Depending on where the system is operating in fine home mode or if it is not, the routines in blocks 1010 and 1012 become effective. The routines in blocks 1008, 1010 and 1012 are tied quite closely together; and the routines in blocks 1010 and 1012 are shown in greater detail in FIGS. 11, 12 and 13. The legends in FIG. 7 of "ENT" and "PS" stand respectively for "Enter" and "Positive Slope." Positive Slope indicates, in general, that the rotor 500R is moving away from its desired position. As long as the rotor is moving away from its desired position, restoring torque should be applied to the rotor, and there are no decisions to be made by the program. On the other hand, if the rotor is returning toward the desired position, the program is required to make a number of decisions, including proper switching of the drivers. Routine 1012 entitled "All Other Conditions" includes slewing, while the fine home routine is not only included in routine 1008 but parts thereof are also included in routines 1010 and 1012.

The routine for decrementing the master position counter shown by block 1006 is quite comparable to routine 1004 but is for the counterclockwise direction. Routine 1006 is shown in greater detail in FIG. 14 and leads to the fine home routine shown in block 1014. The routine shown in blocks 1016 and 1018 follow the fine home routine indicated by block 1014, and the routine in all three blocks 1014, 1016 and 1018 are shown in greater detail in FIG. 15. The routines 1010 and 1012 follow the routine 1016, with the same routines 1010 and 1012 being used for both directions of rotation of the rotor.

Figures 9, 17:
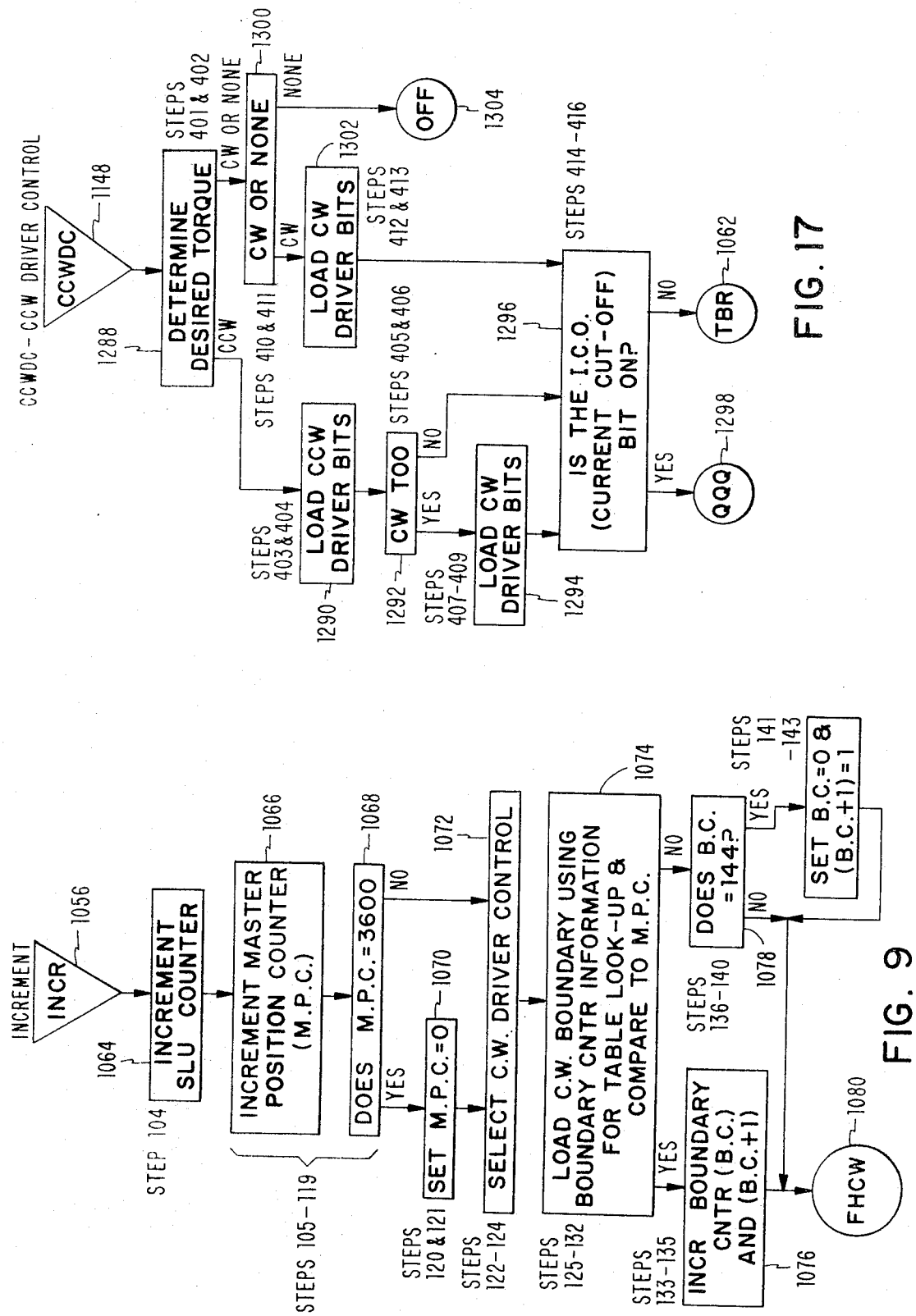
FIG. 9 is a flow diagram illustrating an increment routine.
FIG. 17 is a flow diagram illustrating a counterclockwise driver control routine, all of the routines of FIGS. 8 to 17 being included in the general control program illustrated in FIG. 7.
Figure 16:
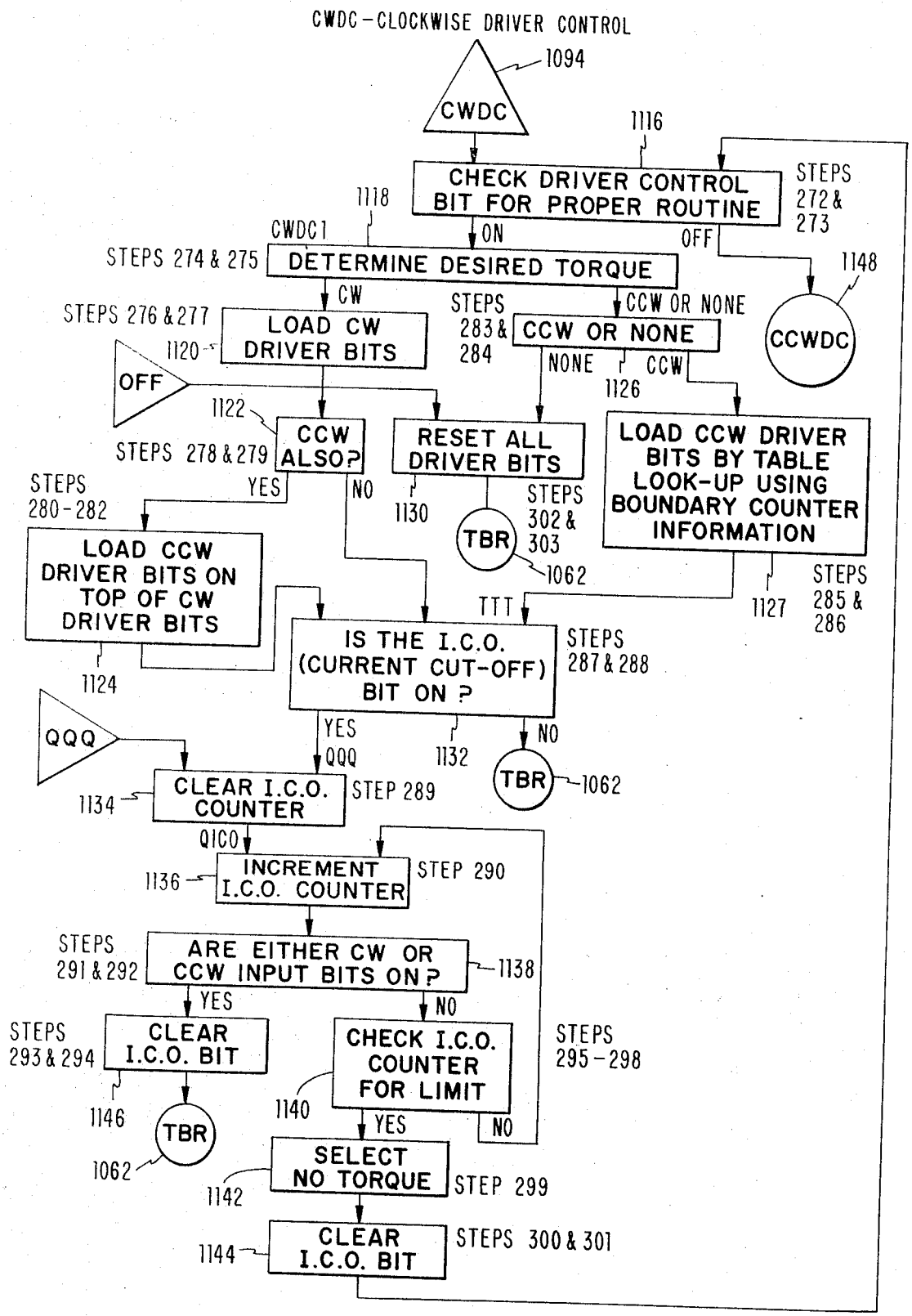
FIG. 16 is a flow diagram illustrating a clockwise driver control routine.

Block 1020 entitled "Which Driver Routine is Desired" follows blocks 1010, 1012 and 1018 with blocks 1010 and 1012 relating to clockwise driver control situations, while block 1018 is directed to a slew or float condition for the counterclockwise direction. Block 1022 relating to clockwise driver control follows block 1020, and the details of the routines in both of these blocks are shown in FIG. 16. Block 1022 relates to clockwise driver control, and block 1024, which also follows block 1020, relates to counterclockwise driver control. Details of routine 1024 are shown in FIG. 17; and as indicated by the line QQQ, the counterclockwise driver control routine is augmented by some of the clockwise driver control routine of block 1022.

Referring now to FIG. 8, block 1026 indicates that registers 0, 1, 3, 4, 5, 8, 9, 11, 12, 13, 27, 30 and 3A are initialized. These are registers listed in Table A; and, as indicated on FIG. 8 adjacent block 1026, the subroutine of block 1026 is carried out by means of steps 52 to 69. These steps are set forth in Table B; and, likewise, the other steps in the microprogram set forth in Tables B-K are indicated for each of the other blocks of FIGS. 8-17 in the same manner. In brief, by means of steps 52-69, registers 00 and 01 are set to 0; register 3 is first set to 0 and is then incremented so that it then has a count of one therein; registers 4 and 5 are set to 0; register 3A has a count of 16 provided therein so as to turn on driver No. 3, 714c (see FIG. 3f), which causes the rotor 500R to move to the position indicated by energization of driver No. 3 alone, setting the rotor 500R in its initial position; registers 8, 9 and 11 are set to 0; register 12 is reset to 0 and is then incremented so that it has the count of 1 therein; register 13 is set to have a count of hexadecimal ff therein. Then, as indicated by step 67, in main store module 0 at location ff, hexadecimal ff or all 1's is stored. In addition, register 27 is cleared so as to reset the start bit, and register 30 is cleared to have 0 contents. At this time, the program temporarily halts, awaiting the raising of the start bit.

The start bit, which is in the input register 27, is raised by depressing the start button of the microcontrol unit. The loop on the block 1028 indicates that a test is continually made for the existence of the start bit; and, when the program determines that the start bit is raised, the subroutine in block 1030 is then effective. The subroutine in block 1030 results in the driver for clockwise torque being energized. It will be borne in mind that driver No. 3 has previously been energized, and therefore subroutine 1030 results in driver No. 1 being energized so as to apply clockwise torque onto the rotor 500R.

At this time, according to block 1032, the overspeed bit (bit 2 of input register 30) is checked so as to determine whether or not the speed of the motor of the attached external device is overspeed. If this bit is raised, according to block 1034, all of the drivers 714a–714c are turned off which causes a slowing down of the motor. If the speed of the driving motor of the external device is not excessive, the ICO counter (register 07) is then cleared according to block 1036. Thus, when counting by means of the ICO counter to produce a time delay, this counting always begins from 0 register contents.

Block 1038 indicates that at this time a test is made for any clockwise or counterclockwise bits from the emitter 526. In the event that there are no emitter bits, the subroutine in block 1040 is effective to determine if the move bit (bit 3 of register 30) is raised. If there is a raised move bit, then rotor rotation is in order; and clockwise rotor rotation is selected according to block 1042. In addition, according to block 1044, the status bits for slewing are set (bit 4 of REG. 08=1, all bits REG. 04=0, bit 3 REG. 30=0). At that time, the direction of the incoming bit from the emitter 526 is determined according to block 1046. The ACT block 1048 and the ACT 2 block 1050 constitute outputs with respect to the block 1046, and these constitute inputs for the fine home mode clockwise routine illustrated in FIG. 10 and the fine home mode counterclockwise routine illustrated in FIG. 15 which will be subsequently described in greater detail. Although, when the rotor 500R first begins to turn in the clockwise direction and the FIG. 10 and FIG. 15 routines are entered by means of blocks 1048 and 1050, actually the system is not yet in fine home mode; and slewing takes place.

In the event that a move bit is not raised in accordance with block 1040, the subroutine set forth in block 1038 is re-entered, this occurring at the time that the peripheral device does not request an additional movement of the rotor. The subroutine according to block 1038 then tests again for any input bits from the emitter 526. If there are any such bits with movement of the rotor 500R, a test must be made to determine the direction of the bits, clockwise or counterclockwise. If the input bit is clockwise, the increment routine of FIG. 9 occurs, while if the input bit is counterclockwise, the decrement routine of FIG. 14 becomes effective. The direction is determined according to the subroutine in block 1052; and, if the clockwise bit is on, the subroutine in block 1054 is effective providing an output in block 1056 which constitutes an input for the increment routine illustrated in FIG. 9. If there is no clockwise bit raised, the next subroutine is indicated by block 1058 which probides an output to block 1060 constituting an input to the decrement routine illustrated in detail in FIG. 14.

The initialization routine shown in FIG. 8 is also responsive to a test bit routine initiated according to block 1062 rendering subroutine 1032 effective.

The increment routine will now be described in connection with the showing of FIG. 9. The increment routine is made effective from block 1056 derived from FIG. 8, and the first action in the increment routine is indicated by block 1064 in which the slew counter (register 09), which indicates the amount of movement of the rotor 500R, is incremented. At the same time, the master position counter (registers 00 and 01) is incremented according to the subroutine indicated by block 1066. The count in the master position counter is then tested to determine if it amounts to 3600 (corresponding to 360° of rotation of rotor 500R); and, if the count therein does amount to 3600, the master position counter is then set to 0 in accordance with the subroutine set forth in block 1070. In the event that the count is less than 3600 in the master position counter, the clockwise driver control is selected according to block 1072, and this has a subsequent effect on the clockwise and counterclockwise driver control subroutines illustrated in FIGS. 15 and 16.

The boundary counter (registers 11 and 12) is then checked, and the clockwise boundary is loaded into the boundary counter, with a compare then being made to the contents of the master position counter as set forth in subroutine 1074. If the comparison is successful, boundary counter contents should be updated. This is done according to subroutine 1076.

If the contents of the boundary counter does not equal the contents of the master position counter, then the contents of the boundary counter is checked for its maximum value of 144 according to block 1078 (a count of 144 is the same as 0). If the count is 144, boundary counter register 11 is set to zero, and boundary counter register 12 is set to the count of 1 according to block 1079. In all cases, transfer is subsequently made by block 1080 to the fine home mode clockwise routine as shown in FIG. 10.

Referring to FIG. 10, the program determines whether or not the system is in fine home mode as set forth by the subroutine in block 1082. If the system is not in fine home mode, transfer is made to the slew mode routine shown in FIG. 13 which will now be described.

In slew mode, according to block 1086, the contents of the slew counter (register 09) are checked for a match with the desired position. The desired position is represented by a fixed number and is contained in an instruction. If there is no match, then a determination is made as to whether the reverse torque point has been reached in accordance with block 1088. If, for example, the rotor 500R should be moved through 70 counts or pulses from emitter 526, then the reverse torque point may amount to 60 counts at which reverse torque is applied unto the rotor. If the reverse torque point has not been reached, such as if, for example, the friction on the shaft 502 is too great, and the rotor 500R turns around before it reaches the reverse torque point, the slew float bit (bit 4 of register 08) is raised in accordance with block 1090. If the slew float bit is raised, the program proceeds to block 1048 which specifies transfer to fine home mode clockwise subroutine illustrated in FIG. 10. If the program is at block 1048, this indicates that the rotor should reverse. If the slew float bit is not raised, no additional action need be taken at this point; and the program proceeds to the clockwise driver control block 1094 which specifies transfer to the clockwise driver control routine illustrated in FIG. 16.

Figure 13:
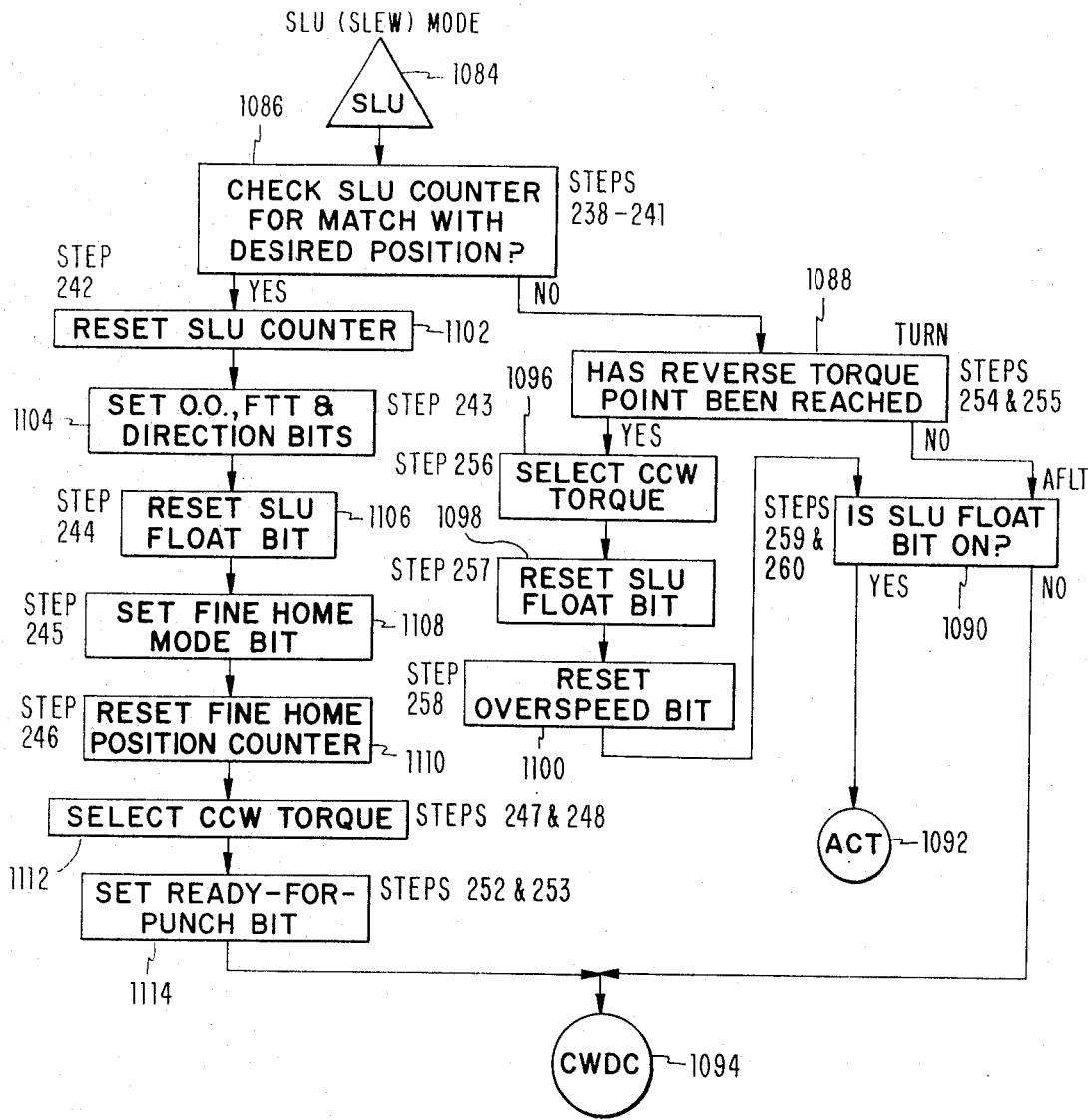
FIG. 13 is a flow diagram illustrating a slew mode routine.

If the system is at the point of rotor rotation at which the torque on the rotor should be reversed, the subroutine indicated by block 1096 is effective indicating that restoring torque, that torque which will drive the rotor toward the desired position, should be applied to the rotor 500R. Thereupon the slew float bit (bit 4 of register 08) is reset to 0, and the same action occurs with respect to the overspeed bit as indicated by block 1100, assuming that these bits have previously been raised. The subroutine in block 1090 is then effective as indicated in FIG. 13.

If the slew counter (register 09) matches with the desired position, referring to block 1086, then the system should change from slew mode to fine home mode. The following subroutines are then quite similar to those of the initialization routine illustrated by FIG. 8 and include the subroutines 1102, 1104, 1106, 1108, 1110, 1112 and 1114. The slew counter is reset as indicated by block 1102; the status bits (bits 4, 5 and 7 of register 04) are set according to block 1104; the slew float bit (bit 4 of register 08) is reset according to block 1106; the fine home mode bit (bit 3 of register 04) is set according to block 1108; the fine home position counter (register 05) is reset according to block 1110; counterclockwise torque, the desired torque at the time for rotor 500R, is selected according to block 1112; and a ready for punch bit is set according to block 1114. Execution of block 1094 subsequent to the setting of the ready for punch bit, as well as after a determination according to block 1090 that the slew float bit is not on, provides transfer to the clockwise driver control routine set forth in FIG. 16 which will now be referred to.

According to block 1116 in FIG. 16, initially a check is made to determine which of the clockwise and counterclockwise driver routines is appropriate. This is done by checking the driver control bit (bit 6 of register 08). If the driver control bit is raised, the program proceeds to block 1118 where the clockwise routine really begins. In routine 1118, it is first determined whether clockwise torque is appropriate or whether counterclockwise or no torque is appropriate. If clockwise torque is appropriate, the clockwise driver bits are loaded into main store as indicated by block 1120. The program then determines whether counterclockwise torque is also appropriate as indicated by block 1122. There are cases, as has been previously described, in which both clockwise and counterclockwise torque are applied onto the rotor 500R. If counterclockwise torque is also appropriate at the time, the counterclockwise driver bits are loaded on top of the clockwise driver bits as indicated by block 1124.

Referring again to block 1118, in the event that it is determined, according to this block, that the proper torque is in the counterclockwise direction or that no torque should be applied, the subroutine in block 1126 is effective. Subroutine 1126 determines whether the proper torque is in the counterclockwise direction or that none should be applied; and, if the counterclockwise torque is proper, subroutine 1128 is in effect. If no rotor torque is proper, all of the driver bits are reset in accordance with block 1130, and then the test bit routine having input 1062 and shown on FIG. 8 is effective.

According to subroutine 1128, the counterclockwise driver bits are loaded. Subsequent to subroutines 1122, 1124 and 1128, subroutine 1132 is effective; and, by means of subroutine 1132, the ICO bit (bit 1 of register 04) is checked. If the energizing current for the drivers is to last only 120 microseconds, subroutine 1134 is effective; however, if there is to be no such limitation on the current, the test bit routine shown in FIG. 8 is made entered through block 1062. The system then idles, waiting for the next emitter bit.

In the event that the time of current application is to be limited to the 120 microseconds, the current cutoff counter (register 07) is first cleared according to subroutine 1134 and then looping occurs by means of the following subroutines. The ICO counter (register 07) is incremented according to subroutine 1136 and then a check is made by means of subroutine 1138 to determine if either clockwise or counterclockwise input bits exist. If there are none, subroutine 1140 is then effective to check the current cutoff counter (register 07) to determine if it contains its count limit. If not, a loop is made back to block 1136, and this looping continues until the 120 microsecond interval has occurred at which time the ICO counter has its count limit therein. When the count in the ICO counter is at its limit, subroutines 1142 and 1144 become effective. According to subroutines 1142 and 1144, no torque is selected and all drivers are turned off and the ICO bit is cleared whereupon subroutine 1116 again becomes effective.

In the event that there is a clockwise or a counterclockwise bit raised, referring to block 1138, the ICO bit is cleared according to subroutine 1146, and then the test bit routine shown in FIG. 8 becomes effective.

After this looping for timing purposes, subroutine 1116 is then again effective, and it is then determined that no torque is appropriate so that subroutines 1126 and 1130 are effective. All of the driver bits are reset according to subroutine 1130, and the test bit routine of FIG. 8 then occurs. Referring again to block 116, if the driver control bit (bit 6 of register 08) is off, the counterclockwise driver control programming shown in FIG. 17 is effective, entry being made through block 1148.

Slew mode has thus been accomplished by means of the programming illustrated in FIG. 16; and fine home mode follows slew mode, fine home mode for the clockwise direction being illustrated by means of FIG. 10.

As previously described, the existence of fine home mode was checked by means of subroutine 1082 shown in FIG. 10; and, if fine home mode for clockwise direction is effective, the slew counter (register 09) is checked to determine if its content is 0 according to subroutine 1150. If the slew counter contains a count of 0, the fine home position counter (register 05) is reset as is indicated by block 1152; and this occurs at just the time that the rotor 500R crosses the desired rotor position and begins moving away from the desired position. An initialization then occurs as set forth in block 1154 and the direction, first time through, once only, ICO and CCW status bits are set. These are respectively bits 7, 5, 4, 1 of register 04 and bit 6 of register 08.

On the other hand, if the contents of the slew counter does not equal 0, then a determination is made as to whether the once only bit is on according to subroutine 1156. This bit is on if the rotor 500R has changed direction, and the rotor is moving away from the desired position. If these conditions do not exist and the once only bit is not on, a float condition exists as indicated by block 1158; and action must be taken so as to provide a restoring torque on the rotor 500R to bring it back toward the desired position. Blocks 1158 and 1154 provide transfer to the CWDC routine block 1094 of FIG. 16; and, as previously described, in the FIG. 16 routine, the proper direction of torque application is determined.

If the once only bit is on, then determination is made whether the direction bit (bit 7 of register 04) shows that the desired position crossed by the rotor 500R was in the counterclockwise direction, according to block 1160. At this point, the basic fine home mode is in effect entered; and one routine exists for the condition in which the rotor 500R is moving away from the desired position (positive slope), and another routine exists for the condition in which the rotor is moving toward the desired position. If the rotor 500R is moving away from the desired position, there are in effect no decisions to be made. In this case, the "No" output of block 1160 exists, and subroutine 1162 becomes operative. This condition would exist, for example, if the driver control indicator (bit 6 of register 08) is one and the rotor is moving in a clockwise direction, indicating that the rotor is going away from the desired position. In this case, the fine home position counter (register 05) is incremented according to block 1162; counterclockwise torque is selected for the restoring torque according to block 1164; and a check is made to determine if the first time through bit (bit 5 of register 04) is off according to block 1166. If this bit is raised, conditions are normal; however, if the first time through bit is off, in this case the once only bit is reset as indicated by block 1168. In either case, a transfer through block 1094 is made to the clockwise driver control routine shown in FIG. 16.

Figure 11:
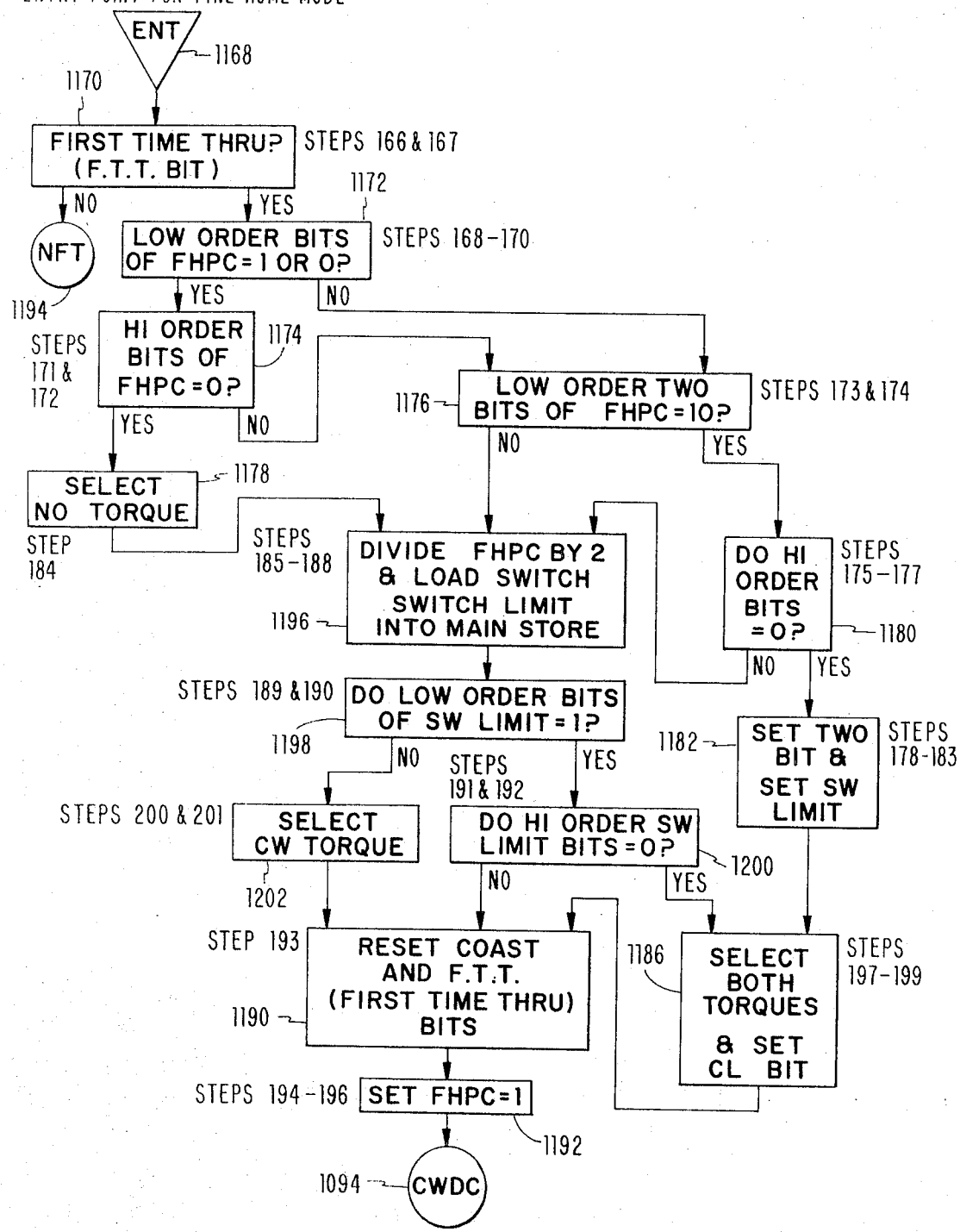
FIG. 11 illustrates the routine "entry point for fine home mode"

Referring again to block 1160, if the rotor 500R has changed direction and is coming back toward its desired position, then the routine shown in FIG. 11 is entered, this being by means of the entry point 1168 from block 1160.

Referring to FIG. 11, the first action in this entry routine is to check the first time through bit (bit 5 of register 04) according to block 1170, determining whether this is the first time that the rotor 500R has changed direction. If so, subroutines 1172, 1174 and 1176 are operative to select between three different conditions. These three conditions correspond to the 0, 1 or 2 content of the fine home mode position counter (register 05). The subroutine in the block 1172 determines whether the low order bits of the fine home mode position counter amounts to 1 or 0. The fine home mode position counter includes 8 bits altogether, and the subroutine 1172 thus in effect checks to determine whether the four lower bits in this counter are either 0000 or 0001. If so, the subroutine shown in block 1174 is operative to determine whether the high order 4 bits of the fine home mode position counter equal 0, that is, whether the 4 higher order bits are all zeros. If so, the select no torque subroutine shown by block 1178 is effective. It has thus been determined that the overshoot of the rotor 500R is either 0 or 1 counts (1 count corresponds to one-tenth degree rotation of shaft 502); and, under these conditions, no torque is desired on rotor 500R.

In the case in which the four low order bits in the fine home mode position counter amount to more than 0 or 1, in this case the low order 2 bits in the fine home mode position counter are checked to determine if they are respectively 1 and 0, this being done by means of subroutine 1176. This amounts to a special condition in which the rotor 500R has overshot its desired position by two counts, but this again necessitates a checking of the four high order bits in the fine home mode position counter; and this is done by the subroutine in block 1180. If the 4 high order bits in this counter amount to 0, the count of 2 (00000010) does indeed exist in the fine home mode position counter. Thereupon, as indicated by block 1182, the 2 bit (bit 0 of register 04) is set, and the switch point is set as indicated by block 1184. The switch point may be either 0 or 1, and this limit is first retained in the Y register 920 and then is loaded into main store 900. The switch point corresponds to that point at which the drivers are initially switched and at which both clockwise and counterclockwise torques are effective on the rotor 500R. Then, a selection of both torques (clockwise and counterclockwise) is made as indicated by block 1186; and the change limit bit (bit 2 of register 04) is set as indicated by block 1188. Thereupon, the coast and first time through bits (bits 6 and 5 of register 04) are reset as indicated by block 1190, and the fine home mode position counter (register 05) is set to 1 as indicated by block 1192. As has been previously mentioned, the count of 1 is added to the content of the fine home mode position counter before a division by 2 is made of the contents of this counter, and subroutine 1192 causes this addition of 1 to the contents of the counter. Routine 1192 results in a transfer through block 1094 to the clockwise driver control routine set forth in FIG. 16.

It will be noted that the first time through bit (bit 5 of register 04) is reset by subroutine 1190; and, therefore, the routine just described takes effect only one time, since subsequently the decision made in accordance with block 1170 is negative so that a branching by means of block 1194 is made to the routine shown in FIG. 12.

In the event that the contents of the fine home mode position counter is greater than 2, the subroutine in block 1196 is effective to divide the contents of the fine home position counter by 2 and to load the switch point into the main store 900. The switch point amounts to the overshoot by the rotor 500R from its desired position plus 1 divided by 2. For example, if the rotor overshoots its desired home position by 7 counts or seven-tenths degree, the switch point will be (7+1)÷2=4. The subroutine indicated by block 1196 is also shown in FIG. 11 to be rendered effective by the subroutine in block 1178; however, since subroutine 1178 is only effective for counts of 0 and 1 in the fine home mode position counter, there is no division by 2 as this time. Then, according to block 1198, the low order bits of the switch limit are checked to determine if they equal 1. If so, the high 4 bits of the switch limit are checked to determine if they equal 0 by the subroutine indicated by block 1200, thus indicating that the switch point indeed is a 1. In this case, the subroutine 1186 is then again effective. If, on the other hand, the switch limit is not 1, clockwise torque is selected by subroutine 1202; and both subroutines 1200 and 1202 cause subroutine 1190 to be effective as previously described.

Thus, the FIG. 11 routine in effect takes care of the special cases in which the fine home position counter has a count of 0, 1 or 2 corresponding to an overshoot of the desired position by the rotor of 0, 1 or 2 tenths of a degree. In other cases, when the overshoot count is greater than 2, this count is divided by 2, as previously mentioned, according to subroutine 1196.

It will now be assumed that the rotor 500R has crossed its desired position once and is on its way back toward the desired position. Under these circumstances, the not first time through routine of FIG. 12 is effective. Referring to FIG. 12, the fine home mode position counter (register 05) is again incremented as indicated by block 1204, and then a check is made to determine if the coast bit (bit 6 of register 04) is on as is indicated by block 1206. If the coast bit is on, counterclockwise torque is selected as indicated by block 1208. Then a check is made to determine if the switch point has been reached in the fine home mode position counter as indicated by block 1210. As previously mentioned, the switch point is the original rotor overshoot in counts plus 1, with this sum divided by 2; and the switch point is stored in main store 900. If, according to block 1210, the switch point has not been reached, the program simply proceeds to energize the drivers, providing a signal in input block 1094; while, if the switch point has been reached, no torque is selected according to block 1212.

If the coast bit (bit 6 of register 04) is not on, a check is then made according to block 1214 to determine if the change limit bit is on. The coast bit has been previously reset, and the change limit bit has been previously reset to be off. Under these conditions, the switch point is checked in accordance with block 1216 to determine if the switch point has been reached. Assuming that the switch point has not been reached, the torque on the rotor remains the same as previously, and a transfer is provided from subroutine 1216 through block 1094 to the clockwise driver control routine shown in FIG. 16.

Eventually, the switch point on continued rotation of the rotor 500R will be reached; and both torques (both clockwise and counterclockwise) are selected in accordance with block 1218. Thereupon, the change limit bit is set in accordance with block 1220; and, at the time of the next passage through the FIG. 12 routine, subroutine 1214 recognizes that the change limit bit is now on. At this time, a selection is made according to block 1222 to counterclockwise torque only, so as to change the torque application on the rotor 500R from both torques (note block 1218) to only the counterclockwise torque. The change limit bit is then reset in accordance with block 1224, and the coast bit is set in accordance with block 1226. The fine home mode position counter (register 05) is then cleared in accordance with block 1228, and a check is made to determine if the two bit (bit 0 of register 04) is on in accordance with block 1230. If the two bit is on, this indicates that the rotor 500R has overshot its desired position by two counts (two-tenths degree). Incidentally, a passage through the subroutines 1222, 1224, 1226, 1228 and 1230 is made only once during each homing movement of the rotor 500R.

If the two bit is on (note subroutine 1230), the ICO bit is set in accordance with block 1232; and the ICO bit, as previously explained, provides the 120 microsecond timeout period. The two bit is then reset in accordance with block 1234. As is apparent, the only circumstance requiring the 120 microsecond timeout period is when the 2 bit is on, and the program as just described accomplishes this result. If the 2 bit is not on, the input 1094 is directly controlled from block 1230, as is apparent.

Figure 12:
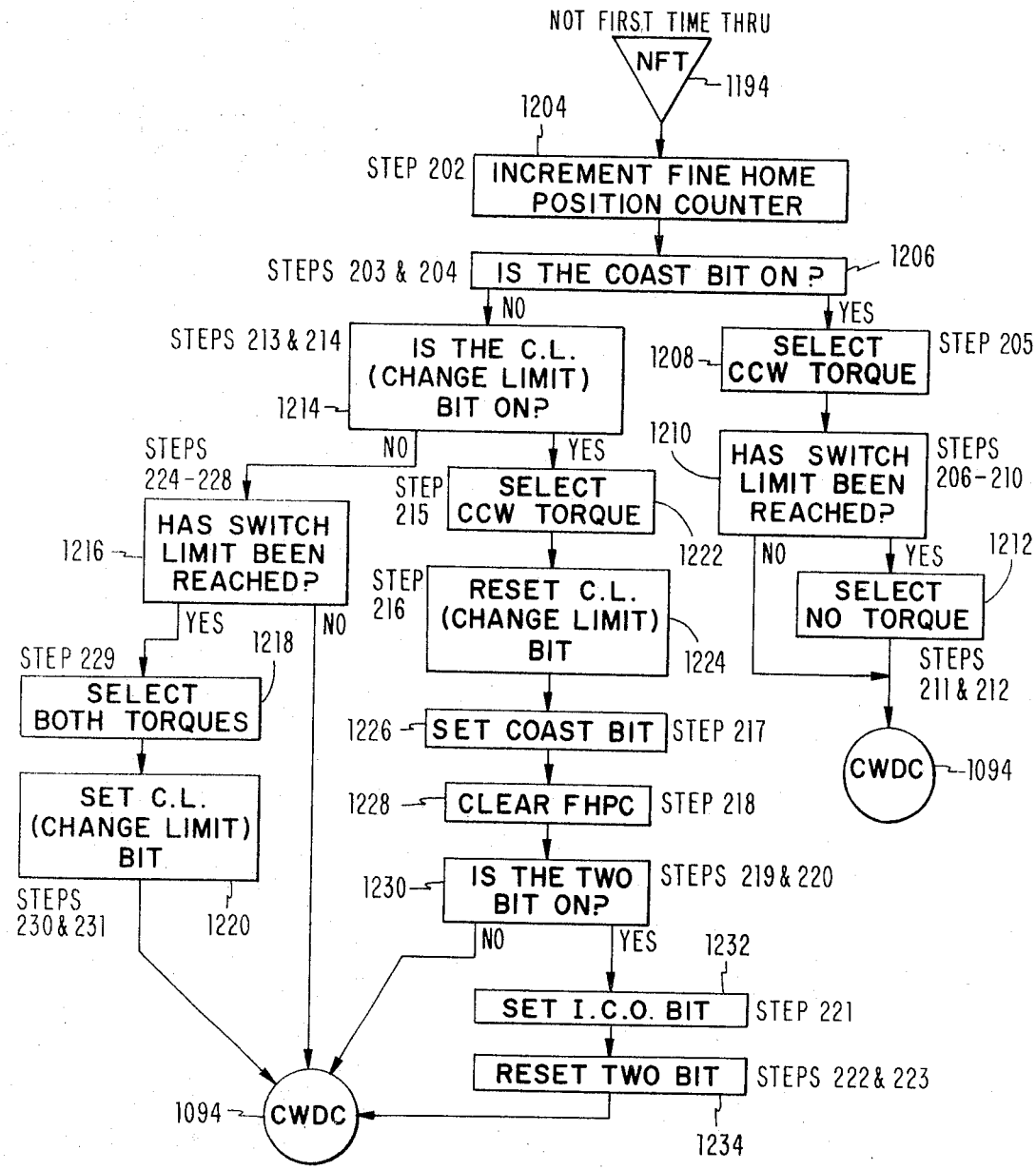
FIG. 12 is a flow diagram illustrating a "not first time through" routine.

Assuming that the two bit has been on, the next time that a passage is made through the FIG. 12 routine, the coast bit is on (note block 1226), and the program passes from block 1206 to block 1208 by means of which counterclockwise torque is selected. A check is then again made against the switch point (block 1210); and, at this time the switch point has been reached with this subsequent passage through the FIG. 12 routine, and no torque is selected in accordance with block 1212.

Consideration will now be given to the fine home mode counterclockwise direction routine illustrated in FIG. 15. The program steps for the fine home mode counterclockwise direction parallel to some extent those in the fine home mode clockwise direction routine shown in FIG. 10. First, a check is made to determine if the system is in fine home mode according to block 1236. If not, the slew float bit (bit 4 of register 08) is set according to block 1238, and restoring torque is applied according to block 1240. An input signal is thus applied on to the input block 1148 of the FIG. 17 routine.

Incidentally, with respect to the driver control routine in the counterclockwise direction shown in FIG. 17 and which will be more fully subsequently described herein, slewing according to the illustrated program occurs only in the clockwise direction to which the routine of FIG. 10 refers. This is due to the fact that the general direction of movement of the rotor 500R is in a clockwise direction, and there is no need to have a slew mode in the counterclockwise direction. Assuming, for example, that the motor 500 is driving a document card in a punching machine, the general direction of movement of the card corresponds with the clockwise movement of the rotor 500; and, after the card 524 reaches its approximate desired position, it is only necessary to finally position the card with small movements of the rotor 500R. Thus, if the program is not in fine home mode, a direct passage to the counterclockwise driver control routine of FIG. 17 is made by means of subroutines 1238 and 1240.

Figure 15:
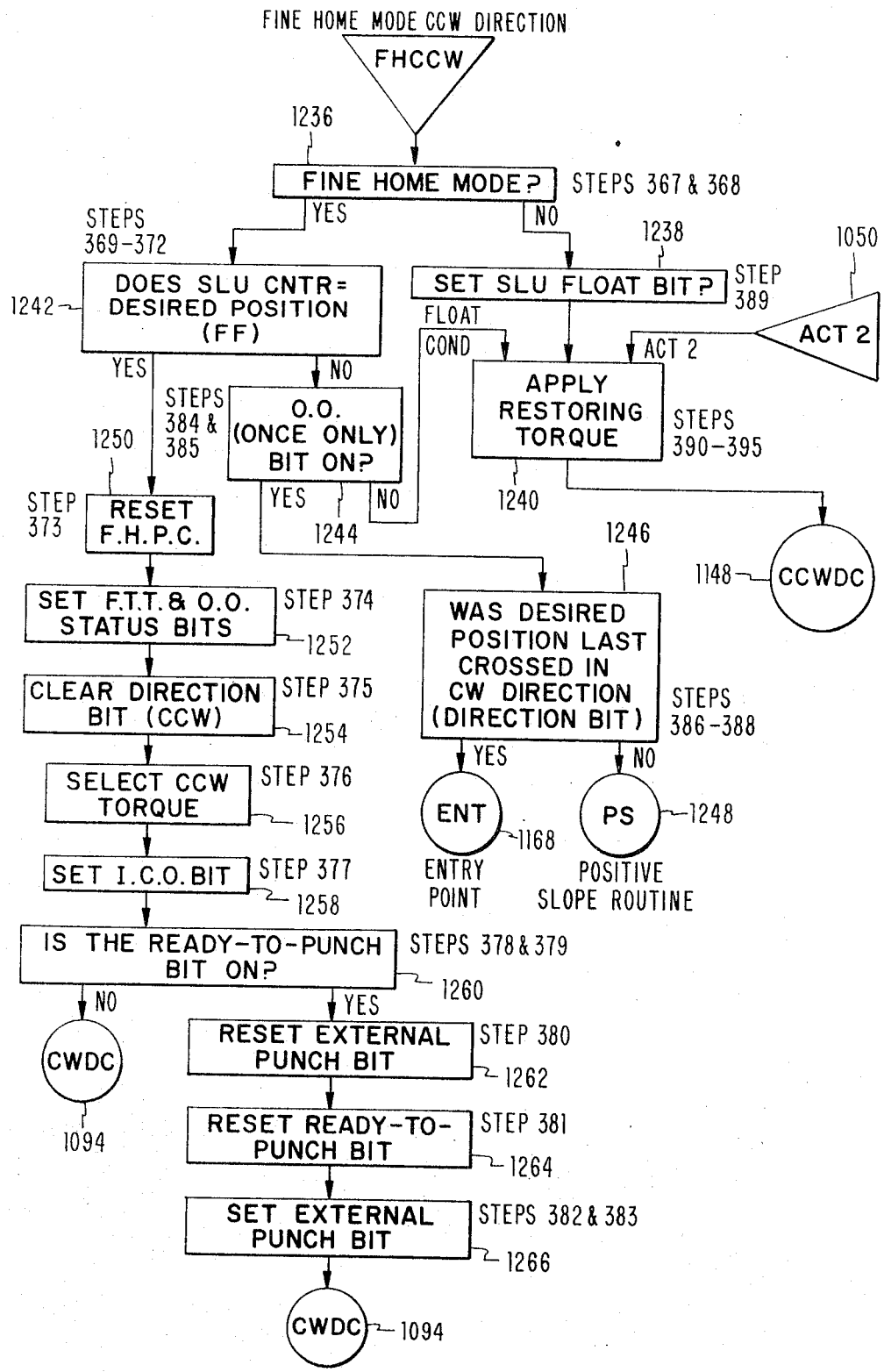
FIG. 15 is a flow diagram illustrating a fine home mode counterclockwise direction routine.

If the system is in fine home mode, referring again to block 1236, and this can occur only for counterclockwise direction of movement of the rotor 500R in the FIG. 15 routine; a determination is made according to block 1242 whether the contents of the slew counter (register 09) equals FF, which indicates the desired position. The desired position is at this time equal to hexadecimal FF (all one's), since the time the fine home mode was initiated, this counter was reset and has been continually updated since that time. If the contents of the slew counter does not equal hexadecimal FF, the once only bit is checked to determine if this bit is on in accordance with block 1244. If the once only bit is not on, a float condition exists and restoring torque is applied in accordance with block 1240.

If the once only bit is on, a determination is made as to whether the desired position of the rotor 500R was last crossed in the clockwise direction in accordance with block 1246. The direction bit (bit 7 of register 04) is checked for this determination. If the last crossing was in the clockwise direction, the fine home mode is entered by means of entry block 1168. If the desired rotor position was not crossed in the clockwise direction, the positive slope routine set forth in FIG. 10 comes into action through the entry block 1248. Both the FIG. 11 and FIG. 10 routines are basic fine home mode routines as previously described.

If the slew counter does in content equal hexadecimal FF which occurs when the rotor is on the counterclockwise side of the desired position, the fine home mode position counter is reset in accordance with block 1250. Subsequently, the first time through and once only status bits are set in accordance with block 1252. The direction bit is then cleared, referring to block 1254, to indicate counterclockwise rotation; and counterclockwise torque is selected in accordance with block 1256. The ICO (Current Cutoff) bit (bit 1 of register 04) is then set in accordance with block 1258. This bit is set, since this is not the first time through the desired position by the rotor 500R and the 120 microseconds time limit is desired. Then a check is made to determine if the ready to punch bit is on in accordance with block 1260. This bit assumes that the peripheral device controlled by the motor 500 is a punching machine. If the punching machine is ready for operation, the external punch bit is reset in accordance with block 1262; the ready to punch bit is reset in accordance with block 1264; and the external punch bit is set in accordance with block 1266. Thereupon, the clockwise driver control routine set forth in FIG. 16 is operative from the input block 1094. The ready to punch bit and the other bits referred to in blocks 1262, 1264 and 1266 simply determine the condition of the punching machine and give signals to operate if this is appropriate. While punching is taking place, the program idles until the next move bit (bit 3 of input register 30) occurs. If the ready to punch bit is not on, referring to block 1260, the program proceeds directly therefrom to the clockwise driver control routine of FIG. 16 by means of the input block 1094.

Figure 14:
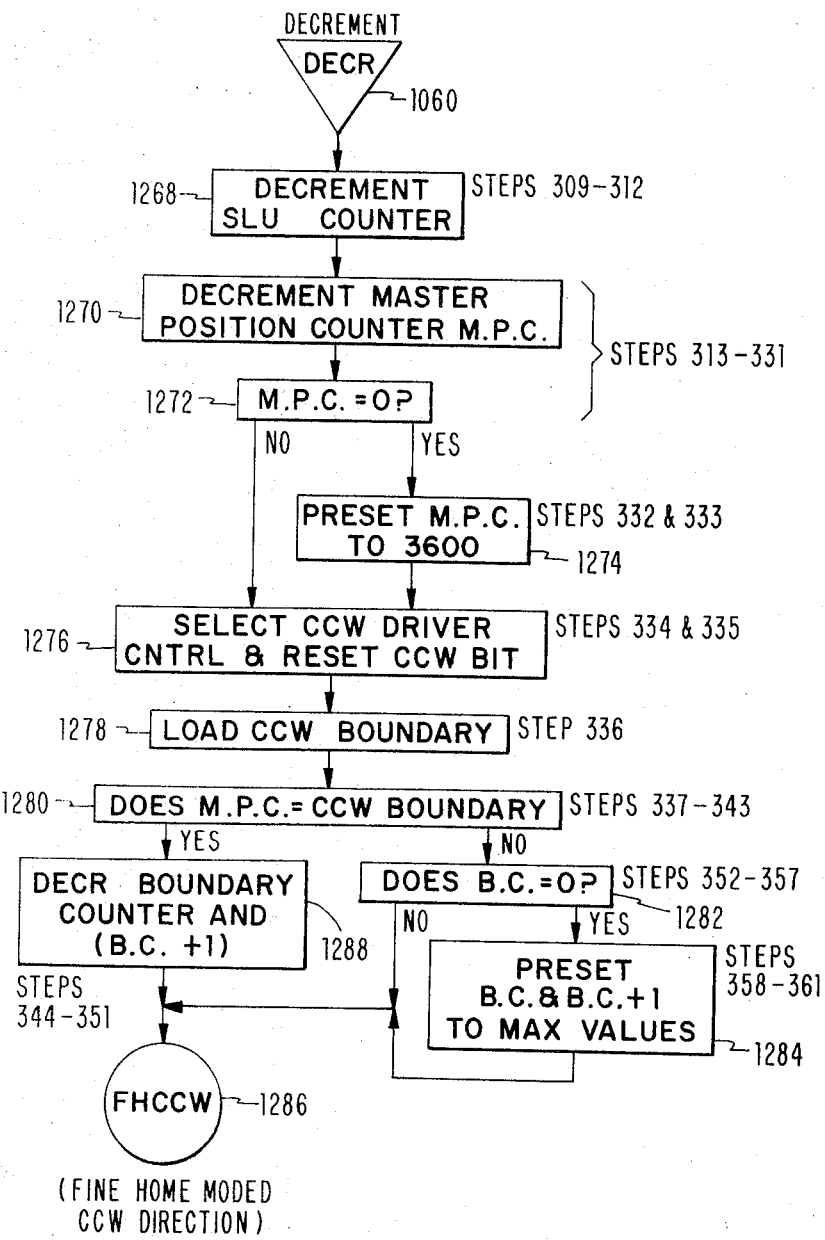
FIG. 14 is a flow diagram illustrating a decrement routine.

The fine home mode counterclockwise direction routine shown in FIG. 15 is under the control of the decrement routine shown in FIG. 14. The decrement routine includes the input block 1060 derived from the initialization routine of FIG. 8, and the first operation in the decrement routine is to decrement the slew counter in accordance with block 1268. The master position counter is then decremented in accordance with block 1270, and a determination is made whether the contents of the master position counter equals 0 in accordance with block 1272. If the master position counter contents are zero, the master position counter is then preset to have a content of 3,600 in accordance with block 1274.

If the master position counter content is 0 or after the content of the master position counter is preset to 3600, the counterclockwise driver control is selected and the driver control indicator (bit 6 of register 08) is reset to 0 in accordance with block 1276. The counterclockwise boundary is then loaded in accordance with block 1278, and a check is made to determine if the contents of the master position counter equals the counterclockwise boundary as set forth in block 1280. If not, a determination is made according to block 1282 whether the contents of the boundary counter (registers 11 and 12) equals 0; if so, the boundary counter registers 11 and 12 are preset to their maximum values as indicated by block 1284. If the boundary counter content does not equal 0 or after such presetting, the fine home mode counterclockwise direction routine is entered by means of entry block 1286.

If the contents of the master position counter equals the counterclockwise boundary, referring to block 1280; the boundary counter, including both registers 11 and 12, is decremented in accordance with block 1288; and the fine home mode counterclockwise direction routine is entered through block 1286.

The counterclockwise driver control routine illustrated in FIG. 17 is very similar to parts of the FIG. 16 routine for clockwise driver control. The block 1148, constituting the first one in the FIG. 17 routine, is derived from block 1116 of the FIG. 16 routine, and the desired torque is first determined in the FIG. 17 routine according to block 1288. If the desired torque is in the counterclockwise direction, the CCW driver bits are loaded in accordance with block 1290; and, thereupon a determination is made as to whether clockwise driver bits should also be loaded in accordance with block 1292. If so, the clockwise driver bits are loaded in accordance with block 1294, and thereupon a determination is made, according to block 1296, whether the ICO (current cutoff) bit is on. If the ICO bit is on, the routine passes back to the FIG. 16 routine by means of block 1298 while if the ICO bit is not on, the routine of FIG. 17 passes back to the initialization routine of FIG. 8 by means of block 1062.

If, according to block 1288, it is determined that the desired torque is in the clockwise direction or that none is appropriate, then, according to block 1300, a determination is made which of these conditions should be applied, clockwise on the one hand, or none on the other. If clockwise torque is appropriate, the clockwise driver bits are loaded in accordance with block 1302 and thereupon the routine proceeds to block 1296. If no torque is appropriate, the FIG. 17 routine proceeds through block 1304 to block 1130 of the FIG. 16 routine.

For a particular illustration of the operation of the program illustrated in FIGS. 8 to 17, it will be assumed that the rotor 500R is located in an initial position spaced 200 emitter counts (pulses from emitter 526) from the desired or home position of the rotor. It will be assumed that a move bit is utilized for beginning the operation; and, under these conditions, the registers will be initialized as indicated by block 1026, and the operations set forth by blocks 1028, 1030, 1032, 1036, 1038 and 1040 will take place. It is assumed that the rotor will move clockwise initially; and, according to block 1042, a bit will be set to select clockwise motion for the rotor. The status bits and registers for slew operation are then set according to subroutine 1044, and the direction of an incoming or emitter bit is then determined according to block 1046, if there is such a bit.

It is assumed at this point that the rotor 500R has moved out of its at rest position; and, at this time, the move bit has been turned off, this being one of the operations performed according to block 1044 just above referred to. At this time, the system simply idles between blocks 1038 and 1040 until an input bit from the encoder 526 appears. If the system is functioning satisfactorily (without outside interference), the first bit from the encoder 526 is a clockwise bit; and, therefore, according to blocks 1052 and 1054, the increment routine on FIG. 9 is then entered. Basically, according to the increment routine, the slew counter, the master position counter and the boundary counter are incremented, this being accomplished by subroutines 1064, 1066 and 1074. 1066 and 1074. In slew operation, the slew counter is utilized for making the count between the initial position of the rotor and its desired or home position; the boundary counter is utilized for properly controlling the various drivers 714a, 714b and 714c as above described; and the master position counter controls the boundary counter. The increment routine shown in FIG. 9 incidentally is used in both slew mode and also in fine home mode, and the operation starts in slew mode. The desired position of the rotor, rather than being contained in any of the counters, is contained in the program as shown on tables A to K, and this is 20° or 200 counts in the particular program illustrated in these charts (see steps 238–241). The differences in usage of the master position counter in the software as compared to the master position counter 536 in the hardware embodiment will be obvious. Also, in block 1072, the clockwise driver control is selected; and this is utilized later on in the program.

After the counters have been incremented according to the FIG. 9 routine, the fine home clockwise routine of FIG. 10 is entered by means of block 1080; and then, according to block 1082, a test is made to determine if the system is in fine home mode. It is not at this time, and the slew mode routine of FIG. 13 is then entered by means of block 1084. A check of the slew counter with the desired position is made according to block 1086. The slew counter content goes up one count starting from zero for each clockwise pulse; and, after the first clockwise pulse has been produced by encoder 526 on the line 528, the slew counter content is one. At this time, the content of the slew counter does not match with the desired position of 200 counts.

Then, according to block 1088, a test is made to determine if the reverse torque point has been reached, and this point for the particular program given in Tables A to K is located 176 counts (see steps 254–256) corresponding to 17.6° in the clockwise direction from the initial rotor position. As will be hereinafter explained, reverse torque is applied onto the rotor 500R at this point when reached in slew mode so as to cause the rotor to slow to nearly zero velocity as the rotor first crosses its desired or home position.

A check is then made to determine if the slew float bit is on, according to block 1090. The slew float bit is not on at the reception of the first clockwise pulse from the encoder 526, since the slew float bit only goes on if for any reason the rotor 500R should reverse direction before actually reaching its desired or home position for the first time. The slew float bit, incidentally, is set by block 1238 of the fine home mode counterclockwise direction routine (FIG. 15) and results in the application of restoring torque according to block 1240 by means of the counterclockwise driver control routine of FIG. 17 to bring the rotor to its desired or home position.

Returning to FIG. 13, the slew float bit is not on with an initial movement of the rotor 500R from its initial position, and the clockwise driver control routine of FIG. 16 is entered by means of the entry block 1094. Then, according to block 1116, the driver control bit is checked to determine if it is on. The CW driver control bit has been previously set by means of subroutine 1072 (FIG. 9). The direction of the desired torque is then determined according to block 1118, and the CW driver bits are loaded according to block 1120, from the boundary counters in main store 900. A determination is made then according to block 1122 if counterclockwise torque is also appropriate; and, during slew mode, this is not the case. Then a determination is made as to whether the current cutoff bit is on according to block 1132. The current cutoff bit is only effective during fine home mode; and, therefore, at this time, the initialization routine is re-entered by means of the TBR block 1062. Then the system continues to idle between blocks 1038 and 1040 until there is a succeeding input or encoder bit.

This operation continues until the rotor 500R has moved 17.6° producing 176 clockwise emitter pulses. At this time, during one of the passages through the subroutines as just mentioned; it is determined, according to block 1088 in FIG. 13, that the reverse torque point has been reached. At this time, the content of the slew counter equals 176. As has been described, the content of the slew counter increases one count for each clockwise pulse from the emitter 526. Counterclockwise torque is the selected according to block 1096, and the slew float bit is then reset according to block 1098 if it had been set previously. At this time, counterclockwise torque, exclusive of clockwise torque, is applied onto the rotor 500R. Then, the overspeed bit and the slew float bit are checked according to blocks 1100 and 1090, but both bits are off at this time; and the clockwise driver control routine of FIG. 16 is then entered by means of entry block 1094. Although, at this time, the clockwise driver control routine of FIG. 16 is utilized, nevertheless, the actual applied torque at this time is in the counterclockwise direction. Therefore, after determinations according to subroutines 1116, 1118 and 1126, the counterclockwise driver bits are loaded according to block 1128, utilizing boundary counter information in the manner previously described. The current cutoff bit is then checked according to block 1132; and the initialization routine of FIG. 8 is re-entered, whereupon the system idles between blocks 1038 and 1040 until an input bit from the encoder 526 appears.

Counterclockwise torque is now effective on the rotor 500R slowing the rotor down prior to its reaching its desired or home position after 20° of total rotation, and two situations may occur prior to the rotor reaching its home position. If the system is acting normally, the rotor 500R will continue rotating until the rotor passes through its home position for the first time, still traveling in the clockwise direction. On the other hand, the rotor 500R may reverse its direction of rotation prior to reaching home position if the system is not acting normally for some reason.

Assuming abnormal conditions and a premature reversal of rotor rotation, the encoder 526 produces a counterclockwise pulse as the rotor 500R reverses direction prior to reaching its home position for the first time; and, in this case, the subroutine set forth in block 1052 of FIG. 8 is effective to cause a branch to the decrement routine to be made according to block 1058. The decrement routine shown in FIG. 14 has the effect of decrementing the same counters that were incremented by the increment routine of FIG. 9 as previously described. As is apparent, the increment routine of FIG. 9 is effective for clockwise rotor rotation while the decrement routine of FIG. 14 is effective for counterclockwise rotor rotation. The counterclockwise driver control is selected according to block 1276 of FIG. 14, although as will appear, actually clockwise torque is applied onto the rotor at this time. Then the fine home mode CCW direction routine of FIG. 15 is entered by means of block 1286.

The fine home mode counterclockwise direction routine is illustrated in FIG. 15; and, again, a check is made according to block 1236 as to whether the system is in fine home mode. The system is still in slew mode, and then the slew float bit is set by means of block 1238, indicating that the rotor has reversed prematurely. Restoring torque is then applied according to block 1240 and the counterclockwise driver control routine of FIG. 17 is entered by means of block 1148.

Referring to FIG. 17, a determination of the desired torque direction is made according to block 1288; and, in this case, the proper direction is clockwise, so that the clockwise driver bits are loaded according to block 1302. The current cutoff bit is checked according to block 1296, and the test bit routine of FIG. 8 is entered by means of block 1062. The system then idles between blocks 1038 and 1040 as before. Since restoring torque (clockwise torque) has been selected according to block 1240, clockwise torque is applied onto the rotor (according to block 1288); and the rotor is urged toward its home position after this premature reversal of direction. With this reversal of motion of the rotor, additional clockwise pulses will be provided by the emitter 526, and the float bit has been raised as just described. The rotor is located at some position short of the full 20° rotation, and it probably is located beyond the 17.6 degree position. At this time, a check is made by means of block 1090 (FIG. 13) to determine if the slew float bit is on; it is; and a branch is made through entry block 1048 to block 1158 of the FIG. 10 fine home mode CW routine. Clockwise torque is maintained on the rotor 500R until the rotor reaches the home position by means of the FIG. 16 routine entered by means of block 1094 from the FIG. 10 routine.

Normal operation is slew mode will now be assumed in which rotor 500R is crossing its desired or home position, moving in the clockwise direction. At this time, as the rotor crosses its home position, the system changes from slew mode to fine home mode. The program passes through the FIG. 8 initialization routine from the TBR input block 1062, and a check is made according to block 1052 to determine if a clockwise bit is on. A clockwise bit does exist, since the rotor is moving in a clockwise direction; and a branch to the increment routine is made by blocks 1054 and 1056. The increment routine of FIG. 9 increments the counters as previously described, and an entry is made to the FIG. 13 slew mode routine by means of blocks 1080, 1082 and 1084 as previously described. At this time, the content of the slew counter matches the desired position, having 200 counts in it; and the slew counter is reset to zero as indicated by block 1102. The various bits indicated by blocks 1104, 1106 and 1108 are set and reset as indicated, and the fine home mode position counter is reset according to block 1110. The system is then out of slew mode and is in fine home mode. Counterclockwise torque is then selected according to block 1112, since the rotor 500R has passed through the desired or home position. The ready for punch bit is then set according to block 1114 which will ready the system for punching when the rotor again crosses the home position (for the second time). This provides additional time for the card to settle down before punching is actually initiated. Then, the clockwise driver control routine of FIG. 16 is re-entered through block 1094 which has the effect at this time of turning on the appropriate driver for the selected counterclockwise torque.

At this time, the rotor 500R is still rotating in the clockwise direction; but counterclockwise torque is effective by means of block 1128 on the rotor tending to move it back toward its home position, utilizing the clockwise driver control routine of FIG. 16. Return is made to the TBR block 1062 of FIG. 8 (through block 1132), and at this time there will be no move bit. The system will then be idling between blocks 1038 and 1040 awaiting a bit from emitter 526. It will be assumed that the rotor 500R overshoots its home position by a few clockwise emitter pulses. On each of these pulses, a branch is made to the increment routine of FIG. 9, and the various counters are incremented as previously described. An entry to the FIG. 10 fine home mode CW routine is then made through block 1080; and, as a result of the determination made by block 1082, the slew counter is checked to determine if it content is zero according to block 1150. The slew counter is still being updated even though the system is in fine home mode.

When the content of the slew counter is zero (referring to block 1150), this indicates that the rotor 500R is in the narrow band (between +0.1° and 0.0° about home position). When the rotor 500R first crosses the desired position in the clockwise direction, the slew counter is set to zero as indicated by block 1102 of FIG. 13. Therefore, when the rotor is actually in a position rotated clockwise with respect to the home position, the slew counter has a count in it corresponding to the number of tenth degrees the rotor is beyond the home position in the clockwise direction. The slew counter at this time thus keeps track of the position of the rotor 500R beyond the home position. When the rotor approaches the home position, going in the counterclockwise direction after having previously reversed its direction of rotation, the content of the slew counter is FF, and therefore the fine home position counter is reset according to block 1250 of FIG. 15. Then the various status bits are set according to blocks 1252–1258. Incidentally, every time that the rotor 500R passes through its home position, all of these status bits are reset. One of the status bits that is set according to block 1154 is the ICO bit which provides a 120 microsecond timeout, and this is set at this time regardless of the amount of overshoot of the rotor 500R beyond its home position. If, in fact, the rotor 500R rotates more than 0.1° beyond the home position in the clockwise direction, this ICO bit may be made ineffective as will be hereinafter described.

The program proceeds from the FIG. 15 routine to the clockwise driver control routine of FIG. 16 through block 1094. The counterclockwise torque will be selected by means of subroutines 1118 and 1126, and the counterclockwise dirver bits will be loaded as indicated by block 1128. The current cutoff bit will then be checked according to block 1132. The ICO bit is on at this time, having been raised according to block 1154; and the ICO counter is cleared according to block 1134 and is incremented according to block 1136. Then, a check is made to determine if either clockwise or counterclockwise bits from the emitter came on; if none had, the ICO counter is checked in block 1140 for its count limit (the ICO counter can count up to a count which equals 120 microseconds).

It will be assumed at this point that no emitter pulses are being received, and the ICO counter will continue counting at this time as indicated by blocks 1136, 1138 and 1140. Once the ICO counter reaches its count limit, (corresponding to a time delay of 120 microseconds), then the program proceeds to block 1142 at which no torque is selected, and the ICO bit is cleared according to block 1144. Then a return is made back into the driver routine, and all of the driver bits are reset in accordance with block 1130. There is thus no torque on rotor 500R thereafter in this sequence of operations, after timing out by the ICO counter. The program then returns to the initialization routine through entry block 1062, and the program idles between blocks 1038 and 1040, with the rotor being and remaining stationery in the narrow +0.1° −0.1° band about its home position. The program then assumes that the rotor is in its home position and takes no further action.

Referring again to block 1140 of FIG. 16, if an input bit from the encoder 526 is received prior to a timing out of the ICO counter (which is the usual situation for a second crossing of the home position) the existence of the input bit is detected according to block 1138. With the existence of the input bit, the ICO bit is cleared according to block 1146 so as to prevent the timing out as just described. Then either the increment or decrement routines will again be effective.

It will be assumed that the bit received is a clockwise bit, with the rotor having overshot its desired position, and the increment routine of FIG. 9 will again increment the various counters previously mentioned. These are the slew, the master position, and the boundary counters. The fine home mode CW routine of FIG. 10 is then effective, and the content of the slew counter does not equal zero, since this counter has just been incremented (referring to block 1150). Then a check is made according to block 1156 to determine if the once only bit is on; and, this bit is on at this time. The once only bit is on at this time, since it has been set previously according to block 1154. Then, according to block 1160, a check is made of the direction bit to determine if the rotor 500R last crossed the desired position in the counterclockwise direction. Utilizing this approach, the program allows the fine home position counter to be used for both sides of the home position, with the counter keeping track of the rotor and counting up and being incremented as the rotor moves away from its home position and counting down as the rotor moves toward home position. It will be assumed that the rotor is moving away from the desired position; and, therefore, the subroutine in block 1162 is next effective. The fine home position counter is thus incremented, and counterclockwise torque is selected according to block 1164. Then, the first time through bit is check to determine if it is off, according to block 1166. When the rotor 500R first crosses its desired position, this bit is set; therefore, the clockwise driver control routine of FIG. 16 is then effective in the same manner as has been previously described. Incidentally, the notation "PS" on block 1162 stands for Positive Slope which indicates that subroutine 1162, and the following subroutines just described are effective for a condition in which the rotor 500R is moving away from its desired or home position. At this time, there are no decisions for future action to be made by the program, decisions only being necessary after the rotor 500R has actually turned around and has started moving toward its home position. Assuming that the rotor 500R is overshooting its desired position after having initially crossed home position, clockwise pulses will continue to be emitted; and, after the rotor reverses, counterclockwise pulses will be emitted. The actual decisions for future action will be made on the reception of a counterclockwise pulse.

Once the rotor 500R reverses, a counterclockwise pulse is emitted from emitter 526; and, under these conditions, the subroutine in block 1058 of FIG. 13 is effective to branch the program to the decrement routine. The decrement routine in FIG. 19, as previously described, decrements the various counters that have been incremented by the increment routine of FIG. 14. The FIG. 19 decrement routine leads to the fine home mode CCW direction routine shown in FIG. 20 through block 1286. The slew counter is set to zero when the rotor 500R passes through its home position; and, therefore, the content of the slew counter is all one's or hexadecimal FF on the counterclockwise side of the home psoition, between −0.1° and home position. According to block 1242 of the FIG. 15 routine, the slew counter is checked to determine if its contents are all one's or hexadecimal FF. Since the rotor 500R is on the clockwise side of the home position, the slew counter does not contain all one's, and the once only bit is then checked to determine if it is on according to block 1244. The once only bit has been previously set (according to block 1252), and the subroutine in block 1246 is then effective. The subroutine 1246 checks the direction bit to determine if the desired position was last crossed in the clockwise direction; and the crossing was in this direction, and hence the entry point for fine home mode routine of FIG. 11 is then entered by means of block 1168.

The time at which the FIG. 11 routine is entered is the time at which the program decides on various alternatives, insofar as the application of torque to rotor 500R is concerned. At this time, the first counterclockwise encoder bit has been received after the desired position has been crossed by the rotor then traveling in the clockwise direction. A determination is first made whether this is the first time that the rotor 500R has changed direction by checking the first time through bit according to block 1170. The first time through bit was set just previously according to block 1154. Counterclockwise torque has been applied to the rotor ever since the rotor passed through its home position for the first time, and this counterclockwise torque will be continued for a time. In addition, clockwise torque may be applied or all torque on the rotor may be discontinued depending on the amount the rotor has moved in the clockwise direction past its home position, substantially the same as has been previously described in connection with FIG. 5. In fine home mode, the program produces substantially the same applications of torque as is produced by the circuitry of FIGS. 3a to 3f, to which FIG. 5 has previously been particularly applied. In particular, at the time of the first counterclockwise pulse as the rotor 500R turns back toward its home position traveling in the counterclockwise direction, the program calculates the switch point at which torque is switched and both torques are applied, and the contents of the fine home position counter is used for this purpose.

In this process, the low order bits of the fine home position counter are checked to determine if they amount to one or zero, and both of these amount to special cases. In both of these special cases, the rotor 500R is between its home position and +0.1° or between +0.1° and +0.2°. It will be assumed at first that the rotor has oscillated farther than this in the clockwise direction; and, therefore, the subroutine of block 1176 is effective. According to block 1176, a determination is made as to whether the low order two bits of the fine home position counter equals 1 and 0. This is a special case also in which the rotor 500R has overshot to a position beyond +0.2°. It will be assumed also at this point that the rotor has overshot more than 0.2°; and, therefore, the subroutine of block 1196 is then effective. According to this subroutine, the contents of the fine home position counter are divided by two. The rotor may have overshot, for example, 5, 6 or 7 encoder counts; and half of this amount is determined according to block 1196, with the remainder from the division operation being disregarded. Therefore, if the rotor 500R overshot home position by seven encoder counts, subroutine 1196 would produce the result of 3. This is the switch limit, and this amount is stored in main store 900. Then, according to block 1198, it is determined whether the low order bit of the switch limit (3, in the example given) equals 1. If the overshoot was relatively large, such as seven encoder pulses, for example, the low order bits of the switch limit do equal 1; and then the high order switch limit bits are checked according to block 1200 to determine if these are zero. For a large overshoot, they are not; and, thereafter, the coast and first time through bits are reset in accordance with block 1190. The fine home position counter is then set equal to 1 according to block 1192; and, thereafter, the clockwise driver control routine of FIG. 16 is entered with block 1094 so as to maintain counterclockwise torque effective on the rotor. Referring to FIG. 5, it will be observed that counterclockwise torque is maintained on the rotor for large overshoots of the rotor after it initially passes through its home position. The switch point has thus been calculated at this time by the FIG. 11 routine, and the rotor continues to move back in the counterclockwise direction from its point of maximum oscillation toward its home position.

The program proceeds through the clockwise driver control routine of FIG. 16 back to the initialization routine of FIG. 8 through the entry block 1062; and, from thence, the program proceeds through the decrement routine by means of block 1058, since the clockwise bit is not on due to the reversal of direction of the rotor (see block 1052). From thence, the program proceeds to the fine home mode counterclockwise direction routine of FIG. 15. In the FIG. 15 routine, the program proceeds through the blocks 1236, 1242, 1244, 1246 and 1168 back to the entry point for fine home mode of FIG. 11. The rotor at this time is moving back from its point of maximum oscillation toward its home position, prior to the switch point being reached.

In the FIG. 11 routine at this time, according to block 1170, the first time through bit is checked. This bit has just previously been reset according to block 1190; and, therefore, at this time, a branch is made to the FIG. 12, not first time through, routine with entry block 1194. The FIG. 12 routine is effective when the rotor is moving back from its maximum point of oscillation toward home position, and a determination must be made now by the program as to whether or not the switch point that has been calculated is actually being reached. According the FIG. 12 routine, initially the fine home position counter is incremented according to block 1204, the fine home mode position counter just previously having been reset to 1. The fine home position counter has been previously reset to 1, rather than 0; since this will result in the switch point being effective at the points illustrated in FIG. 5 and effective to cause the application of both clockwise and counterclockwise torques in the positions illustrated in FIG. 5. The coast bit is then checked according to block 1206. The coast bit was previously set in block 1190; and, therefore, the change limit bit is then checked according to block 1214. The change limit bit is not on at this time; and, therefore, the next determination made is whether the switch limit has been reached according to block 1216. In particular, at this point, it is determine whether the content of the fine home mode position counter equals the switch limit that has just previously been calculated. If it does not, the torque on the rotor is allowed to remain as before, with the program proceeding through the clockwise driver control routine of FIG. 16 as previously. Eventually, after the rotor moves sufficiently back in the counterclockwise direction toward its home position, the switch limit will have been reached; and, accordingly, at this time both torques are selected in accordance with blocks 1216 and 1218. These are the switch limit points illustrated in FIG. 5 in which both clockwise and counterclockwise torques are effective on the rotor. The change limit bit is then set according to block 1220. The program then proceeds through the clockwise driver control routine of FIG. 16 and the decrement routine of FIG. 14; and, during this time, both clockwise and counterclockwise torques are applied on the rotor, this being by virtue of block 1122 of the FIG. 16 clockwise driver control routine.

On the next counterclockwise encoder pulse, a passage again is made through the not first time through routine in FIG. 12. Again, according to block 1204, the fine home position counter is incremented and the coast bit is checked according to block 1206. The coast bit is still not on, and then a determination is made according to block 1214 as to whether the change limit bit is on. The change limit bit has just previously been set; and, therefore, "counterclockwise" torque is then selected according to block 1222. This torque although labeled "counterclockwise" is actually, in every case in which the not first time through routine is effective, a torque in the direction tending to drive the rotor away from its home position. This is, therefore, in this particular case, actually a clockwise torque; and this results from the action of the clockwise driver control routine of FIG. 16 that follows. The change limit bit is then reset according to block 1224; the coast bit is set according to block 1236; the fine home position counter is cleared according to block 1228; and the 2 bit is checked according to block 1230. The 2 bit controls a special case that will be hereinafter described. The 2 bit is not on at this particular time, and the program proceeds to the clockwise driver control routine of FIG. 16.

On the next counterclockwise encoder pulse, a return is again made back to the not first time through routine of FIG. 12. At this time, the fine home position counter, having been previously cleared (according to block 1228), is incremented according to block 1204 so that its count is again 1. The coast bit is now on, having been set according to block 1226; and, therefore, at this time counterclockwise torque is selected according to block 1208. The subroutine of block 1208 functions the same as that of block 1222 and causes a selection of the particular torque that is required to drive the rotor in a direction away from its home position and contrary to the direction in which it is moving. The switch limit is then checked according to block 1210, and this limit has been previously calculated as described. Once the switch limit has been reached, no torque is then selected according to block 1212, and the clockwise driver control routine of FIG. 16 is then re-entered. The subroutine of block 1212 results in the application of no torque onto the rotor in those places labeled "none" in FIG. 5.

Thus, in those places in which no torque should be applied onto the rotor, the switch limit is counted twice (in block 1208 and also in block 1222). The drivers are turned off, in order that there shall be no torque applied to the rotor, by means of the subroutines in blocks 1118, 1126, and 1130 of the clockwise driver control routine of FIG. 16. As is apparent from FIG. 5, no torque is selected in those cases in which the rotor 500R has previously oscillated just beyond an odd tenth degree such as +0.3°, and +0.5°. In the case of the +0.3° overshoot, the switch limit is counted at point 816a so that the fine home position counter counts 1 from 0.3 to 0.2 and then again counts 1 from +0.2° to +0.1°. Thereafter, no torque is effective on the rotor, from +0.1° to 0°. Likewise, when the overshoot is +0.5°, the fine home position counter counts to two from + 0.5° to +0.3° and then again counts two from +0.3° to +0.1°. As the fine home position counter thus counts twice, first counterclockwise torque is applied to the rotor and then clockwise torque is applied, as above described.

Likewise, when the rotor overshoots by +0.4°, the fine home position counter counts two as the rotor moves from +0.4° to +0.2° and then again counts two as the rotor moves from +0.2° to 0°. Torque is therefore applied all the way to 0 degrees so that there shall be a matching of the clockwise and counterclockwise torques. Similarly, when the overshoot initially is 0.6°, the fine home position counter makes a cout of 3, as the rotor moves from +0.6° to +0.3° and then the fine home position counter makes another count of 3 as the rotor moves from +0.3° to 0°. Thus, in order to match the clockwise and counterclockwise torques, no torque is applied as the rotor nears its home position for initial overshoots of odd tenth degrees while torque is applied all the way to the 0° position of the rotor for even tenth degree initial overshoots.

It will now be assumed that the rotor 500R has again overshot and has passed through its home position (for the second time and moving in the counterclockwise direction). At this time, the content of the slew counter changes from zero to all one's or hexadecimal FF. Under these conditions, the subroutine of block 1052 (FIG. 8) is effective; and, since the rotor is traveling in the counterclockwise direction, the clockwise bit is not on. Therefore, from the subroutine of block 1052, a branch is made to the decrement routine of FIG. 14 by means of the subroutines of blocks 1058 and 1060. In the FIG. 14 routine, the slew and master position counters are decremented and the boundary counters are updated, as before. A return is then made back to the fine home counterclockwise routine by means of entry block 1286, this routine being shown on FIG. 15. Then, a check is made according to block 1242 of the content of the slew counter; and, in this case, the content of the slew counter does equal hexadecimal FF. The subroutines of blocks 1250, 1252, 1254, 1256, 1258 and 1260 are then carried out, this being for the purpose of providing for the application again of a proper torque tending to return the rotor to its home position (utilizing the clockwise driver control routine of FIG. 16). In particular, in this series of routines the fine home position counter is reset to zero, and the first time through and once only status bits are set. The direction bit is cleared indicating the desired position was crossed in the counterclockwise direction (the direction bit is subsequently checked in block 1246). In addition, at this time, counterclockwise torque is selected according to clock 1256, and the ICO bit is set according to block 1258. The ICO bit should be set at just the time the rotor crosses the desired position at any time.

Then, a determination is made according to block 1260 as to whether the ready to punch bit is on, and this bit was set when the rotor first crossed its home position. The external punch bit is set according to block 1262 which signals the external machine, assumed to be a punch; and the ready to punch bit is reset according to block 1264. In addition, the external punch bit is set according to block 1266, the three blocks 1262, 1264 and 1266 indicating that a signal has been given to the external machine, such as the punch, so as to initiate an operative action of the machine, such as document card punching. It will be noted that the subroutine of blocks 1262, 1264 and 1266 are effective only on the second crossing by the rotor of its desired position, since the ready to punch bit is not on unitl punching action is in order. It will be noted that the subroutine of block 1264 resets the ready to punch bit so that once the operative action, such as punching, by the machine has taken place, this does not take place again until the rotor 500R has moved to another incremented position. The subroutine of block 1260 assures this result.

During this operation, the rotor is moving in the counterclockwise direction away from its desired position, but initially it will be assumed that the rotor speed is so low that it does not move across the +0.1° position. Thereafter, no pulses from the emitter 526 will be forthcoming, since the rotor does not cross either its home position or the +0.1° position. The ICO bit is set by means of the subroutine of block 1258, and the operation proceeds to the FIG. 16 driver control routine by means of which the proper driver is turned on for restoring torque (by means of block 1120), and then the ICO bit is checked according to block 1132. The ICO bit is on, and this bit remains on for 120 microseconds. The assumption is that within this time there is enough restoring torque to bring the rotor 500R to rest. The ICO counter times out, and then a return is made to blocks 1116 and 1130 so as to turn off all of the drivers. A return is then made to the test bit routine of FIG. 8 by means of entry block 1062, and a test is made for any input or emitter bits. There are no emitter bits, and the rotor simply then rests with all of the drivers 714a, 714b and 714c off. The rotor 500R is then in its desired +0.1° – −0.1° desired position.

In bringing the rotor 500R to rest as just described, it was assumed that the rotor did not move beyond its +0.1° position. Actually, as the rotor oscillates, its movement may be beyond the 0.1° position in either direction, and these may be considered special cases. If the rotor moves beyond a 0.3° position but less than 0.4°, in this case, at the 0.3° decision point, the point at which the first emitter pulse is provided after the rotor has reversed direction) a second driver, as well as a first driver, must be turned on. Thus, between points 816a and 816b in FIG. 5, for example, both drivers are fully on. For other cases, such as for the one above just discussed, at the decision point no substantial changes are made, with the driver that has been on being allowed to remain on. As previously discussed in connection with the overshoot of +0.3° of FIG. 5, it has been mentioned that the point 816a is the switch point, and this is in contrast with the +0.3° position on the upper end of the curve 816 which is the decision point. The fine home position counter is set to 1 before counting is started, and this is done at the decision point — waiting until the point 816a would obviously be too late if both drivers are supposed to be on at the same time. As will be recalled, the low order bits of the switch limit are checked in block 1198 of FIG. 11 to determine if they are 1, and the high order switch limit bits are checked in block 1200 to determine if they are 0. If both blocks 1198 and 1200 are satisfied, the overshoot has been by 0.3°, so the switch limit is 1. Both torques are then selected, and the change limit bit is set according to block 1188. These subroutines have the effect of turning on both torques at the time the decision point of calculating the switch limit. This special case is the reason for the existence of the subroutines of blocks 1198 and 1200.

If the overshoot is by 0.2° (but less than 0.3°), in this case the subroutine of block 1176 is effective. If the low order 2 bits of the fine home position counter equals 1 and 0 (or a count of Arabic 2), the high order bits are checked according to block 1180; and, the overshoot was by just 0.2° rather than more. Under these conditions, the 2 bit is then set according to block 1182. This is a special case, since, under these conditions, the restoring torque is on; but it is limited by the 120 microsecond time limit. On the other hand, if the overshoot is 0.3°, this time out does not occur. In this case, the switch limit is set to some predetermined value (depending on the amount of overshoot) according to block 1182. Again, both torques are selected and the change limit bit is set according to block 1188. Thereupon, the same actions take place as if the overshoot was by 0.2°.

Another special case is when the overshoot is by 0.1° but less than 0.2°. In this case, the subroutine of block 1172 is effective, and then the high order bits of the fine home position counter are checked to determine if they are 0 in accordance with block 1174. No torque is selected in accordance with block 1178 under these conditions, and then the rest of the FIG. 11 routine is passed through but has not substantial effect on the operation.

The same basic principles of operation, with respect to the application of the two opposing torques, apply for the cases of an overshoot of more than 0.4° as for the case of 0.3° overshoot; and some of these cases are illustrated in FIG. 5.

The manner in which the microprogram brings the rotor 500R to its final position in the narrow band of +0.1° and −0.1° which is the essence of the invention, is believed quite well illustrated in FIGS. 8 to 17. A number of methods may be used to start the rotor 500R in operation, after it has once settled at rest in this narrow band as the result of a previous incremental movemnt. Although this is not particularly illustrated in these figures, a good understanding of the manner in which this may be accomplished may be had from the description now to be given.

Under these conditions, all of the drivers are off, and there will be no emitter or input bits. The machine being controlled, such as a punching machine, provides a move bit; and the existence of this bit is determined by the subroutine of block 1040 (FIG. 8). When the move bit is on, with the accomplishment of the operation of the punching or other machine, clockwise motion is selected in accordance with block 1042. In accordance with step 94 (Table C), the driver control select bit is set for clockwise motion (this being bit 5 of register 8 which is set to a logical 1 value). No drivers are turned on at this point. Then, in accordance with block 1044, the status bits and registers are set for slew operation. The slew float bit is then set at a logical 1 value, since the system is about to go into slew mode; and register 04, which contains status bits for fine mode, is completely reset. In addition, the move bit is reset; and, therefore, the next time that the program proceeds through block 1040, the move bit will not be on as questioned by subroutine 1040.

The direction of the incoming bit from the encoder is then determined according to block 1046; and, since there was no incoming bit, the program proceeds through the "Act 2" block 1050 to the block 1240 (FIG. 15). Normally, the rotor 500R has no motion at this time, but since conceivably the punching or other machine may give the document card a slight motion, the check of direction by means of block 1046 is made. The entry blocks 1048 and 1050, incidentally, both result in clockwise torque on the rotor.

As will be noted, block 1240 is labeled "apply restoring torque," and this title is logical for a float condition in fine home mode which has been previously described. Actually, steps 390 to 395 in Table H forming the foundation for block 1240 include additional instructions for the starting condition as will now be discussed. In these steps, first a check is made to determine if the direction bit shows clockwise movement. The direction bit in this case is bit 7 of register 04 and indicates the direction of the rotor when the desired position was last crossed. All of the bits in register 04 have just been reset so, therefore, the bit does not show clockwise movement. The effect of these steps is thus to determine whether the rotor is on the clockwise side of its home position. In this case, the rotor is rather on the counterclockwise of the desired position, since clockwise movement of the rotor is necessary for the rotor to be on the clockwise side of home position, and such movement has not yet occurred. Then clockwise torque is selected in accordance with these steps, and bit 6 of register 03 is thus turned on. The counterclockwise driver control routine of FIG. 17 is then entered by means of block 1148; and, according to block 1288, the bits 6 and 7 of register 3 are checked. Clockwise torque has been selected, and bit 6 of register 3 is on under these conditions. In this case, driver information is obtained out of main store module 0 which contains clockwise driver control information. Therefore, the proper driver for clockwise torque will be turned on under these conditions. The FIG. 17 routine is exited, and return is made to the FIG. 8 routine with the system waiting for encoder bits to be received. When an input encoder bit is received, the program proceeds in slew mode through block 1052, etc. as previously described.

When the machine is put into operation for the first time, as contrasted to the condition in which there have been previous incremental movements of the rotor 500R, the start button of the machine is depressed, raising the start bit. Driver No. 3 has previously been on, and the result of the depression of the start button is to turn on driver No. 1 so as to initiate clockwise movement. This is set forth in the subroutine of block 1030 (FIG. 8). At this point, the rotor 500R starts its clockwise movement. Then the program proceeds to block 1038 to await the reception of an input or encoder bit. After that, the operation is as previously described.

Advantageously, both embodiments of the invention utilize a bang-bang algorithm, causing the application of torque to the rotor 500R to drive the rotor back to desired position as long as the rotor is moving away from the desired position and until the rotor has moved back toward the desired position some percentage of the last overshoot. The bang-bang algorithm is so effective whereby the rotor 500R may be positioned in a final position at or between stator poles, and the rotor 500R is in effect detented at its desired position by controlling the stator windings 504, 510 and 512 with a digital feedback system. Due to this feedback system, the final positioning of the rotor is accurately independent of load on the motor. In a fine home mode, following a slew mode, the rotor 500R is moved toward its desired position by the use of reverse torque, and forward torque is also at times applied onto the rotor as its moves toward its home position; and, at still other times, no torque at all is applied onto the rotor, allowing the rotor to drift into its final position. These various applications of torque are dependent on the amount of overshoot that the rotor has made after crossing its home position. Positioning of the rotor may not only be accomplished by means of a completely hardware embodiment of electrical controls but alternately a microprogram may be utilized for accomplishing the same results.

What is claimed is:

1. In combination,
   an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized,
   means for energizing said windings to apply torque on said rotor in a forward direction when supplied with a forward energization signal,
   means for energizing said windings to apply torque on said rotor in a reverse direction when supplied with a reverse energization signal,
   an emitter driven by said rotor for producing output signals as said rotor moves through successive increments each of $Z°$ after passing through its desired or home position in the forward direction and producing the same output signals at the same rotor positions as the rotor moves back in the reverse direction from a maximum point X of oscillation in the forward direction in which X is equal to or more than $(Y \times Z°)$ but is less than $(X + Z°)$ where Y is an even integer greater than or equal to 4 and Z is a constant,
   means under the control of said emitter for providing said reverse energization signal when said rotor passes through its home position moving in said forward direction until the point of maximum oscillation and then until the rotor returns to a point of $S-Z°$ measured from home position where S is a switch point equal to $(X + 2Z°)/2$, and
   means under the control of said emitter for providing said forward energization signal at said switch point S and said rotor is moving back in the reverse direction toward home position from its point of maximum oscillation.

2. The combination as set forth in claim 1 and including means for terminating said forward energization signal in a predetermined time after said rotor passes through its Z° position measured from said home position in moving back toward its home position from its point of maximum oscillation.

3. In combination,
an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized,
means for energizing said windings to apply torque on said rotor in a forward direction when supplied with a forward energization signal,
means for energizing said windings to apply torque on said rotor in a reverse direction when supplied with a reverse energization signal,
an emitter driven by said rotor for producing successive output signals as said rotor moves through successive increments each of Z° after passing through its desired or home position moving in the forward direction and producing the same output signals at the same rotor positions as the rotor moves back in the reverse direction from a maximum point X of oscillation in the forward direction in which X is equal to or more than (Y × Z°) but is less than (X + Z°) where Y is an odd integer greater than or equal to 3 and Z is a constant,
means under the control of said emitter for providing said reverse energization signal when said rotor passes through its home position moving in the forward direction until its point of maximum oscillation and then until said rotor returns to a point S−Z° measured from home position where S is a switch point equal to (X + 3Z°)/2, and
means under the control of said emitter for providing said forward energization signal at said switch point S as said rotor is moving back in the reverse direction toward home position from its point of maximum oscillation.

4. The combination as set forth in claim 3 and including means for terminating said forward energization signal in a predetermined time after said rotor passes through its Z° position measured from said home position in moving back toward its home position from its point of maximum oscillation.

5. In combination,
an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized,
means for energizing said windings to apply torque on said rotor in a forward direction when supplied with a forward energization signal,
means for energizing said windings to apply torque on said rotor in a reverse direction when supplied with a reverse energization signal,
an emitter driven by said rotor for producing successive output signals as said rotor moves through successive increments each of Z° after passing in the forward direction through its desired or home position and producing the same output signals at the same rotor positions as the rotor moves back reversely from a maximum point of oscillation X which is equal to or more than 2Z° but is less than 3Z° where Z is a constant,
means under the control of said emitter for providing said reverse energization signal when said rotor passes through its home position moving in the forward direction until its point of maximum oscillation and then until Z° measured from home position as the rotor returns from its point of maximum oscillation toward home position, and
means under the control of said emitter for providing said forward energization signal at 2Z° measured from home position and subsequent to the point of maximum oscillation of said rotor as the rotor returns toward home position travelling in the reverse direction.

6. The combination as set forth in claim 5 and including means for terminating said forward energization signal after a predetermined time subsequent to the passage of said rotor through a point at Z° spaced from home position as the rotor is moving reversely toward home position.

7. The combination as set forth in claim 6, said means for terminating said forward energization signal including a single shot for providing a timing action.

8. In combination,
an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized,
means for energizing said windings to apply torque on said rotor in a forward direction when supplied with a forward energization signal,
means for energizing said windings to apply torque on said rotor in a reverse direction when supplied with a reverse energization signal,
an emitter driven by said rotor for producing successive output signals as said rotor moves through successive increments each of Z° after passing in the forward direction through its desired or home position and producing the same output signals at the same rotor positions as the rotor moves back reversely from a maximum point of oscillation which is equal to or more than Z° but is less than 2Z° where Z is a constant,
means under the control of said emitter for providing said reverse energization signal when said rotor passes through its home position moving in the forward direction until its point of maximum oscillation and then as the rotor reverses direction, and
means for terminating said reverse energization signal when said rotor reaches its Z° position spaced from home position as the rotor moves in the reverse direction from its point of maximum oscillation toward its home position.

9. In combination, an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized, means for energizing said windings to apply torque on said rotor in a forward direction when supplied with a forward energization signal, means for energizing said windings to apply torque on said rotor in a reverse direction when supplied with a reverse energization signal, an emitter driven by said rotor for producing successive output signals as said rotor moves through successive increments each of Z° after passing through its desired or home position moving in the forward direction and producing the same output signals as the rotor moves back in the reverse direction from a maximum point of oscillation X which in this case is less than Z° from home position, means under the control of said emitter for initiating said reverse energization signal when said rotor passes through its home position moving in the forward direction, and means for terminating said reverse energization signal a predetermined time after its initiation.

10. The combination as set forth in claim 1, said two last-named means under the control of said emitter including an overshoot counter and a divide-by-two counter both supplied with output signals from said emitter, and
a compare circuit having outputs of said divide-by-two counter and said overshoot counter supplied to it as inputs and thus providing a signal output when there is a correspondence of outputs of said two counters, and
a circuit responsive to the output of said compare circuit to in turn control said two energization signals.

11. The combination as set forth in claim 3, said two last-named means under the control of said emitter including an overshoot counter and a divide-by-two counter both supplied with output signals from said emitter, and
a compare circuit having outputs of said divide-by-two counter and said overshoot counter supplied to it as inputs and thus providing a signal output when there is a correspondence of outputs of said two counters, and
a circuit responsive to the output of said compare circuit to in turn control said two energization signals.

12. The combination as set forth in claim 5, said two last-named means under the control of said emitter including an overshoot counter and a divide-by-two counter both supplied with output signals from said emitter, and
a compare circuit having outputs of said divide-by-two counter and said overshoot counter supplied to it as inputs and thus providing a signal output when there is a correspondence of outputs of said two counters, and a circuit responsive to the output of said compare circuit to in turn control said two energization signals.

13. The combination as set forth in claim 8, said means for terminating said reverse energization signal including an overshoot counter and a divide-by-two counter both responsive to the outputs of said emitter and a compare circuit having the outputs of said two counters as inputs and providing a signal output when the outputs of said two counters are identical.

14. The combination as set forth in claim 9, said means for terminating said reverse energization signal including a single shot for providing a timing action.

15. In combination,
an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized, means for energizing said windings to apply torque on said rotor in a forward direction when supplied with a forward energization signal, means for energizing said windings to apply torque on said rotor in a reverse direction when supplied with a reverse energization signal, an emitter driven by said rotor for producing output signals as said rotor moves through successive increments each of Z° after passing through its desired or home position in the forward direction and producing the same output signals at the same rotor positions as the rotor moves back in the reverse direction, means under the control of said emitter for providing said reverse energization signal so as to thereby apply torque on said rotor in the reverse direction when said rotor passes through its home position moving in the forward direction until the point of maximum oscillation of the rotor and then until the rotor returns to a reverse torque termination point which is between said point of maximum oscillation and said home position, and means under the control of said emitter effective at a forward torque initiating point of rotor rotation lying between said point of maximum oscillation of the rotor and said reverse torque termination point of the rotor for providing said forward energization signal and thereby applying torque on said rotor in the forward direction as said rotor is moving back in the reverse direction toward home position from its point of maximum oscillation whereby there is an overlapping forward torque on said rotor and reverse torque on said rotor between said forward torque initiating and said reverse torque termination points of rotor rotation.

16. In combination,
a stepping motor having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized, an emitter driven with said rotor and arranged to produce output signals at rotor positions between said natural detent positions and with the output signals of the emitter being dependent on the direction of rotor rotation, forward energizing means for energizing said windings so as to provide a forward torque on said rotor, reverse energizing means for energizing said windings so as to provide a reverse torque on said rotor, means under the control of any of said emitter output signals produced at rotor positions between said natural detent positions and denoting a forward position of the rotor from a home position of the rotor for controlling said reverse energizing means to return the rotor toward the home position from the forward rotor position, and means under the control of any of said emitter output signals produced at rotor positions between said natural detent positions and denoting a reverse position of the rotor from a home position of the rotor for controlling said forward energizing means to return the rotor toward the home position from the reverse rotor position.

17. The combination as set forth in claim 16 in which said electrical windings are disposed on poles of said stator.

18. The combination as set forth in claim 17, said forward energizing means and said reverse energizing means including switching means for switching energization of the windings on said stator under the control of output signals from said emitter.

19. The combination as set forth in claim 16 and including a master position counter responsive to output signals from said emitter for indicating the present position of said rotor, a desired position register the contents of which are indicative of the desired or home position of the rotor, and compare circuitry for comparing the contents of said counter and register and effective for controlling said forward energizing means and said reverse energizing means.

* * * * *

UNITED STATES PATENT OFFICE
CERTIFICATE OF CORRECTION

O-1050
5/69)

Patent No. 3,842,331     Dated Oct. 15, 1974

Inventor(s) Kenneth E. Hendrickson; Warren A. Lopour; Larry F. Mattson

It is certified that error appears in the above-identified patent and that said Letters Patent are hereby corrected as shown below:

Inventor's name should read --Larry F. Mattson--, not "Matison".

Column 15, line 62, "oscillaring" should read --oscillating--.

Column 21, line 36, "0000" should read --ØØØØ--.

Column 41, line 41, "embedded" should read --embodied--.

Signed and sealed this 11th day of February 1975.

(SEAL)
Attest:

RUTH C. MASON
Attesting Officer

C. MARSHALL DANN
Commissioner of Patents
and Trademarks